United States Patent [19]
Yokoyama et al.

[11] Patent Number: 5,303,344
[45] Date of Patent: Apr. 12, 1994

[54] PROTOCOL PROCESSING APPARATUS FOR USE IN INTERFACING NETWORK CONNECTED COMPUTER SYSTEMS UTILIZING SEPARATE PATHS FOR CONTROL INFORMATION AND DATA TRANSFER

[75] Inventors: Tatsuya Yokoyama; Susumu Matsui; Matsuaki Terada; Tetsuhiko Hirata, all of Machida; Mika Mizutani, Tokyo, all of Japan

[73] Assignee: Hitachi, Ltd., Tokyo, Japan

[21] Appl. No.: 659,705

[22] Filed: Feb. 25, 1991

Related U.S. Application Data

[63] Continuation-in-part of Ser. No. 489,243, Mar. 5, 1990, Pat. No. 5,056,058.

[30] Foreign Application Priority Data

Feb. 23, 1990 [JP] Japan ................................. 2-041005
Nov. 19, 1990 [JP] Japan ................................. 2-311494

[51] Int. Cl.$^5$ ......................... G06F 3/00; G06F 15/16
[52] U.S. Cl. ............................ 395/200; 364/DIG. 1; 364/229; 364/239; 364/239.3; 364/284; 364/284.1; 364/284.4; 370/95.1
[58] Field of Search ......... 395/200; 364/900, DIG. 1; 370/95.1

[56] References Cited

U.S. PATENT DOCUMENTS 5,056,058 10/1991 Hirata et al. ..................... 364/900
5,077,655 12/1991 Jinzaki ............................. 395/200
5,184,348 2/1993 Abdelmouttalib et al. ....... 370/95.1

FOREIGN PATENT DOCUMENTS 62-246055 10/1988 Japan .

Primary Examiner—Paul V. Kulik
Assistant Examiner—Wayne Amsbury
Attorney, Agent, or Firm—Antonelli, Terry, Stout & Kraus

[57] ABSTRACT

A communication control equipment connected between a computer and a network so as to perform protocol processing at a high speed, has a buffer memory connected between a computer interface circuit and a network interface circuit through a first path for data transfer, so as to temporarily store communication data, and a protocol processor connected between the computer interface circuit and the network interface circuit through a second path for control information transfer. The protocol processor is also connected to the buffer memory through a third path so as to effect protocol processing on the communication data within the buffer memory. The protocol processor includes a plurality of processor units connected in series in the second path so as to respond to control information received from the second path to make access to the buffer memory through the third path and to execute a first category of protocol processing necessary in normal data transfer on the communication data stored in the buffer memory. If protocol processing other than the first category of protocol processing on the communication data is necessary, the processor units supply the control information to the third path. The protocol processing also includes a second processor which operates as a backend processor for the processor units and which is connected to the third path so as to respond to the control information received from the third path to execute protocol processing other than the first category of protocol processing on the communication data stored in the buffer memory.

22 Claims, 57 Drawing Sheets

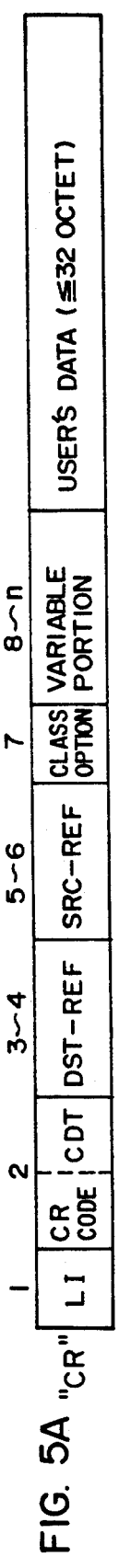
FIG. 5A "CR"
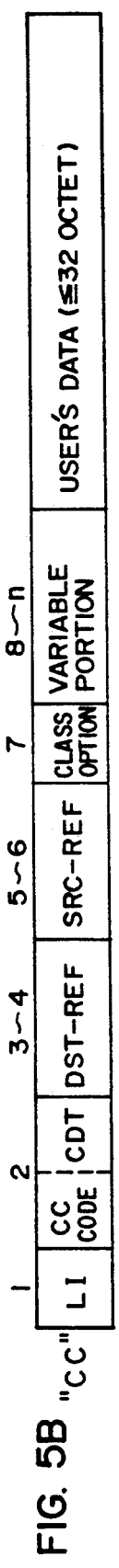
FIG. 5B "CC"
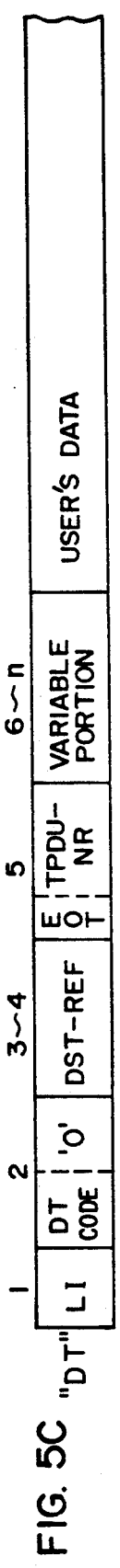
FIG. 5C "DT"
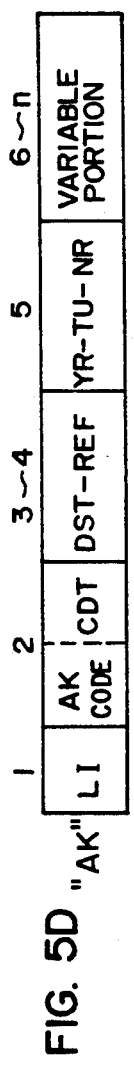
FIG. 5D "AK"
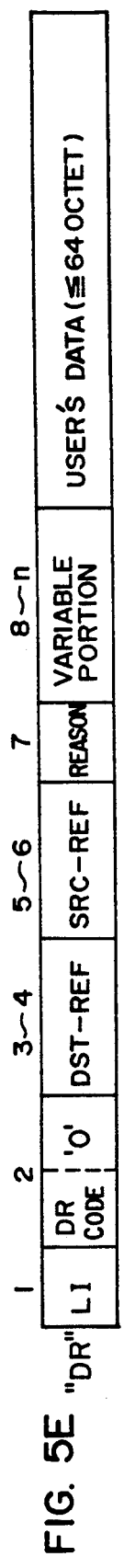
FIG. 5E "DR"
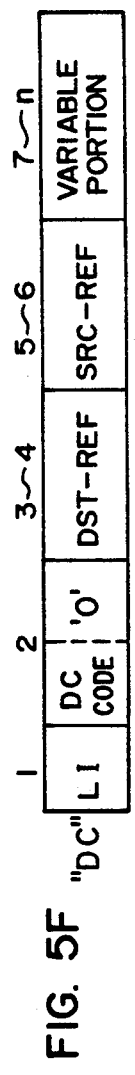
FIG. 5F "DC"

FIG. 6A

LAYER 3

| 1 | 2 | 3 | 4 | 5 | 6~7 | 8~9 | 10 | 11~n | n+1 | n+2~m | m+1~ℓ |
|---|---|---|---|---|---|---|---|---|---|---|---|
| PROTOCOL ID | HEADER LENGTH | VERSION | LIFE TIME | S\|M\|E\|DT P\|S\|R\|CODE | SEGMENT LENGTH | CHECK SUM | DA LENGTH | DNSAP | SA LENGTH | SNSAP | VARIABLE PORTION | USER'S DATA |

FIG. 6B

LAYER 2

| 1 | 2 | 3 |
|---|---|---|
| DSAP | SSAP | CONTROL | USER'S DATA |

FIG. 9

| PROTO-COL | FUNCTION | | | DATA TRANSFER PROCESSOR | BACKEND PROCESSOR | |
|---|---|---|---|---|---|---|
| TRANS-PORT | CONNECTION CONTROL | | | | ◯ | FU1 |
| | DATA TRANSFER CONTROL | NORMAL PROCESS-ING | HEADER GENERATION/ ANALYSIS | ◯ | | FU2 |
| | | | STATUS MANAGEMENT | ◯ | | FU3 |
| | | | TIMER CONTROL | | ◯ | FU4 |
| | | ABNORMAL PROCESSING | | | ◯ | FU5 |
| CLNP | DATA TRANSFER CONTROL | NORMAL PROCESSING | | ◯ | | FU6 |
| | | ABNORMAL PROCESSING | | | ◯ | FU7 |
| | FRAME PROCESSING OTHER THAN DATA | | | | ◯ | FU8 |
| LLC | DATA TRANSFER CONTROL | NORMAL PROCESSING | | ◯ | | FU9 |
| | | ABNORMAL PROCESSING | | | ◯ | FU10 |
| | FRAME PROCESSING OTHER THAN DATA | | | | ◯ | FU11 |
| COMMON | BUFFER MANAGEMENT | | | | ◯ | FU12 |

FIG. 54
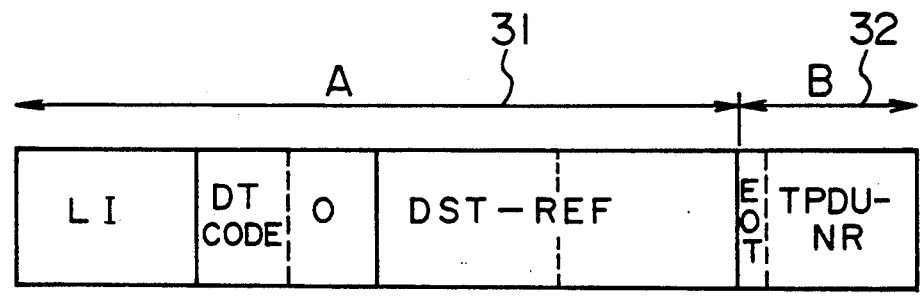
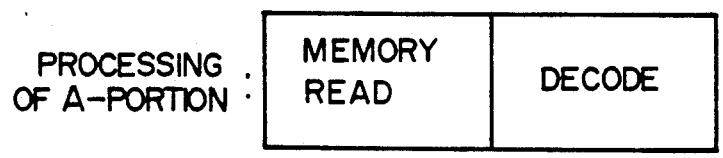
PROCESSING OF A-PORTION
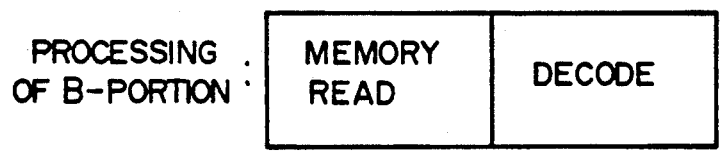
PROCESSING OF B-PORTION
TIME

PROTOCOL PROCESSING APPARATUS FOR USE IN INTERFACING NETWORK CONNECTED COMPUTER SYSTEMS UTILIZING SEPARATE PATHS FOR CONTROL INFORMATION AND DATA TRANSFER

CROSS-REFERENCE TO RELATED APPLICATION

This application is a continuation-in-part of U.S. application Ser. No. 07/489,243, filed Mar. 5, 1990, now U.S. Pat. No. 5,056,058, issued Oct. 8, 1991.

BACKGROUND OF THE INVENTION

This invention relates to communication control equipment, and particularly to a high speed protocol processing apparatus for processing a layered communication protocol having a plurality of layers.

In general, when the layered communication protocol of a seven-layer OSI model is processed, a particular layer (for example, layer 2 or above) protocol is processed by hardware of high-speed LSIs, and the other-layer (layer 3 or above) protocol is processed by a general-purpose CPU using software.

The reason for this is that the communication protocol processing is complicated, and the protocol processor is required to have a general-purpose applicability for various different protocols and a flexibility for application to various different network environments.

In other words, heretofore, it was difficult to process a complicated communication protocol by hardware having a general-purpose applicability and flexibility.

One example of the system for processing the layered communication protocol at high speed is proposed in, for example, JP-A 62-117050, in which a protocol processor is provided for each layer so that a layered protocol is processed by a pipe-line system, thereby achieving a high throughput.

In the above protocol processor, a plurality of microprocessors are used so that one protocol processor processes one-layer protocol. In addition, the operation of each microprocessor is controlled by a microprogram down-loaded from an external device.

According to the conventional protocol processor, however, although a high throughput can be obtained as compared with the processor for processing all layers using a single microprocessor, it is difficult to greatly reduce the protocol processing time because the protocol of each layer is processed by one processor for each layer in a software manner.

SUMMARY OF THE INVENTION

Accordingly, it is an object of the invention to provide novel communication control equipment capable of carrying out communication protocol processing at high speed.

It is another object of the invention to provide a communication protocol processor capable of high speed operation.

It is still another object of the invention to provide a communication protocol processor comprising a plurality of processors having excellent general-purpose applicability and flexibility.

In order to achieve the above objects, this invention proposes communication control equipment including a computer interface connected to a host computer, a network interface connected to a network for the transmission and reception of communication data between the network interface and the network, a buffer memory connected between these interfaces for temporarily storing communication data, and a processor for carrying out the protocol processing of the communication data, characterized in that the communication control equipment has separately provided therein a data path in which the transmitted and received data flow, and a control path in which protocol control information flows.

According to another feature of the invention, the communication protocol processing is divided into normal data transfer processing (the first category of protocol processing) in which high-speed processing is required and in which the contents of processing are relatively simple, and connection control and data transfer abnormality occurring processing (the second category of protocol processing) in which a general-purpose applicability and flexibility are required and in which the contents of processing are relatively complicated.

The communication control equipment and communication protocol processor according to this invention include a first processor portion of hardware for executing the first category of protocol processing, and a second processor portion for executing the second category of protocol processing in a software manner. The second processor portion operates as a backend processor for the first processor portion. The first processor portion may be comprised of a plurality of data transfer units of hardware provided for respective layers. In this case, between the data transfer units for respective layers are provided, for example, interfaces which are formed of FIFOs provided for different data transfer directions.

According to the communication control equipment of the invention, when normal data transmission occurs, the control flow is from the computer interface→the first processor portion→the network interface (which is reversed when data from the network is received), and when normal data transmission is not made, the control flow is from the computer interface→the first processor portion→the second processor portion→the first processor portion→the network interface (which is reversed when data from the network is received).

According to the arrangement of the invention, high speed processing is possible since normal data transfer processing is performed by exclusive-use hardware, and the connection control processing and data transfer abnormality processing can be made with a general-purpose applicability and flexibility since they are performed by software. Also, since the exclusive-use hardware (the first processor portion) is used only for the normal data transfer processing which needs relatively simple control, the number of parts to be used is small.

The foregoing and other objects, advantages, manner of operation and novel features of the present invention will be understood from the following detailed description when read in connection with the accompanying drawings.

BRIEF DESCRIPTION OF THE DRAWINGS

FIGS. 5A to 5F are diagrams of typical packet formats of transport protocol.

FIGS. 6A and 6B are diagrams of typical packet formats of CLNP and LLC protocol.

FIG. 9 is a diagram showing the functions of protocol processing assigned to the data transfer processor units and the backend processor in the protocol processor.

FIG. 54 is a diagram showing the state in which the protocol header is processed by the pipe line system in the embodiment shown in FIG. 52.

DESCRIPTION OF THE PREFERRED EMBODIMENTS

Embodiments of this invention will be described with reference to the accompanying drawings.

First Embodiment

Figure 1:
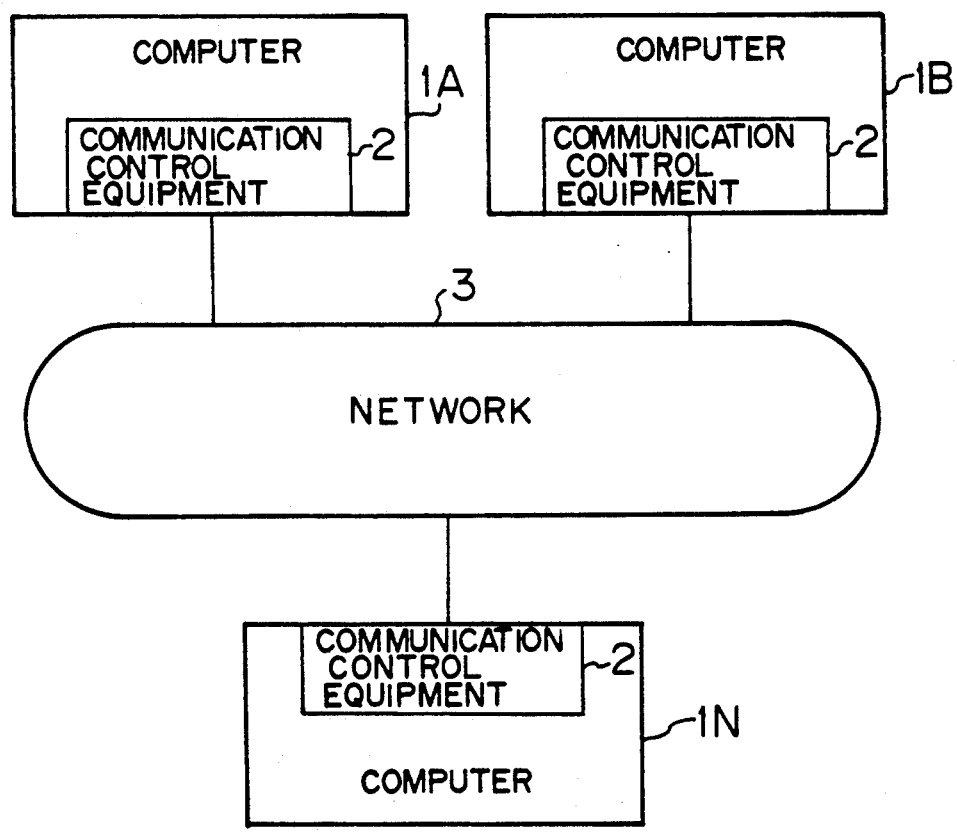
FIG. 1 is a construction diagram of a communication network system to which the communication control equipment of the invention is applied.

FIG. 1 shows one example of the arrangement of a communication network system using communication control equipment of this invention. A plurality of computers or stations 1 (1A to 1N) are connected through communication control equipment 2 to a network 3.

Figure 2:
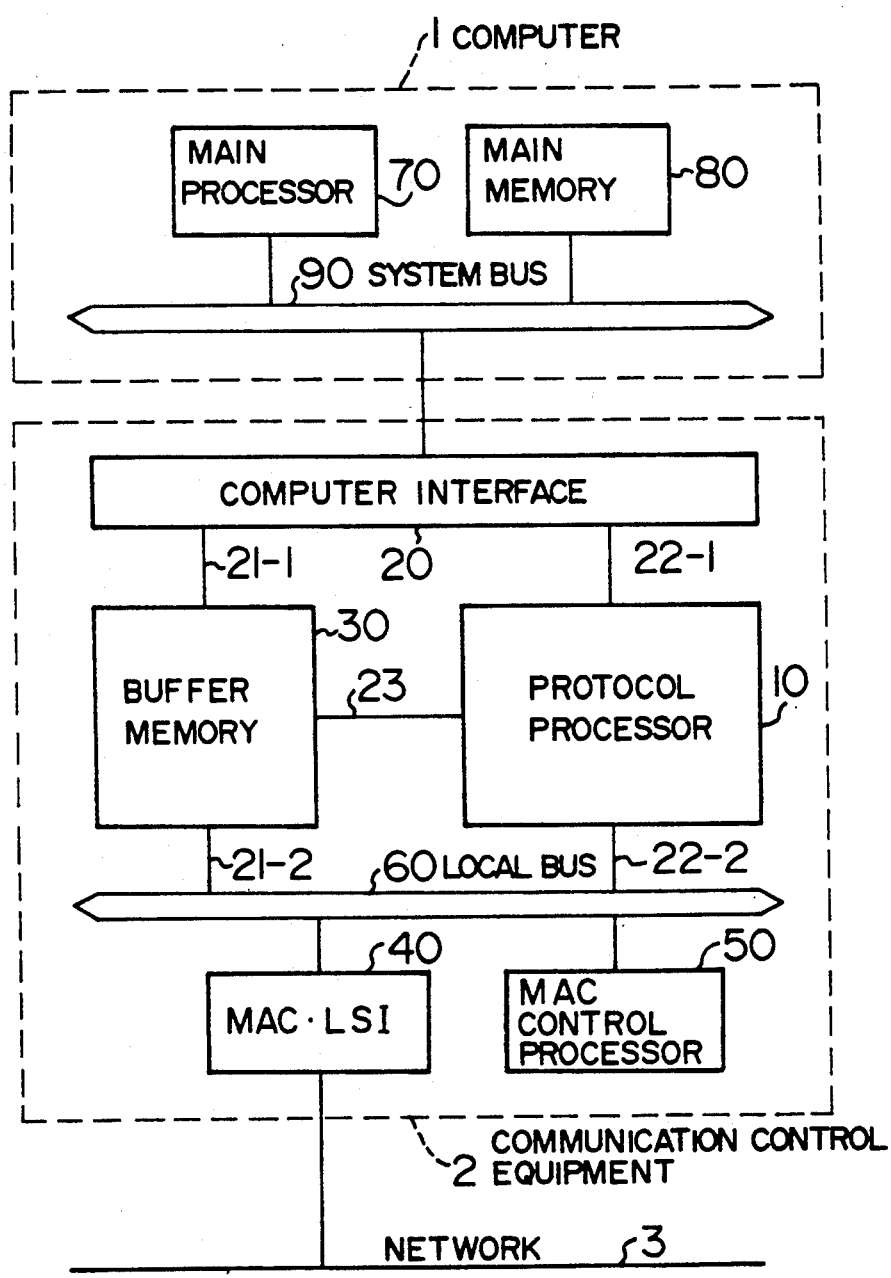
FIG. 2 is a block diagram of the construction of the communication control equipment 2.

FIG. 2 is a block diagram of the computer 1 and communication control equipment 2.

The computer 1 includes a main processor 70, a main memory 80 and a system bus 90 connecting the main processor and the main memory. The communication control equipment 2 includes a computer interface 20 which is connected to the system bus 90 so as to interface to the computer 1, a buffer memory 30 for storing transmitted data and received data, a protocol processor 10 for high speed processing of the communication protocol, a media access controller (MAC) LSI 40 for controlling the transmission and reception of data from and to the network 3, an MAC control processor 50 for control of the MAC LSI 40 and for providing the interface control between the MAC LSI 40 and the protocol processor 10, and a local bus 60.

The transmitted data, which is read from the transmission buffer region of the main memory 80 and supplied from the computer 1 to another computer, and the data received by the MAC LSI 40 from the network 3 are supplied through data path 21 (21-1, 21-2) to the buffer memory 30, where they are temporarily stored. The control signals requesting the transmission from the computer 1 to the protocol processor 10 and indicating the reception or the like (hereinafter, referred to as the primitive) from the MAC control processor 50 to the protocol processor 10 are transmitted through primitive path 22(22-1, 22-2). The protocol processor 10, when it receives the primitive from the primitive paths 22, makes access to the protocol control information (hereinafter, referred to as the protocol header) stored in the buffer memory 30, through a path 23, and executes the protocol processing.

In the communication control equipment 2 of this invention, or order to simultaneously transfer data between the communication control equipment and the main memory 80 of the computer 1, transfer data between the communication control equipment and the network 3 and access the protocol header by the protocol processor 10, the buffer memory 30 for temporarily storing the transmitted and received data is constructed to have three ports, and the path 21 (21-1, 21-2) through which data flows is separated from the path 22 (22-1, 22-2) through which the primitive (control signals) flows.

The processing of the communication protocol which is executed by the main processor 70 and the protocol processor 10 in a sharing manner will be described with reference to FIG. 3.

Figure 3:
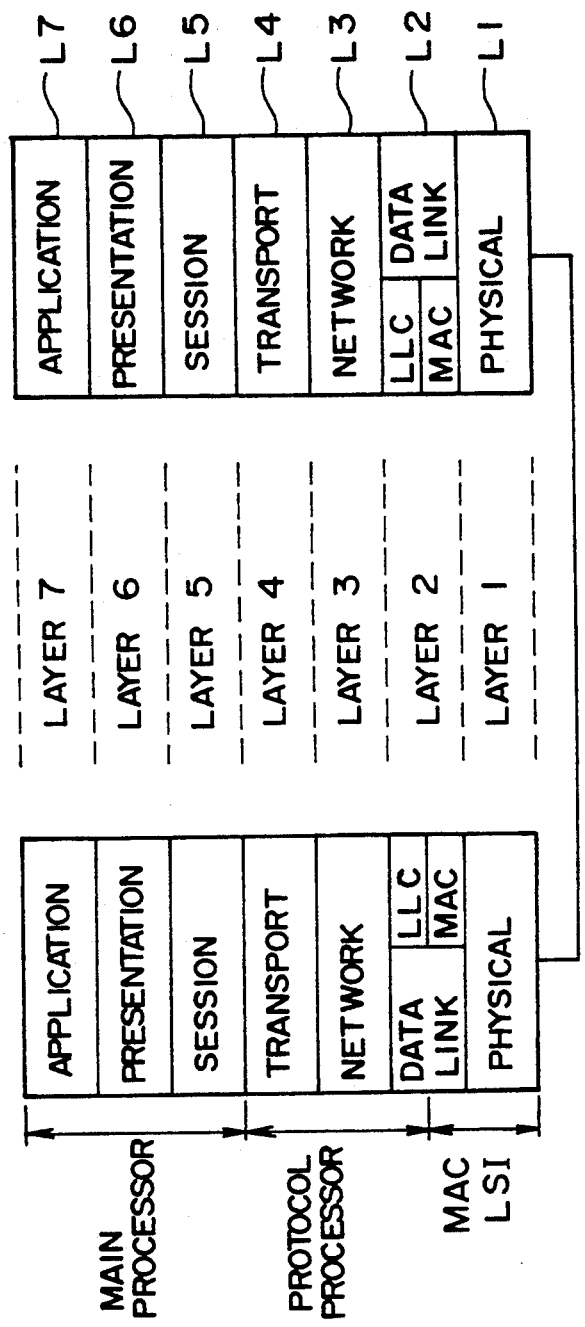
FIG. 3 is a diagram useful for explaining the layers in the communication protocol.

Each end system has a layered protocol of layer 1(L1) to layer 7(L7) as shown in FIG. 3. These layers of the layered protocol are, beginning with the lower layer, the physical layer L1, the data link layer (formed of the MAC sub-layer and LLC sub-layer) L2, the network layer L3, the transport layer L4, the session layer L5, the presentation layer L6 and the application layer L7.

In this invention, the protocol from the MAC sub-layer is processed by the MAC LSI 40 of LSI hardware capable of high-speed operation, the protocol from the LLC sub-layer of the data link layer L2 to the transport layer L4 is processed by the protocol processor 10, and the protocol from the session layer L5 and above is processed by the main processor 70 of the computer 1. In the embodiment of the invention, as will be described below, as a specific protocol, a logical link control type 1 (hereinafter, abbreviated LLC(T1)) is used for the data link layer L2, a connectionless type network protocol (hereinafter, abbreviated CLNP) is used for the network layer L3, and an OSI transport protocol class 4 (hereinafter, referred to as the transport protocol) is used for the transport layer L4.

Figure 4:
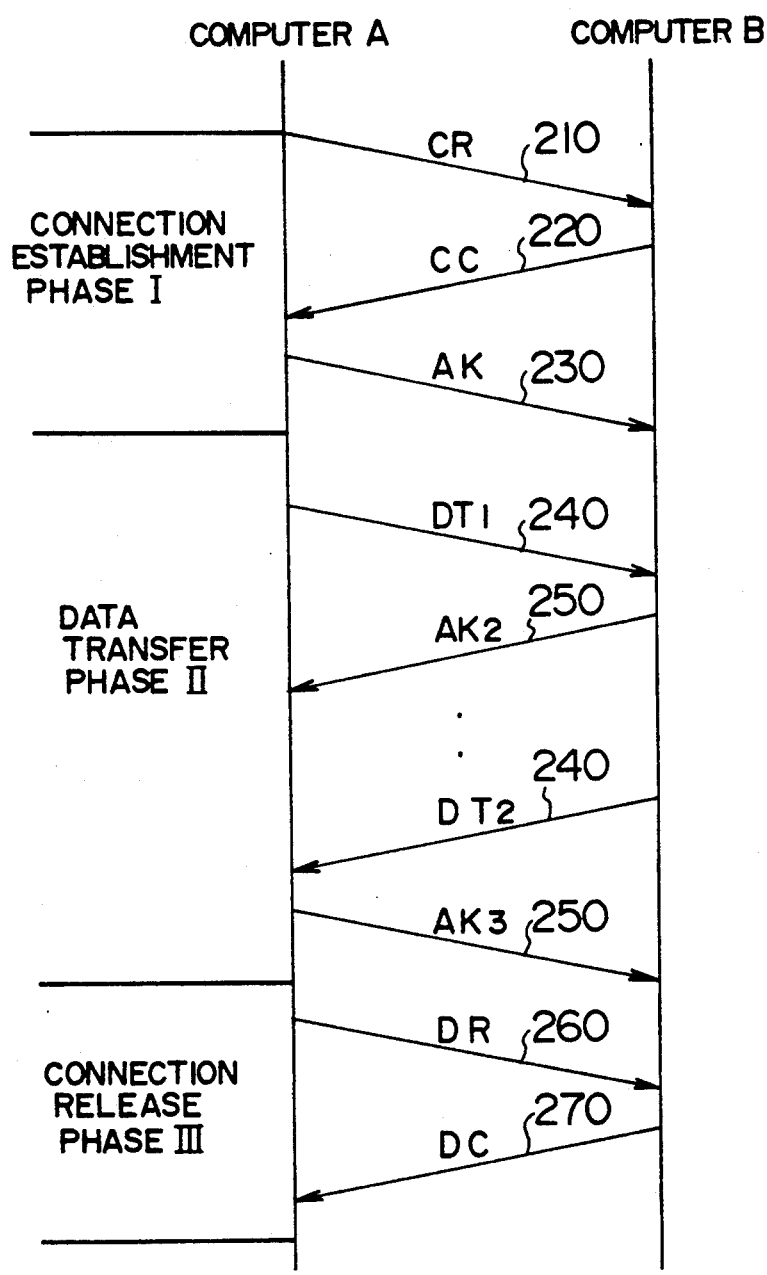
FIG. 4 is a diagram useful for explaining the processing sequence of the transport protocol L4.

FIG. 4 shows a sequence of the transport protocol for the case of data transfer between the computers A and B. This sequence is formed of three phases: a connection establishment phase I, a data transfer phase II, and a connection release phase III.

In the connection establishment phase I, a packet CR indicative of a connection establishment request is transmitted from one computer A to the other computer B (step 210), the computer B which has received this request transmits a packet CC indicative of a connection establishment response back to the computer A (step 220), and the computer A which has received the packet CC transmits a confirmation packet AK (step 230), thus the connection being established. Then, the data transfer phase II is brought about.

In the data transfer phase II, when a data packet DT is transmitted from one computer (step 240), the other computer which has received the packet DT transmits the response packet AK back to the one computer (step 250). In this case, on the computer which has transmitted the packet DT, a response monitor timer is started to monitor the reception of the packet AK transmitted back to the opponent computer in response to the packet DT. If the response monitor timer receives the packet AK before timeout, it is stopped. When the response monitor timer makes timeout, the packet DT is again transmitted.

Each DT packet is added with a transmission order number, and each AK packet is added with a transmission order number which the next DT packet expected to be received is to have. When the packet DT is transmitted 240, the DT packet can be successively transmitted before reception the AK packet as long as the order number is within a predetermined number (hereinafter, referred to as the window size). On the transmitting side computer, the window size value is decreased each time it transmits the DT packet, and increased such time it receives the AK packet. When the window size value becomes zero, a new DT packet is prevented from transmitting until the AK packet from the opponent is received.

The control of the flow rate of transmitted data is called "flow control". In the transport protocol, the flow control is performed by use of, for example, three state variables of a transmission state variable VS, a window lower limit LWE and a window upper limit UWE. The transmission state variable VS indicates the order number to be added to the DT packet which is to be transmitted next, the window lower limit LWE indicates the order number of the DT packet which has been confirmed to transmit by the opponent, and the window upper limit UWE indicates the order number of the upper limit of the packet which can be transmitted before the reception of the AK packet. Each time the DT packet is transmitted, the transmission state variable VS is changed, and each time the AK packet is received, the window lower limit LWE and the window upper limit UWE are changed. When the transmission state variable VS and the window upper limit UWE are equal, the DT packet 240 is inhibited from transmission.

In the connection release phase III, one computer transmits a connection release packet DR (step 260), and the computer which has received the packet DR transmits a packet DC which approves the connection release (step 270).

The LLC (T1) and CLNP protocol L3 have no connection establishment/release control or and flow control in the transport protocol, but have only the function of transferring user data.

FIGS. 5A to 5F show the formats of typical packets (CR, CC, DT, AK, DR and DC) in the transport protocol. FIGS. 6A and 6B show the format of the data packet DT in the CLNP protocol, and the format of the data from UI in the LLC (T1) protocol, respectively.

Figure 7:
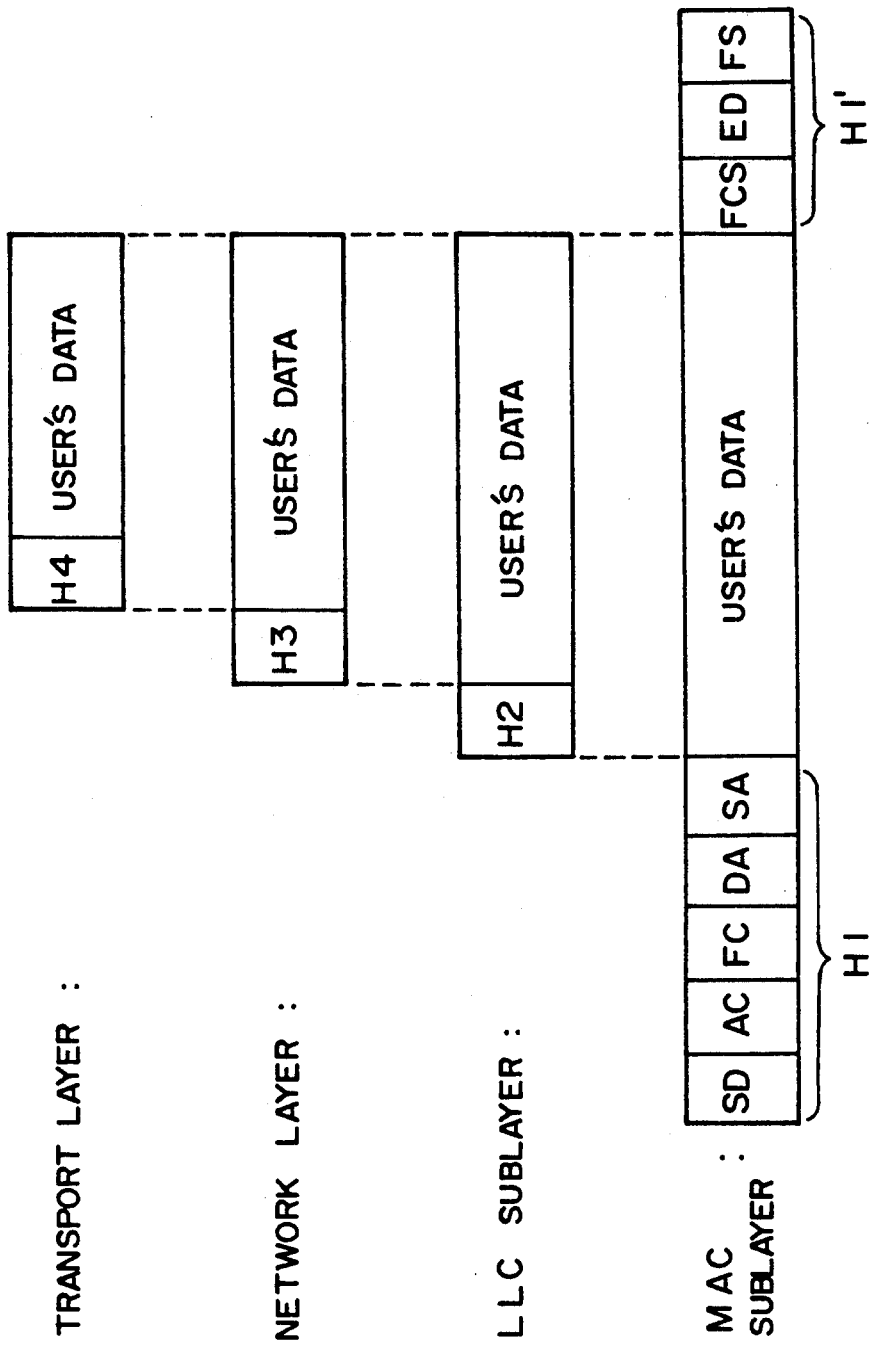
FIG. 7 is a diagram showing the manner in which a plurality of protocol headers are added to user data.

FIG. 7 shows protocol headers H4 ("CR" to "DC" shown in FIGS. 5A to 5F), H3 ("DT" shown in FIG. 6A) ("UI" shown in FIG. 6B), H2, H1 (H1') which are added in turn as the protocol processing in the layered protocol advances from the highest layer (transport layer) to the lowest layer (MAC sub-layer).

Figure 8:
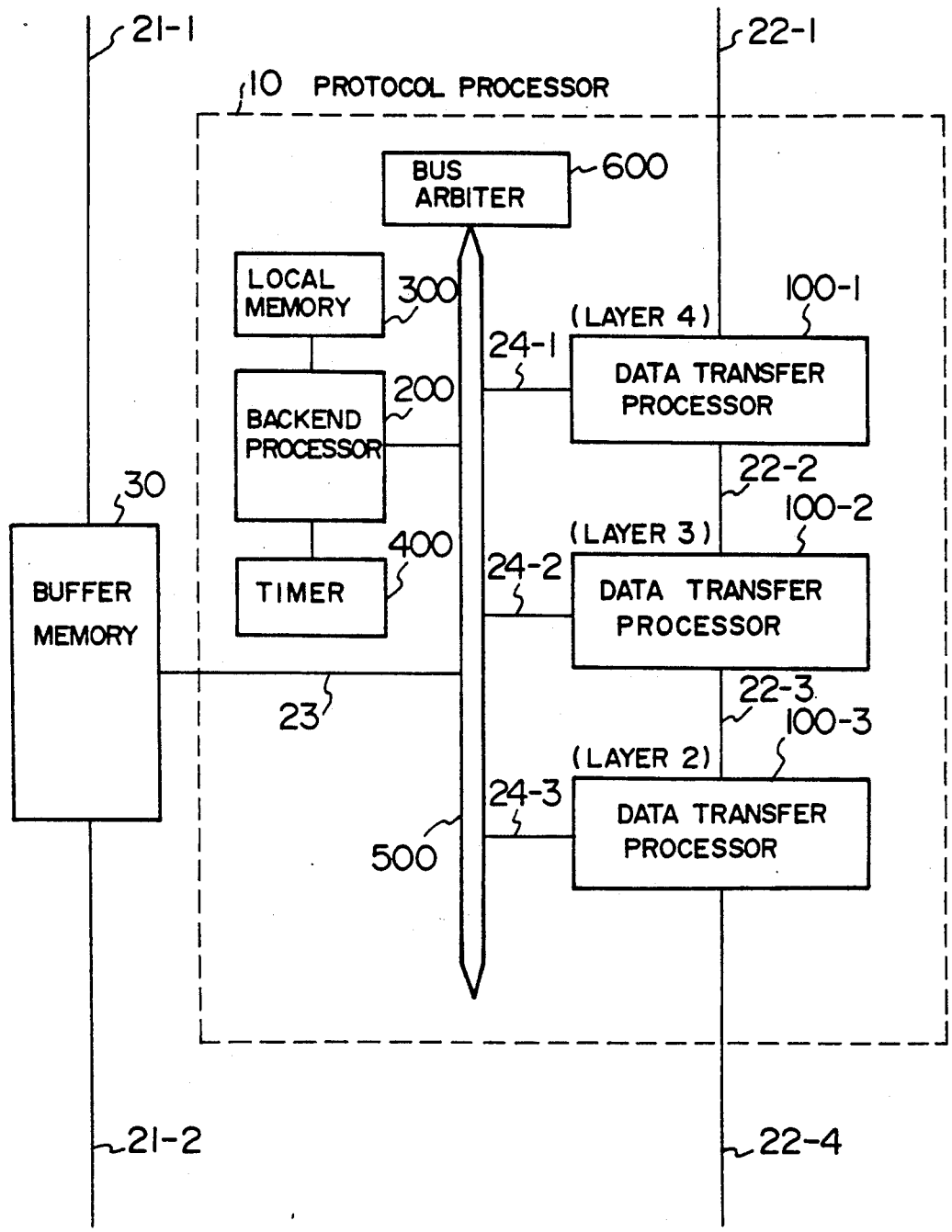
FIG. 8 is a block diagram of one embodiment of the protocol processor of the invention.

With reference to FIG. 8, a description will be given of one embodiment of the protocol processor 10 according to this invention which can process the communication protocol from the data link layer (LLC sub-layer) to the transport layer at high speed.

The protocol processor 10 includes a plurality of data transfer processor units 100 (100-1 to 100-3) of hardware having the function of protocol processing (header processing) for layers, a backend processor 200 which is provided with a local memory 300 and a timer 400 and executes the protocol processing in a software manner, an internal bus 500 connecting these processors and units, and a bus arbiter 600 for making arbitration of the internal bus 500. The plurality of data transfer processor units 100 are connected by a primitive path 22 (22-1 to 22-4) which is provided separately from the internal bus 500, so that the primitive between the protocol layers is transmitted and received through the primitive path 22. Moreover, since the internal bus 500 is connected to the buffer memory 30, the data transfer processor units 100 and the backend processor 200 can make access to the protocol headers stored in the buffer memory 30, through the internal bus 500.

According to this invention, the protocol of each layer can be processed by the data transfer processor units 100 and the backend processor 200 in a sharing manner as described below.

FIG. 9 shows the functions shared between the data transfer processor units 100 and the backend processor 200 in the protocol processor 10. In the transport protocol, the header processing (header generation/header analysis) FU2 and the status management FU3 in the normal data transfer are performed by the data transfer processor unit 100-1 in a hardware manner, and the connection control FU1, timer control FU4, abnormal processing FU5 and buffer management FU12 are performed by the backend processor 200 in a software manner. In the CLNP and LLC protocol, the normal data transfer processing FU6, FU9 is performed by the data transfer process units 100-2, 100-3, respectively. The abnormal processing FU7 and FU10, the frame processing FU8 and FU10 such as error notice frame, other than data, and the buffer management FU12 are executed by the backend processor 200.

The operation of the protocol processor 10 will be described.

Figure 10:
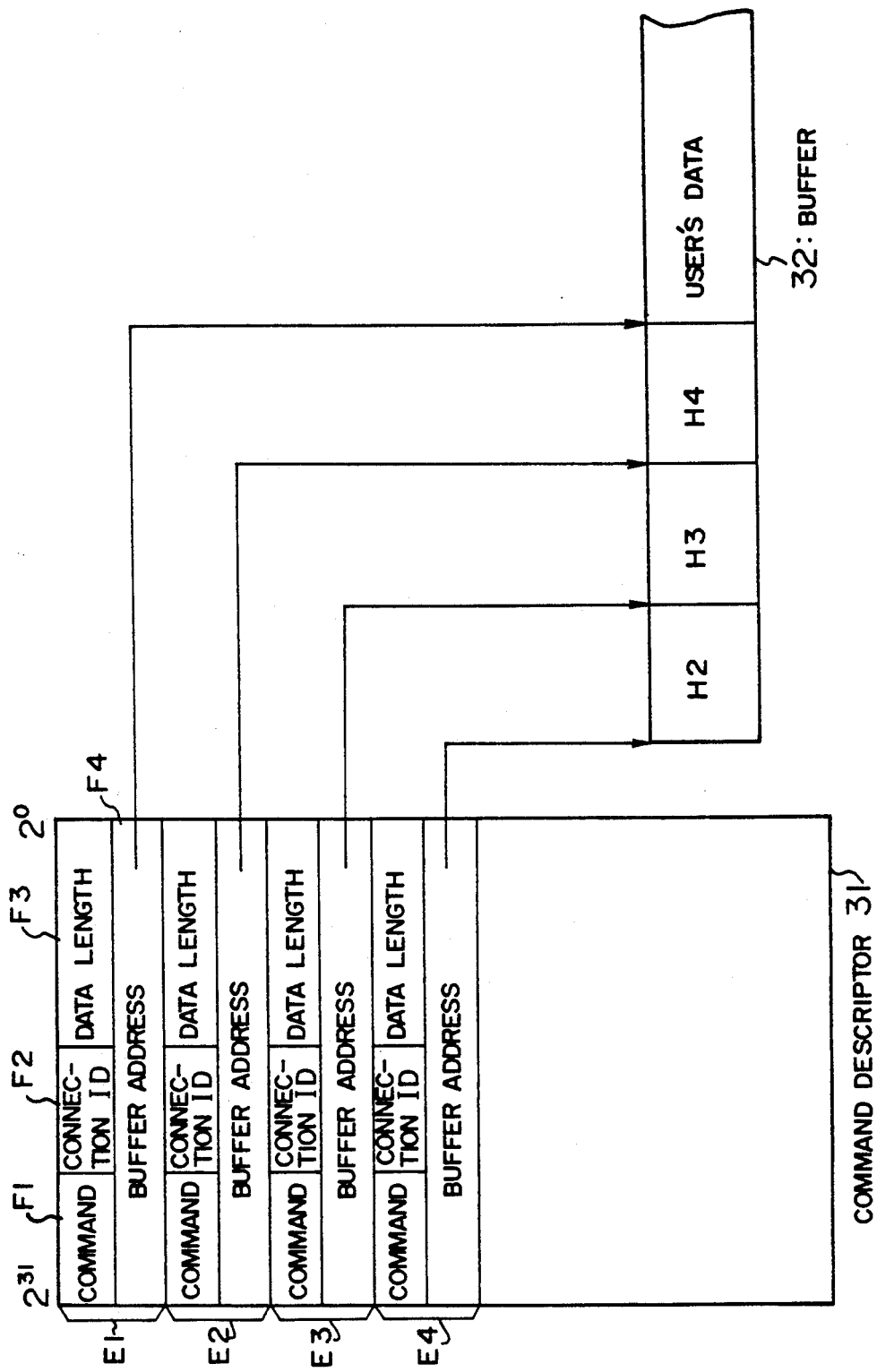
FIG. 10 is a diagram showing the relation between the command descriptor and the buffer.

FIG. 10 shows the relation between the format of a command descriptor 31 for defining the primitive indicative of the operation to the protocol processor 10 and a transmission and reception buffer 32 in which transmitted and received data are stored. The command descriptor 31 and the transmission and reception buffer 32 are defined in the buffer memory 30.

The command descriptor 31 has four entries E1 to E4 of command field F1, connection identification field F2, data length field F3 and buffer address field F4. These entries are selectively used by the interface between the layers. In other words, the first entry E1 is used for interface between the computer 1 and the transport layer L4, the second entry E2 is used for the interface between the transport layer L4 and the network layer L3, the third entry E3 is used for the interface between the network layer L3 and the data link layer L2, and the fourth entry E4 is used for the interface between the data link layer L2 and the MAC control processor.

In each command field F1 is set a command which indicates the primitive between layers.

For example, the command from the computer 1 to the transport layer includes the connection establishment request for transmission of the CR packet, the connection establishment response for the transmission of the CC packet, the connection release request for the transmission of the DR packet, and the data transmission request for the transmission of the DT packet.

Each of the command from the transport layer L4 to the network layer L3, the command from the network layer L3 to the data link layer L2 and the command from the data link layer L2 to the MAC control processor 50 include only the data transmission request.

The command from the MAC control processor 50 to the data link layer L2 includes a data reception notice and the data transmission completion notice.

Each of the command from the data link layer L2 to the network layer L3 and the command from the network layer L3 to the transport layer L4 include only the data reception notice.

The command from the transport layer L4 to the computer 1 includes the connection establishment notice indicating the reception of the CR packet, the connection establishment completion notice indicating the reception of the CC packet, and the data reception notice indicating the reception of the DT packet.

The data length field F3 and the buffer address field F4, respectively, indicate the data length in each layer and the head address of data.

The transmission operation of the high-speed protocol processor apparatus 10 will be described.

The main processor 70 within the computer 1, when supplying a command of, for example, a data transmission request to the protocol processor 10, previously writes transmission data in the transmission buffer region of the buffer memory 30, sets parameters of a command code, connection identifying element, transmission data length and transmission buffer address in the fields F1, to F4 of the first entry E1 of the transmitting command descriptor 31 defined in the buffer memory 30, and then supplies the address information (hereinafter, referred to as CCID) indicating the head of the command descriptor 31 through the primitive path 22-1 to the protocol processor 10. The protocol processor 10 is actuated by the CDID. In other words, in this invention, the interface between layers is controlled by the transmission and reception of the CDID through the primitive path 22.

Figure 11:
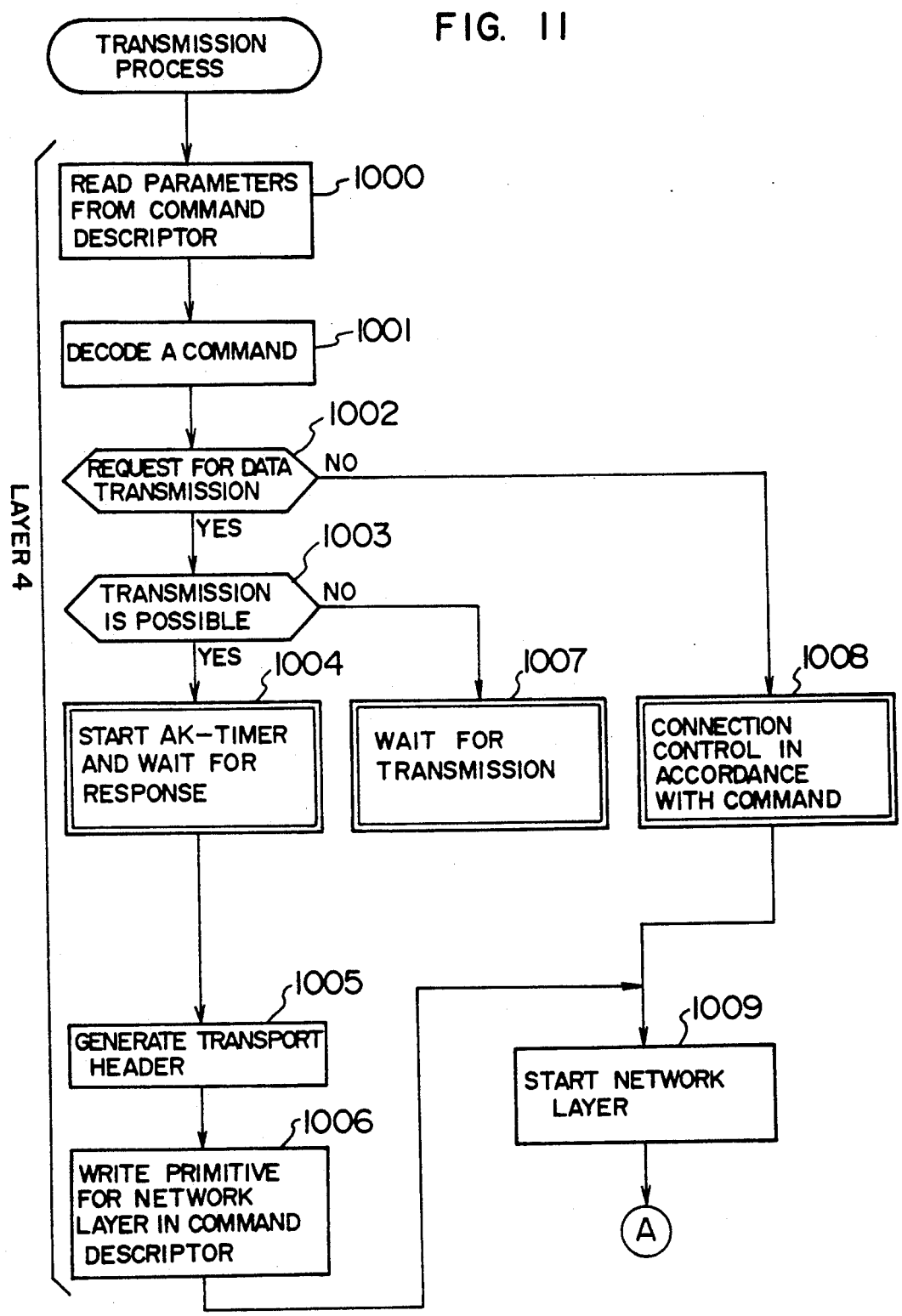
FIGS. 11 and 12 are flowcharts of the transmission operation of the protocol processor.
Figure 12:
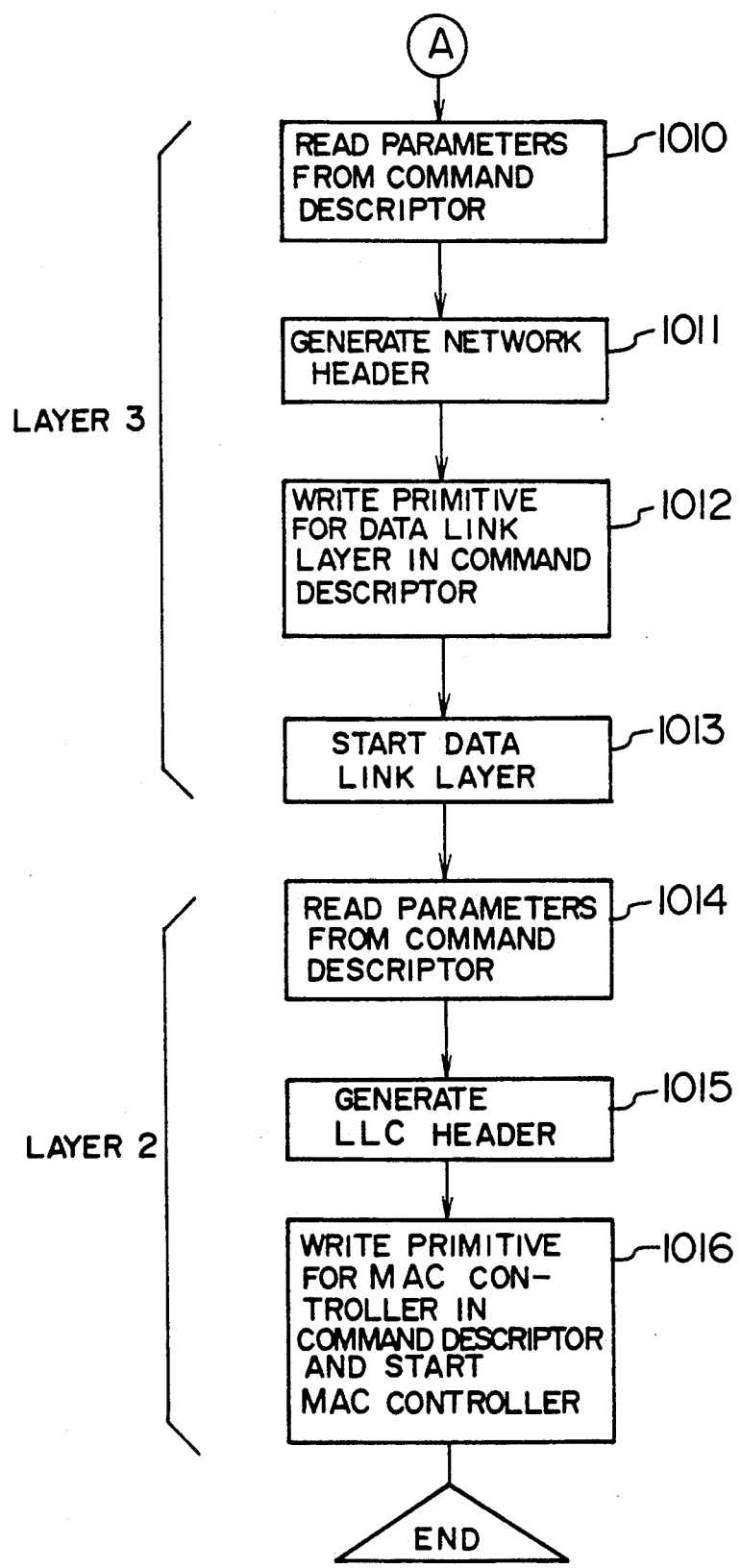

FIGS. 11 and 12 are flowcharts for the transmission operation of the protocol processor 10. The double blocks indicate the processing steps which the backend processor 200 executes.

The transmission request from the computer 1 is first supplied in the form of CDCI to the data transfer processor unit 100-1 of the transport layer. The data transfer processor unit 100-1 reads parameters from the first entry E1 of the command descriptor 31 specified by the CDID supplied through the primitive path 22-1 (step 100), and analyzes the command in the command field F1 (step 1001).

When the command is not a data transmission request (step 1002), or when it is, for example, connection establishment request, connection release request or connection establishment response, the data transfer processor unit 100-1 supplies the input CDID through the bus interface 24-1 to the backend processor 200, and the backend processor 200 carries out the connection control processing associated with the command by software (step 1008). In accordance with this invention, the request for processing from the data transfer processor unit 100 to the backend processor 200 is realized by supplying the CDID received from a higher-order layer, or the lower-order layer, to the backend processor 200 through the bus interface 24 from the data processor unit 100.

When the command is a data transmission request, the data transfer processor unit 100-1 decides whether data can be transmitted or not, in accordance with the flow control operation (step 1003). When the data cannot be transmitted, the data transfer processor unit 100-1 requests that the backend processor 200 perform a transmission waiting processing (step 1007). If the data can be transmitted, it requests that the backend processor 200 start the response monitor timer (AK-timer) and carry out the response waiting processing of transmission data (step 1004). Then, the transport header is generated in the buffer memory 30 (step 1005), the primitive to the network layer is generated in the second entry E2 of the command descriptor 31 (step 1006), and the CDID is supplied through the primitive path 22-2, thereby starting the data transfer processor unit 100-2 of the network layer (step 1009).

When receiving the CDID from the transport layer (data transfer processor unit 100-1), the data transfer processor unit 100-2 for making the protocol processing of the network layer reads parameters from the second entry E2 of the command descriptor specified by the CDID as shown in FIG. 12 (step 1010), the protocol header is generated in the region specified by the buffer address field F4, in the buffer memory 30 (step 1011), the primitive to the data link layer is generated in the third entry E3 of the command descriptor 31 (step 1012), and then the CDID is supplied through the primitive path 22-3, thereby starting the data transfer processor unit 100-3 of the data link layer (step 1013).

The data transfer processor unit 100-3 of the data link layer first generates the LLC header in accordance with the contents of the third entry E3 of the command descriptor 31 read from the buffer memory as in the network layer (steps 1014 and 1015). After the command to the MAC control processor 50 is generated in the fourth entry E4 of the command descriptor 31, the CDID is supplied through the primitive path 22-4, thereby starting the MAC control processor 50 (step 1016).

The MAC control processor 50 which has received the CDCI actuates the MAC LSI 40 in accordance with the command read from the fourth entry E4 of the command descriptor 31, whereby data including a header H2 to H4 is read from the buffer memory 30, and added to header H1, H1' to form a communication header which is then supplied to the network 3.

The data receiving operation of the protocol processor 10 will be described with reference to FIGS. 13, 14 and 15.

When receiving the data reception interrupt from the MAC LSI 40, the MAC control processor 50 sets parameters, such as the command code, received data length and received buffer address, in the fourth entry E4 of the receiving command descriptor 31 previously defined on the buffer memory 30, and transmits the CDID through the primitive path 22-4 to the protocol processor 10.

The reception notice from the MAC control processor 50 is first supplied to the data transfer processor unit 100-3 for a data link layer within the protocol processor 10.

Figure 13:
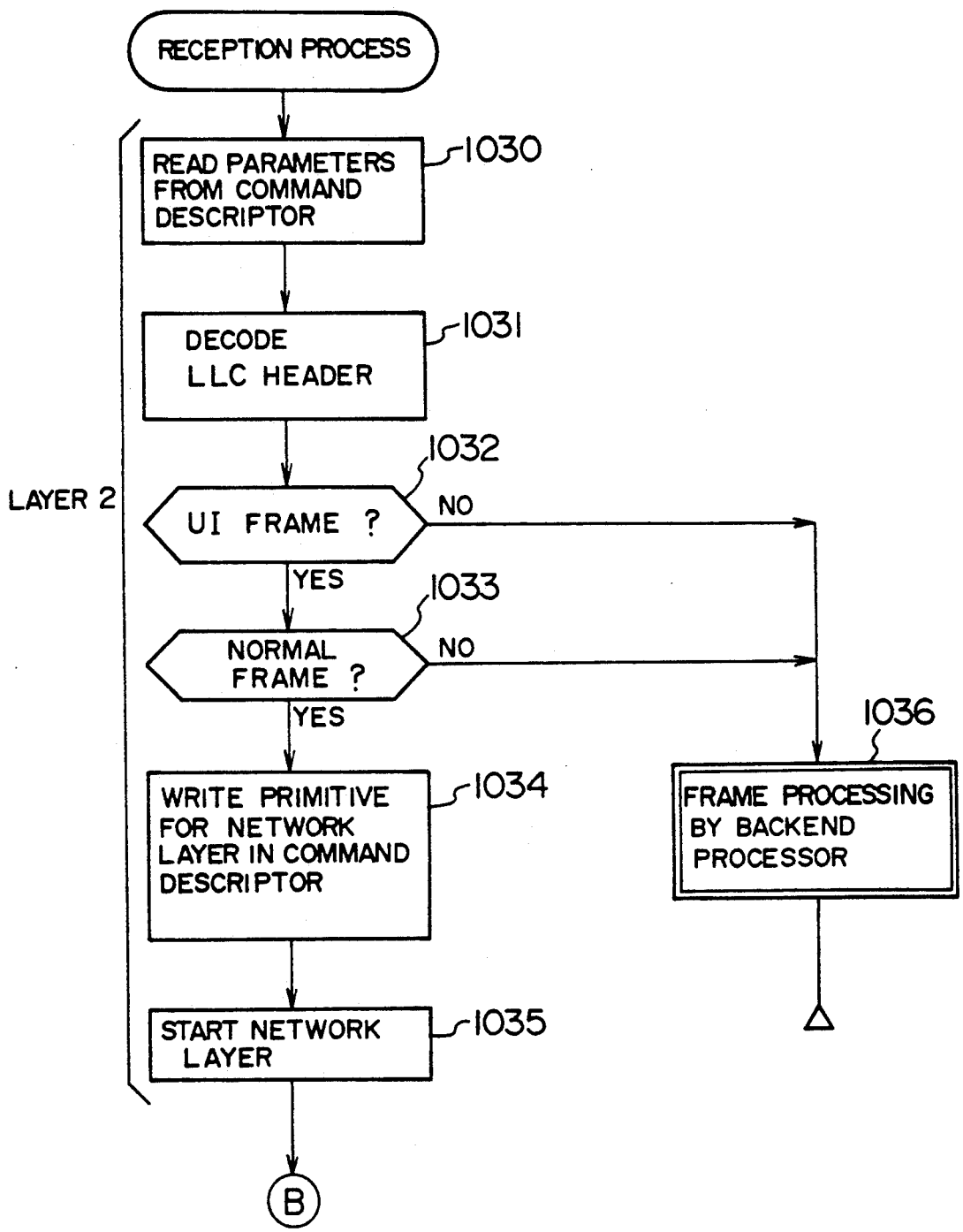
FIGS. 13, 14 and 15 are flowcharts of the reception operation of the protocol processor.

The data transfer processor unit 100-3, as shown in FIG. 13, reads parameters from the fourth entry E4 of the command descriptor 31 indicated by the CDCI supplied through the primitive path 22-4 (step 1030), and then reads the LLC header from the buffer address specified in the F4 field, analyzing it (step 1031). When the received data frame type is not the UI frame (step 1032), or when the UI frame is found to be abnormal (step 1033), the backend processor 200 is requested to perform the reception processing of the frame (step 1036).

If the LLC header is the UI frame, and if the UI frame is normal, the data transfer processor unit 100-3 generates the primitive to the network layer in the third entry E3 of the command descriptor 31 (step 1034), and supplies the CDID previously received from the primitive path 22-4 to the primitive path 22-3, thereby starting the data transfer processor unit 100-2 of the network layer (step 1035).

Figure 14:
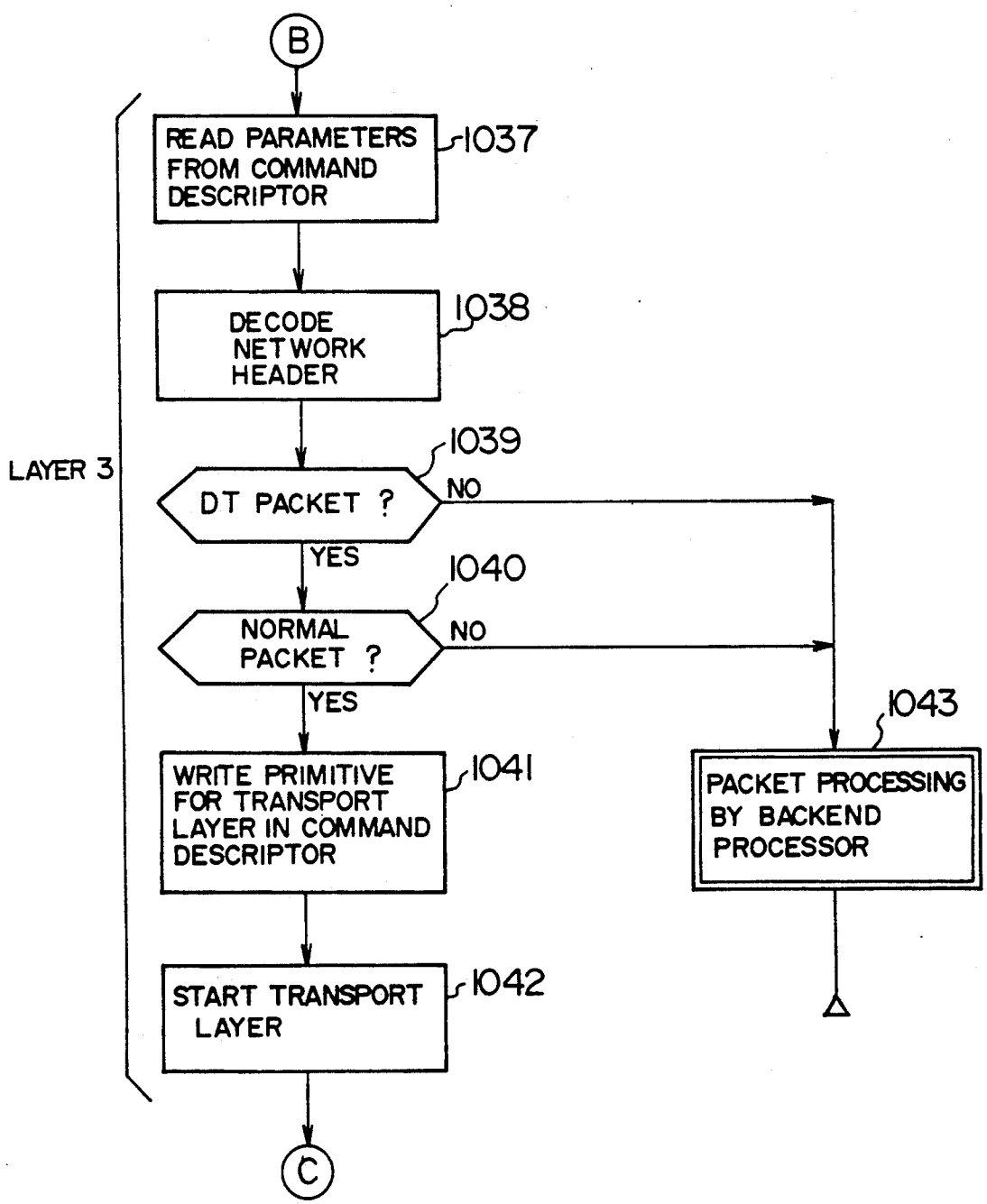

The data transfer processor unit 100-2 of the network layer, when receiving the CDID from the data link layer, as shown in FIG. 14, reads parameters from the third entry E3 of the command descriptor 31 in the buffer memory and checks the network header, as does the data transfer processor unit 100-3 of the data link layer (steps 1037 to 100040). If the DT packet is normal, the primitive t the transport layer is generated in the second entry E2 of the command descriptor 31 (step 1041), and then the CDID is supplied through the primitive path 22-1, thereby starting the data transfer processor unit 100-1 of the transport layer (step 1042).

Figure 15:
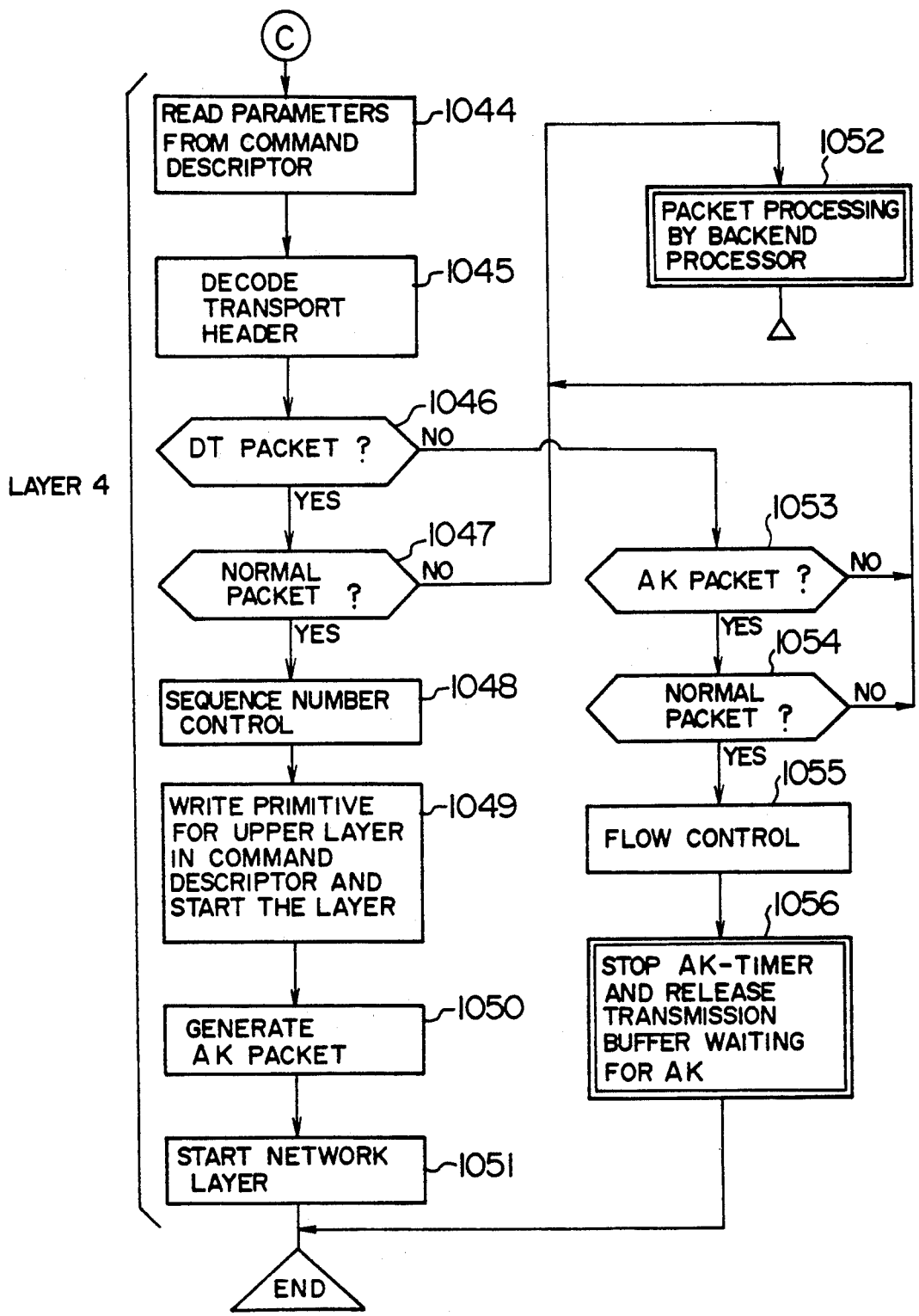

When receiving the CDID from the network layer, the data transfer processor unit 100-1 of the transport layer, as shown in FIG. 15, reads the second entry E2 of the command descriptor 31 (step 1044), and reads the transport header from the address specified in the field F4, analyzing it (step 1045).

When it is found that the kind of packet is other than a DT packet or AK packet as a result of the above analysis, or when the protocol header is found to be abnormal, the backend processor 200 is requested to receive the packet (step 1052). When the received packet is a normal DT packet, parameters such as a connection identification element, received data length and buffer address are generated in the first entry E1 of the command descriptor 31, and then the CDID is supplied through the primitive path 22-1, thereby notifying the main processor 70 of the computer 1 of data reception (step 1049). The data transfer processor unit 100-1 then generates the AK packet (step 1050), and supplies the CDID of the command descriptor for managing the AK packet through the primitive path 22-2, thereby requesting the network layer to transmit the AK packet (step 1051). At step 1052, if after executing the reception processing the computer requires to be notified of the processing result, the backend processor 200 sets parameters in the command descriptor and supplies the CDID to the data transfer processor unit 100-1. The processor unit supplies the CDID through the path 2-1 to the computer.

When the received packet is a normal AK packet, the data transfer processor unit 100-1 carries out the flow control processing (step 1055), and requests the backend processor 50 to stop the response monitor timer and initiate the release processing of the response waiting transmission buffer (step 1056).

Figure 16:
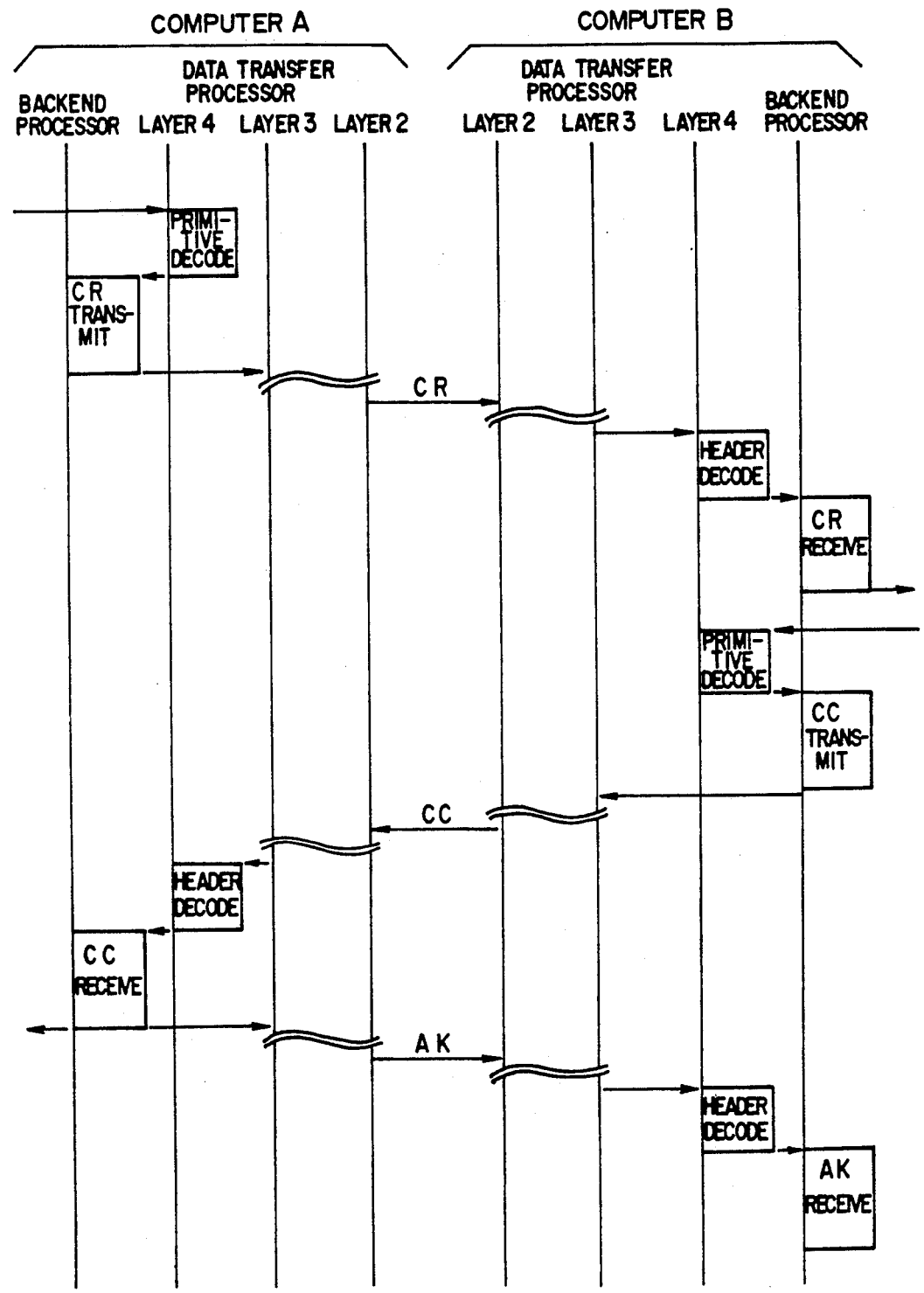
FIGS. 16, 17 and 18 are timing charts showing the operation of the protocol processor.
Figure 17:
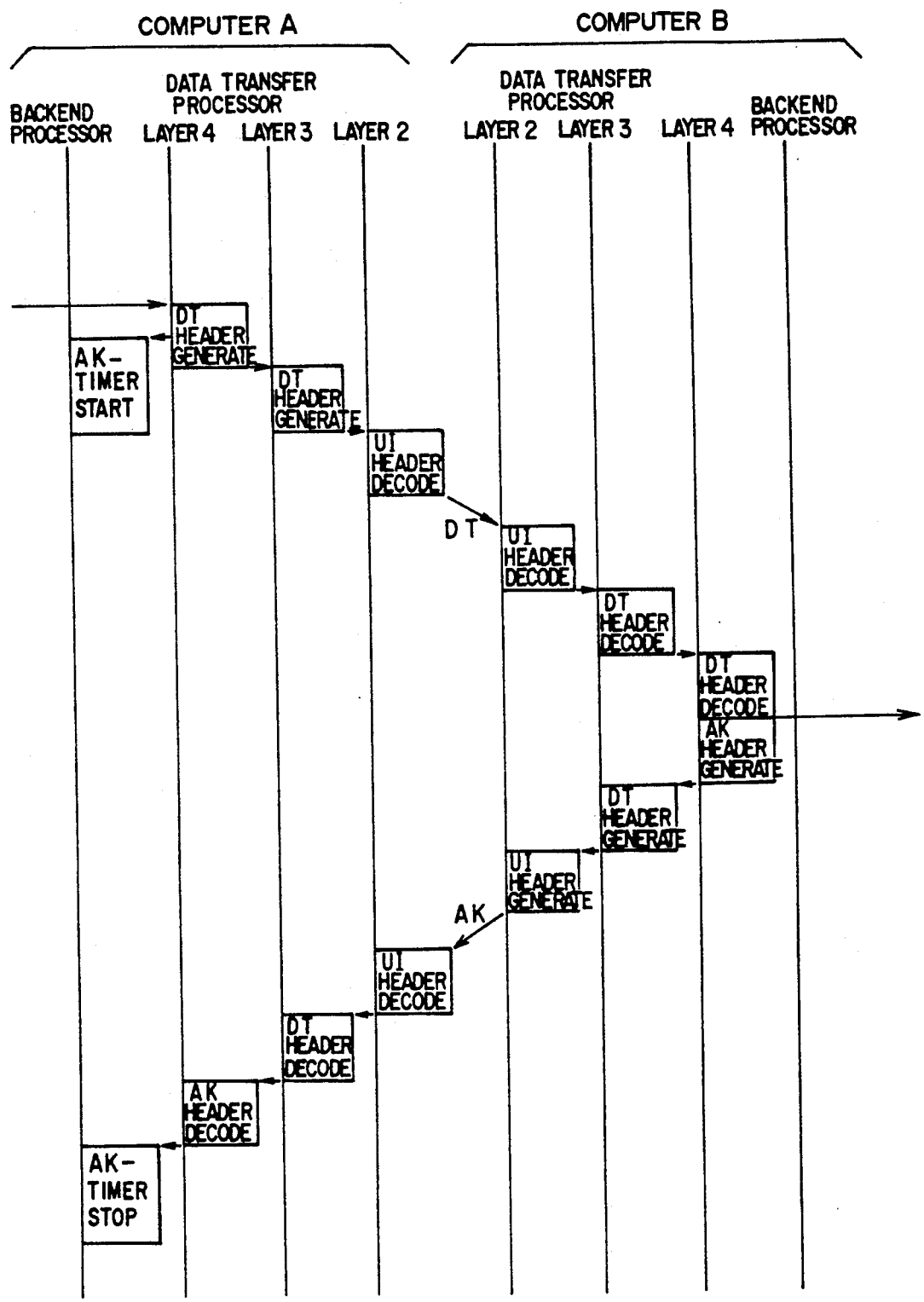
Figure 18:
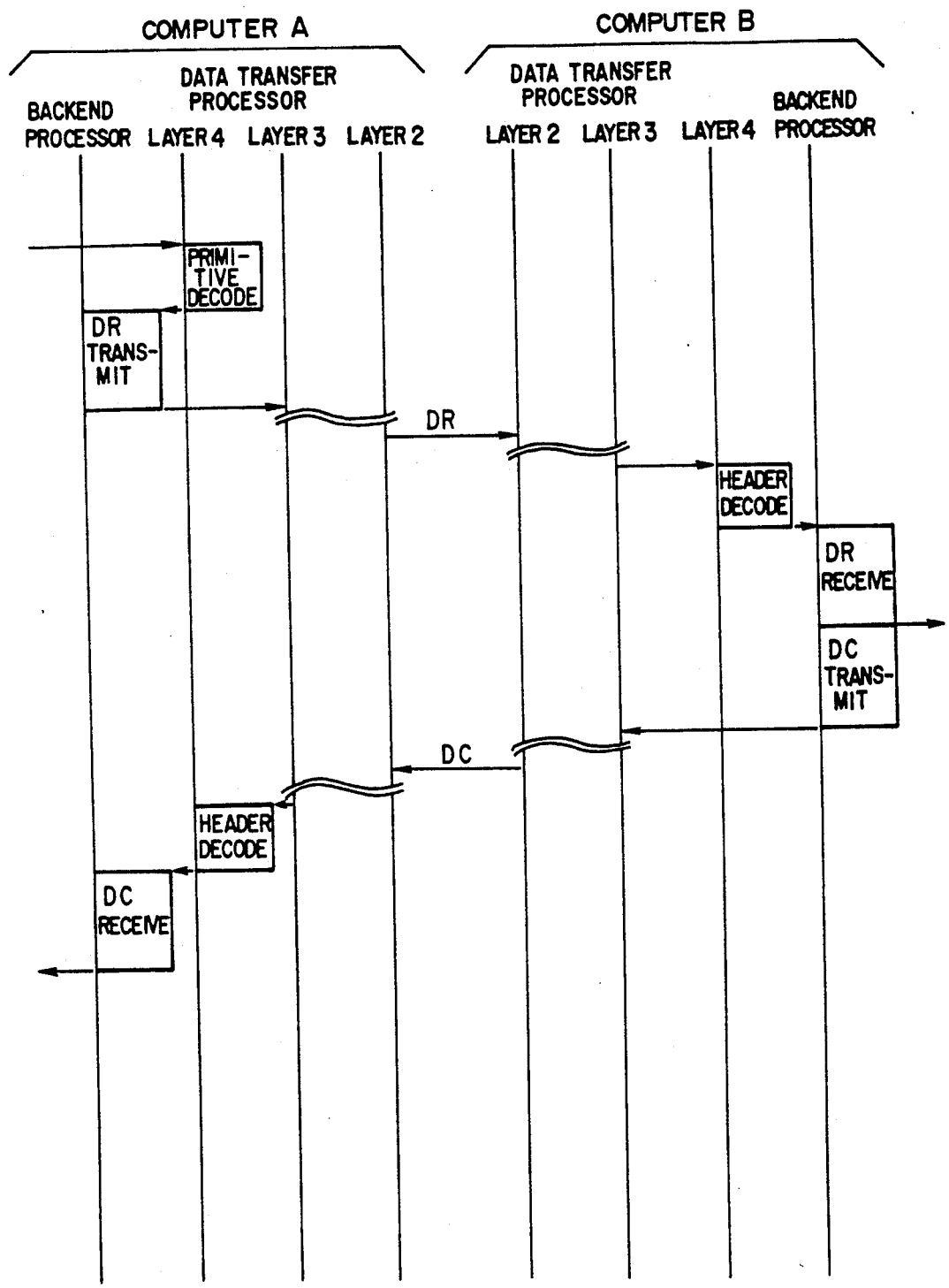

FIGS. 16, 17 and 18 are timing charts of the operation of the protocol processor 10 at the time of executing the transport protocol, protocol and LLC protocol.

In the connection establishment phase I, as shown in FIG. 16, the data transfer processor unit 100 analyzes the command from a higher layer and the protocol header at the time of data reception from the network, and the backend processor 200 executes the following processing.

In the data transfer phase II, as shown in FIG. 17, the data transfer processor unit 100 executes the processing of the protocol header associated with the normal data transfer, and the backend processor 200 executes the timer control and the processing of the abnormality.

In the connection release phase III, as shown in FIG. 18, the data transfer processor unit 100 analyzes the command from a higher layer and the protocol header at the time of data reception from the network and the backend processor 200 executes the following processing as in the connection establishment phase.

As described above, the communication control equipment of the invention is characterized in that the hardware circuits of the data transfer processor unit 100 treats the protocol header processing as the majority of the protocol processing associated with the normal data transfer processing.

The data transfer processor unit 100 (100-1 to 100-3) for high-speed processing of the protocol header associated with the normal data transfer will be described in detail.

Figure 19:
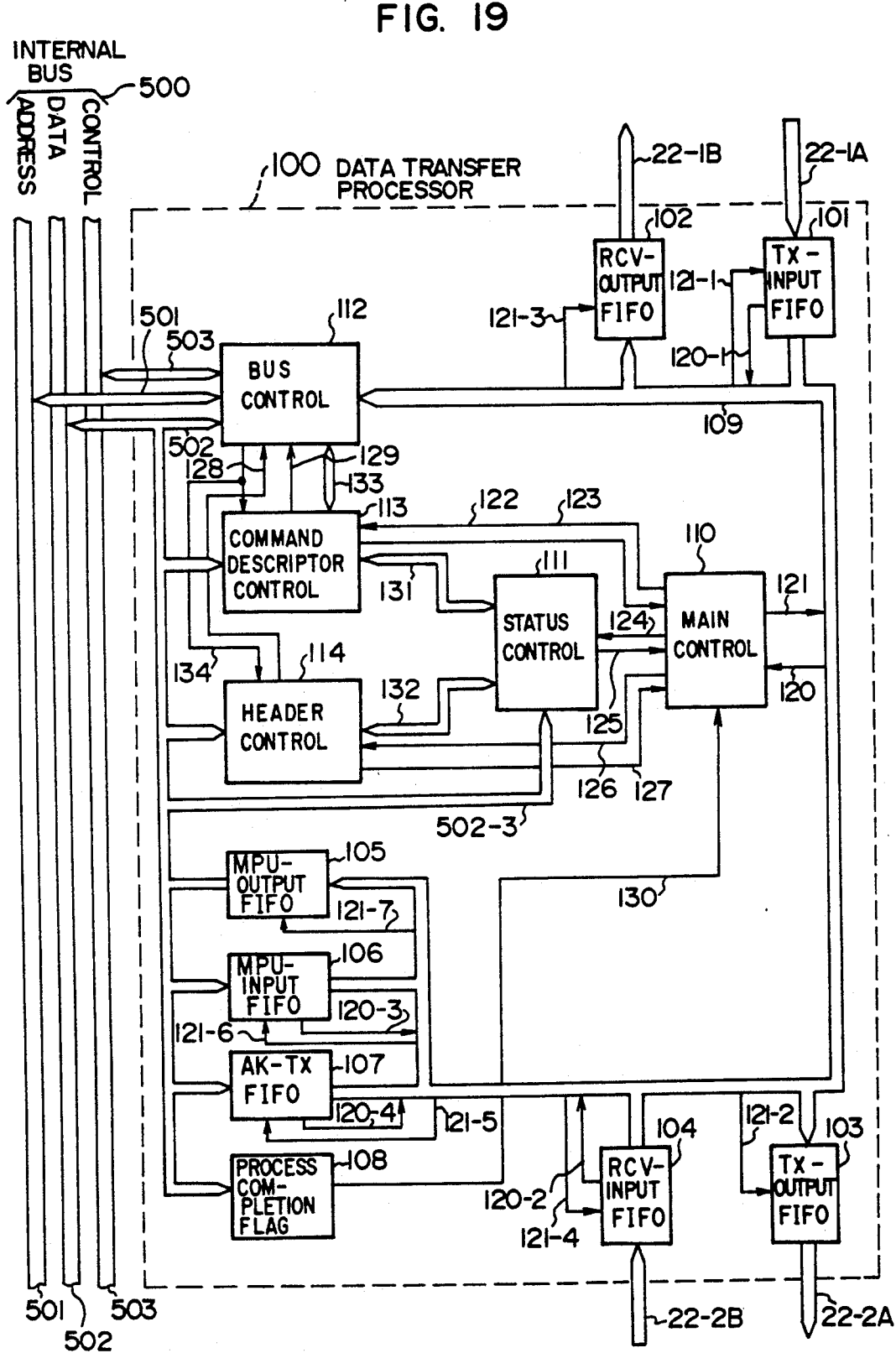
FIG. 19 is a detailed block diagram of the construction of the data transfer processor unit 100 shown in FIG. 8.

FIG. 19 is a block diagram of one example of the arrangement of the data transfer processor unit 100. The data transfer processor unit 100 includes a transmission input FIFO 101 for queuing the transmission request received from a higher layer, a received output FIFO 102 for queuing the reception request to a higher layer, a transmission output FIFO 103 for queuing to a lower layer, a reception input FIFO 104 for cuing the reception request from a lower layer, a processor output FIFO 105, a processor input FIFO 106, a bus control portion 112, a command descriptor control unit 113, a header control unit 114, a status control unit 111, an acknowledgment (AK) transmission FIFO 107, a process completion flag register 108 and a main control unit 110.

The processor output FIFO 105 acts to queue the command which is desired to be processed by the backend processor 200, and the processor input FIFO 106 acts to queue the command which is requested to be sent from the backend processor 200 to a higher layer or lower layer.

A plurality of the FIFO 101 to 106 constitute an interface between each data transfer unit, a higher layer, a lower layer and the backend processor 200.

The bus control portion 112 has the function of making the interface control between the internal bus 500 and the data transfer unit 100. The command descriptor processor 113 has the function of generating and analyzing the command descriptor mentioned. previously. The header control unit 14 has the function of generating and analyzing the protocol header. The status control unit 111 functions to generate and check the transmission order number and perform the status check for realizing the flow control. The acknowledgment transmission FIFO 107 is a hardware queue for queuing the buffer necessary for the transmission of the response packet accompanying the data reception. The process completion flag register 108 functions to store the flag indicating that the processing which the data transfer processor unit 100 has requested has been completed by the backend processor 200. This flag enables the data transfer processor unit 100 and the backend processor 200 to be synchronized with each other. The main control unit 110 functions to control each function block and control the whole operation.

A brief description will be made of the operation of the data transfer processor unit 100, for example, the processor unit 100-1 for processing the transport protocol. Upon transmission of data, the status control unit 111 decides whether data can now be transmitted or not. If it can be transmitted, the transmission order number to be added to the DT packet to be transmitted is generated and sent to the header control unit 114. The header control unit 114 assembles the transmission order number received from the status control unit 111 into a protocol header form to be added to the transmission packet and writes it in the buffer memory.

Upon receiving data, the header control unit 114 reads the protocol header from the buffer memory 30, and checks it. If the received protocol header has no error, the header control unit 114 supplies the transmission order number included in the protocol header, to the status control unit 111, and the status control unit 111 checks the order number.

Figure 20:
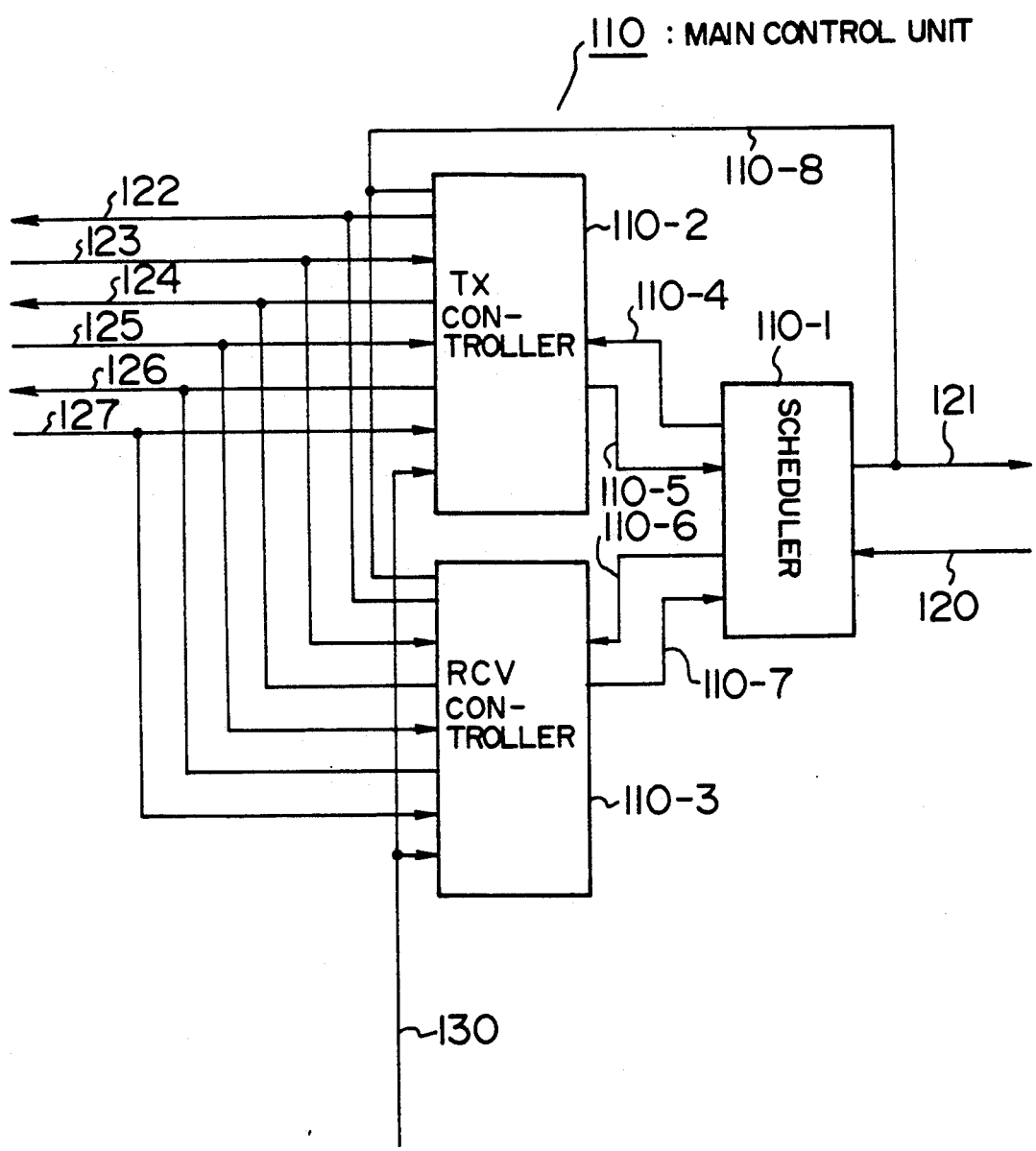
FIG. 20 is a detailed block diagram of the construction of the main control unit 110 shown in FIG. 19.

FIG. 20 is a block diagram which shows the construction of the main control unit 110 of FIG. 19 in more detail. The main control unit 110 includes a transmission controller 110-2 for controlling the transmission processing operation, a reception processing controller 110-3 for controlling the reception processing operation, and a scheduler 110-1 for detecting the start from a higher layer, lower layer and backend processor 200 and starts the transmission controller 110-2 or the reception processing controller 110-3. The operation of the main control unit 110 will be mentioned with reference to the flowcharts of FIGS. 21 to 29.

Figure 21:
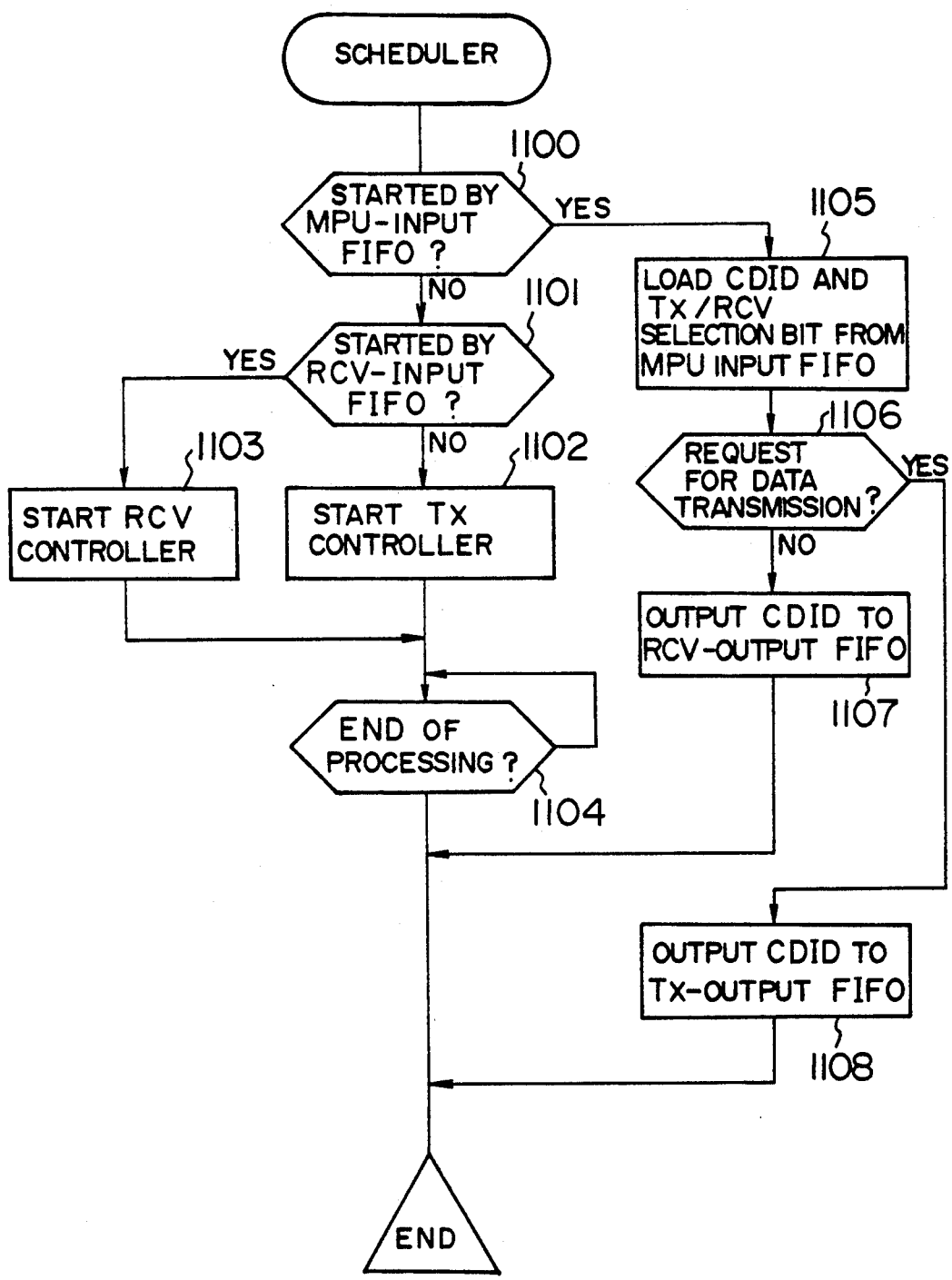
FIGS. 21 to 29 are flowcharts of the operation of the main control unit 110 shown in FIG. 19.

FIG. 21 is a flowchart of the operation of the scheduler 110-1. The scheduler 110-1 decides the source of start by use of an input detected signal 120.

If the source of start is the processor input FIFO 106 (step 1100), the CDID and the transmission/receiving selection bit are loaded from the processor FIFO 106 (step 1105), and then the command from the processor is decided (step 1106). If the command is a data transmission request, the CDID from the FIFO 106 is supplied to the transmission output FIFO 103, thereby issuing a data transmission request to the data transfer processor unit of a lower layer (step 1108). If the command is a notice request to a higher layer, the CDID from the FIFO 106 is supplied to the reception output FIFO 102, thereby sending a notice request to the data transfer processor unit of a higher layer (step 1107).

If the source of the start is the reception input FIFO, the reception processing controller 110-3 is started through a signal line 110-6 (step 1103), and the notice of completion of process from the reception processing controller through a signal line 110-7 is waited for (step 1104).

When the source of the start is the transmission input FIFO, the transmission processing controller 110-2 is started through a signal line 110-4 (step 1102) and the notice of completion of processing from the transmission processing controller through a signal line 110-5 is waited for (step 1104).

Figure 22:
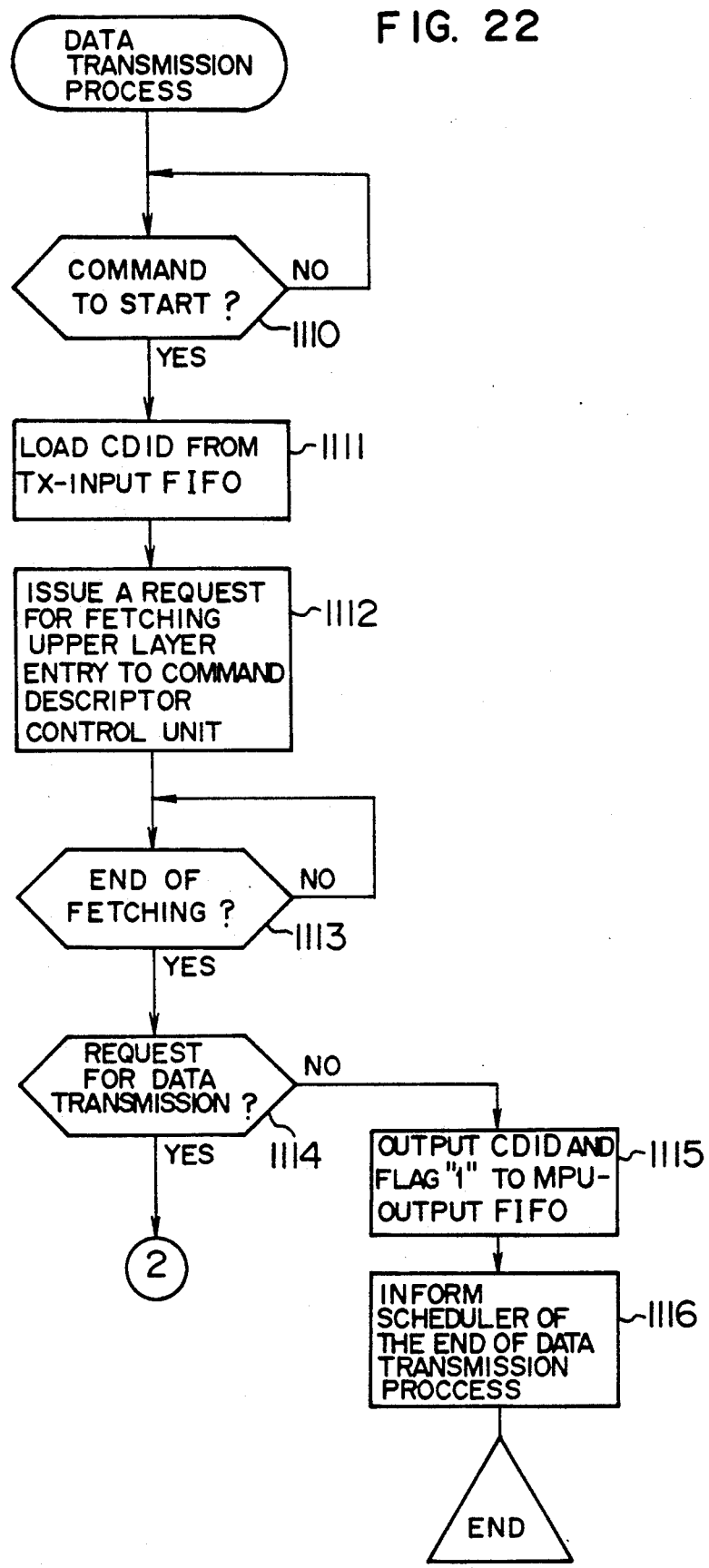
Figure 23:
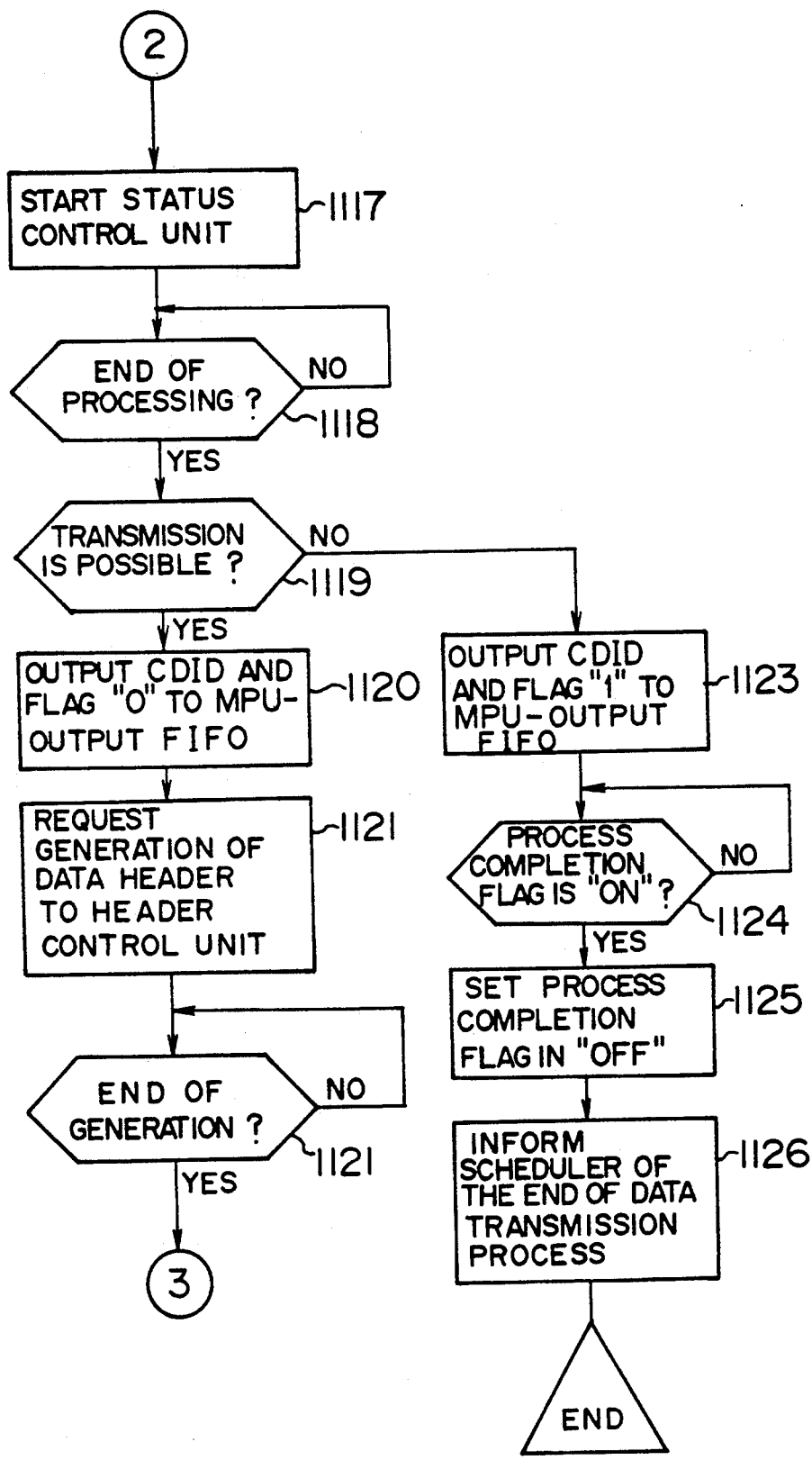
Figure 24:
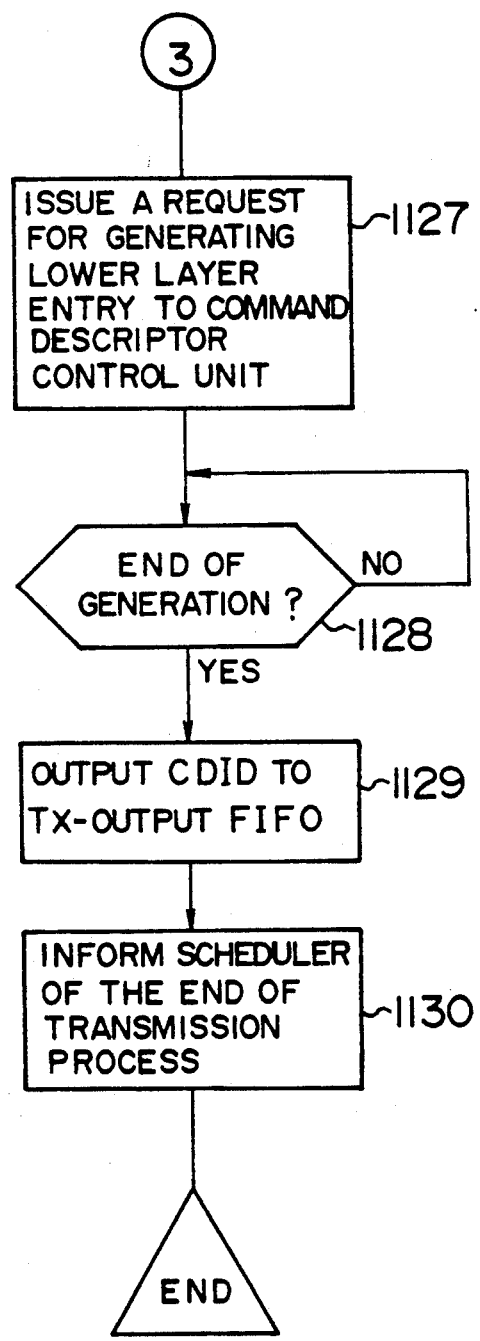
Figure 25:
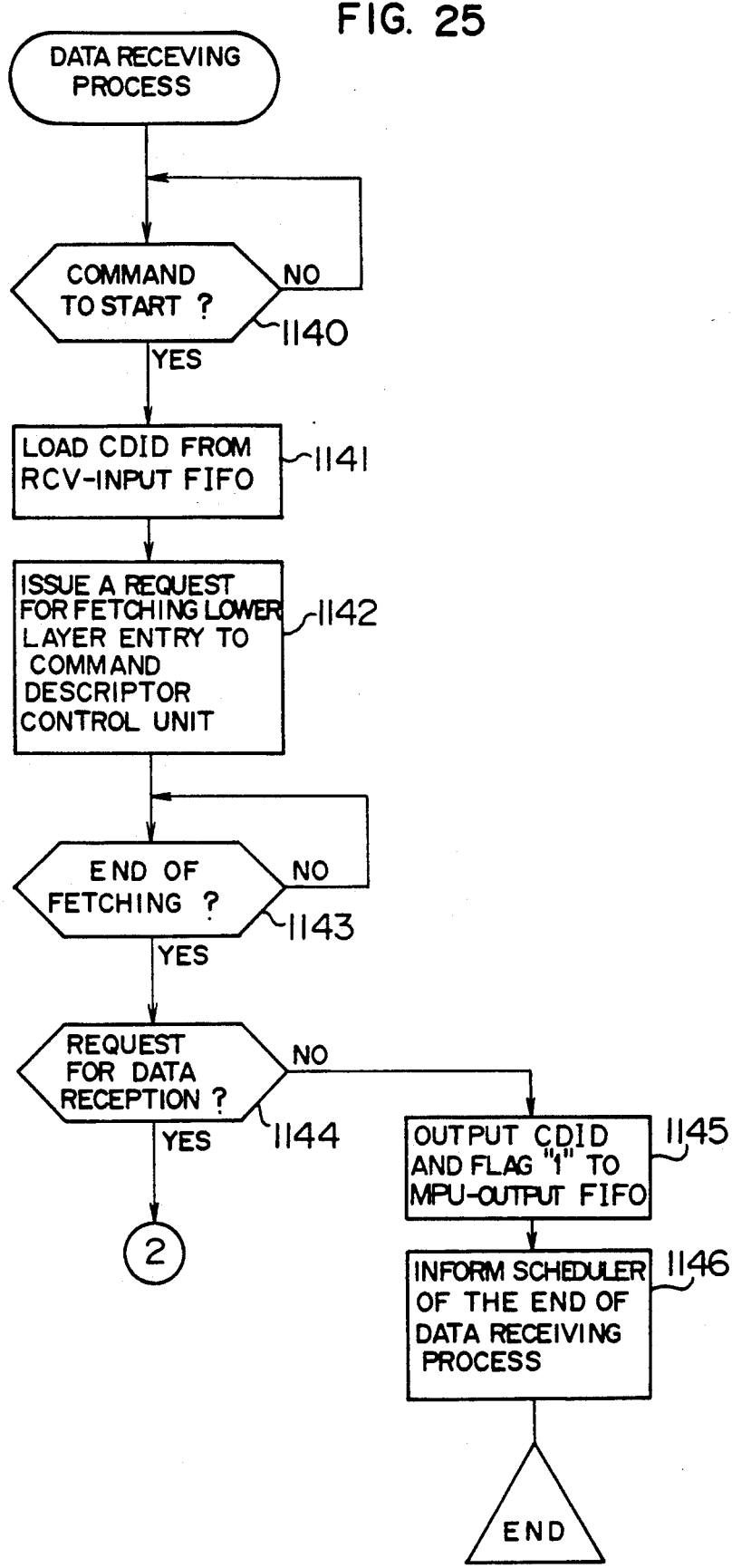

FIGS. 22 to 24 are flowcharts of the operation of the transmission processing controller 110-2 of FIG. 20.

The transmission processing controller 110-2, as shown in FIG. 22, waits for the start from the scheduler 110-1 (step 1110). When the scheduler 110-1 is started, it loads the CDID from the transmission input FIFO 101 (1111), issues a fetch request of a higher layer interface entry to the command descriptor control unit 113 through a signal line 122 (1112) and waits for a report of completion from the command descriptor control unit through a signal line 123 (step 1113).

When the fetching of the command descriptor is completed, the transmission processing controller 110-2 decides whether the command from a higher layer is a transmission request or not (step 1114). If the command is not a data transmission request, the flag "1" indicative of no data transmission processing and the CDID loaded from the transmission input FIFO 101 are supplied to the processor output FIFO 105, thus requesting the backend processor 200 to process the command (step 1115), and the scheduler 110-1 is notified of the completion of the transmission processing (step 1116).

When the command is a data transmission request, the transmission processing controller 110-2 controls the status control unit 111 to start through the signal line 124 (step 1117), and waits for the notice of the completion of the process from the status control unit through the signal line 125 (step 1118). If the report of completion is sent from the status control unit 111, the transmission processing controller 110-2 decides whether data can be transmitted or not (step 1119). If data cannot be transmitted, or if the transmission of data by the flow control is impossible, the controller supplies the CDID loaded from the transmission input FIFO 101 to the processor output FIFO 105, to request the backend processor 200 to initiate the transmission waiting process (step 1123), waiting for the process completion flag 108 to be turned on (step 1124). When completing the transmission waiting process, the backend processor 200 turns the processing completion flag 108 on.

When the processing completion flag 108 is turned on, the transmission processing controller 110-2 causes the flag 108 to be turned off (step 1125), and then supplies a transmission processing completion notice to the scheduler 110-1 (step 1126).

When the order of executing the process to be executed by the processor 200 and the process of an event which will occur next must be assured, the data transfer processor unit 100 uses the processing completion flag 108 to effect the synchronization between the processors.

When data transmission is possible, the CDID is supplied to the processor output FIFO 105, thus requesting the backend processor 200 to start the response monitor timer (step 1120). Then, a request for generation of a data packet is sent through the signal line 126 to the header control unit 114 (step 1121), and the system wants for a generation completion notice to be sent through a signal line 27 (step 1122).

When receiving the notice of the completion of generation of protocol header, the transmission processing controller 110-22, as shown in FIG. 24, sends a request for generating a lower layer interface entry to the command descriptor control unit 113 (step 1127), and waits for the completion notice to be sent (step 1128). When receiving the generation completion notice from the command descriptor control unit, the transmission processing controller 110-2 supplies to the transmission output FIFO the CDID which has been loaded from the transmission input FIFO 101 (step 1129), and notifies the scheduler 110-1 of the completion of transmission processing (step 1130).

FIGS. 25 to 29 are flowcharts of the operation of the reception processing controller 110-3 of FIG. 20.

When started by the scheduler 110-1 (step 1140), the reception processing controller 110-3 loads the CDID from the reception input FIFO 104 (step 1141), issues a fetch request of a lower layer interface entry to the command descriptor control unit 113 through the signal line 122 (step 1142), and waits for the completion notice to be supplied through the signal line 123 (step 1143). When the fetching of the command descriptor is completed, a decision is made as to whether the reception command indicates the reception of data from the opponent station (step 1144). If data is not received, the flag "1" indicates this fact, and the CDID is supplied to the processor output FIFO (step 1145), and the scheduler is notified of the completion of the reception processing (step 1146).

Figure 26:
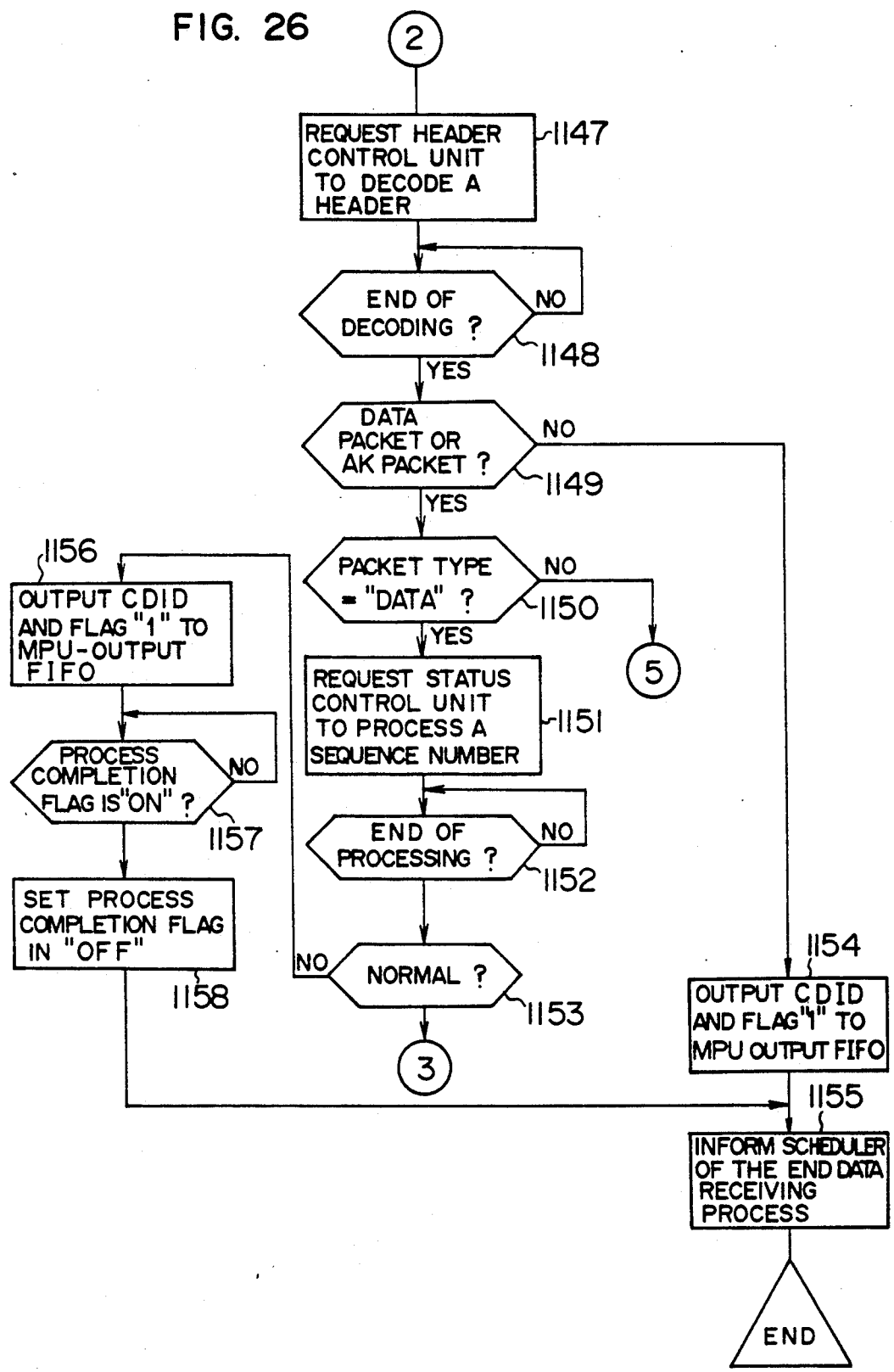

When the reception command indicates the reception of data, the reception processing controller 110-3, as shown in FIG. 26, requests the header control unit 14 to analyze the protocol header through the signal line 126 (step 1147), and waits for the completion notice to be sent through the signal line 127 (step 1148). When the analysis of the header is completed, it is decided whether the received data is a data packet or a response packet (step 1149).

If the received data is neither a data packet nor a response packet, the reception processing controller 110-3 supplies the CDID to the processor output FIFO 105, thereby requesting the backend processor 200 to process the received data (step 1154), and notifies the scheduler 110-1 of the completion of the reception processing (step 1145).

When the received data is a data packet (step 1150), the reception processing controller requests, through the signal line 124, the status control unit 111 to check if the order number upon reception of data is normal (step 1151), and waits for a notice of completion to be supplied through the signal line 125 (step 1152).

If the data reception is not normal, or if it is detected that the reception order number has a defect, the flag "1" indicates this fact, and the CDID is supplied to the processor output FIFO 105, thereby requesting the backend processor 200 to process the abnormal received data (step 1156), and waits for the processing completion flag 108 to be turned on (step 1157). The backend processor 200 performs the abnormal processing which has been requested by the data transfer processing unit 100, and when the processing has been completed, it turns the processing completion flag on. When detecting that the processing completion flag becomes on, the data transfer processing unit 100 turns the flag 108 off (step 1158), and then notifies the scheduler 110-1 of the completion of the reception processing (step 1155).

Figure 27:
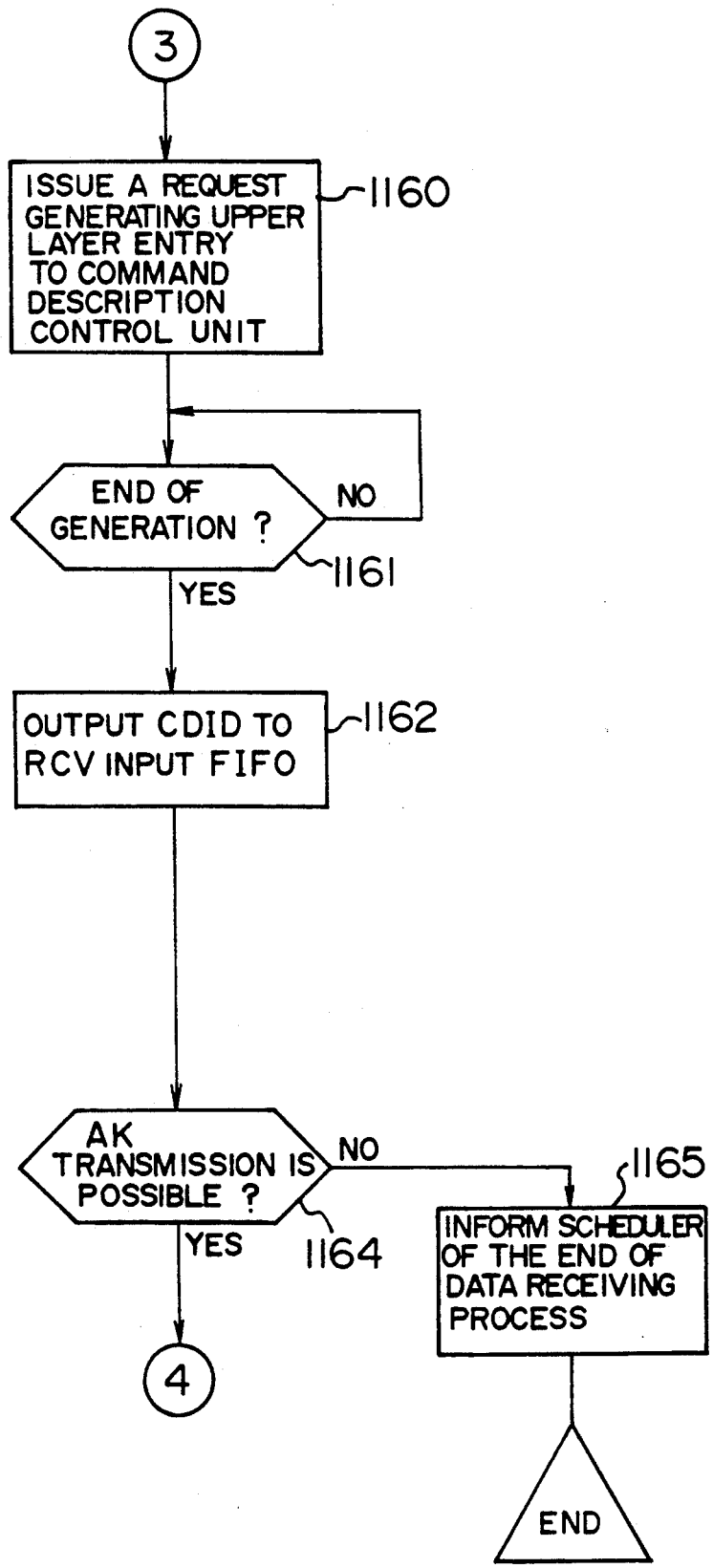

When the data reception is normal, the reception processing controller 110-3, as shown in FIG. 27, issues a request for the generation of a higher layer interface entry to the command descriptor control unit 113 through the signal line 122 (step 1160), and waits for a notice of completion to be sent through the signal line 123 (step 1161). When the command descriptor has been completely generated, the reception processing controller 110-3 supplies the CDID to the reception output FIFO 102, thereby indicating a higher layer of data reception (step 1162). Moreover, it decides whether the response packet can be transmitted or not from the state of the acknowledgment (AK) transmission FIFO 107 (step 1164). If the packet cannot be transmitted, it notifies the scheduler 110-1 of the completion of reception processing (step 1165).

Figure 28:
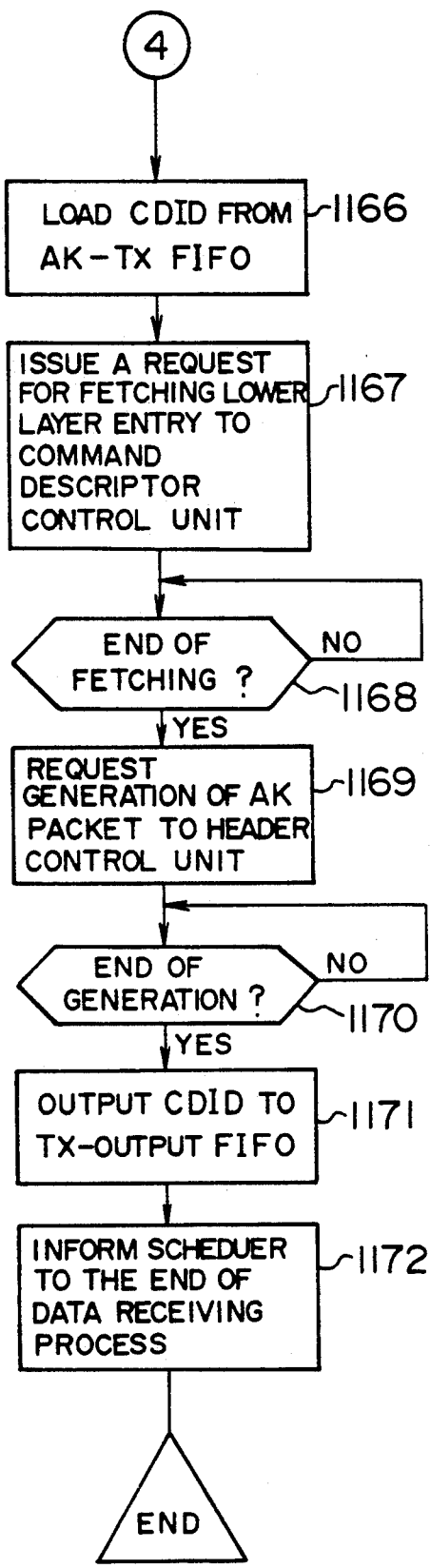

When the response packet can be transmitted, it loads the CDID of the response packet transmission command descriptor from the acknowledgment transmission FIFO 107 (step 1166), issuing a request to fetch the lower layer interface entry to the command descriptor control unit 113 (step 1167), and waits for the notice of the completion (step 1168), as shown in FIG. 28. By this operation it is possible to obtain the buffer address for the generation of the response packet.

When the command descriptor has been completely fetched, the reception processing controller 110-3 requests the header control unit 114 to generate the response packet (step 1169), and waits for the completion thereof (step 1170). When the response packet generation has been completed, the controller supplies the CDID to the transmission output FIFO, thereby requesting a lower layer to transmit the response packet (step 1171), and then notifies the scheduler 110-1 of the completion of the reception processing (step 1172).

Figure 29:
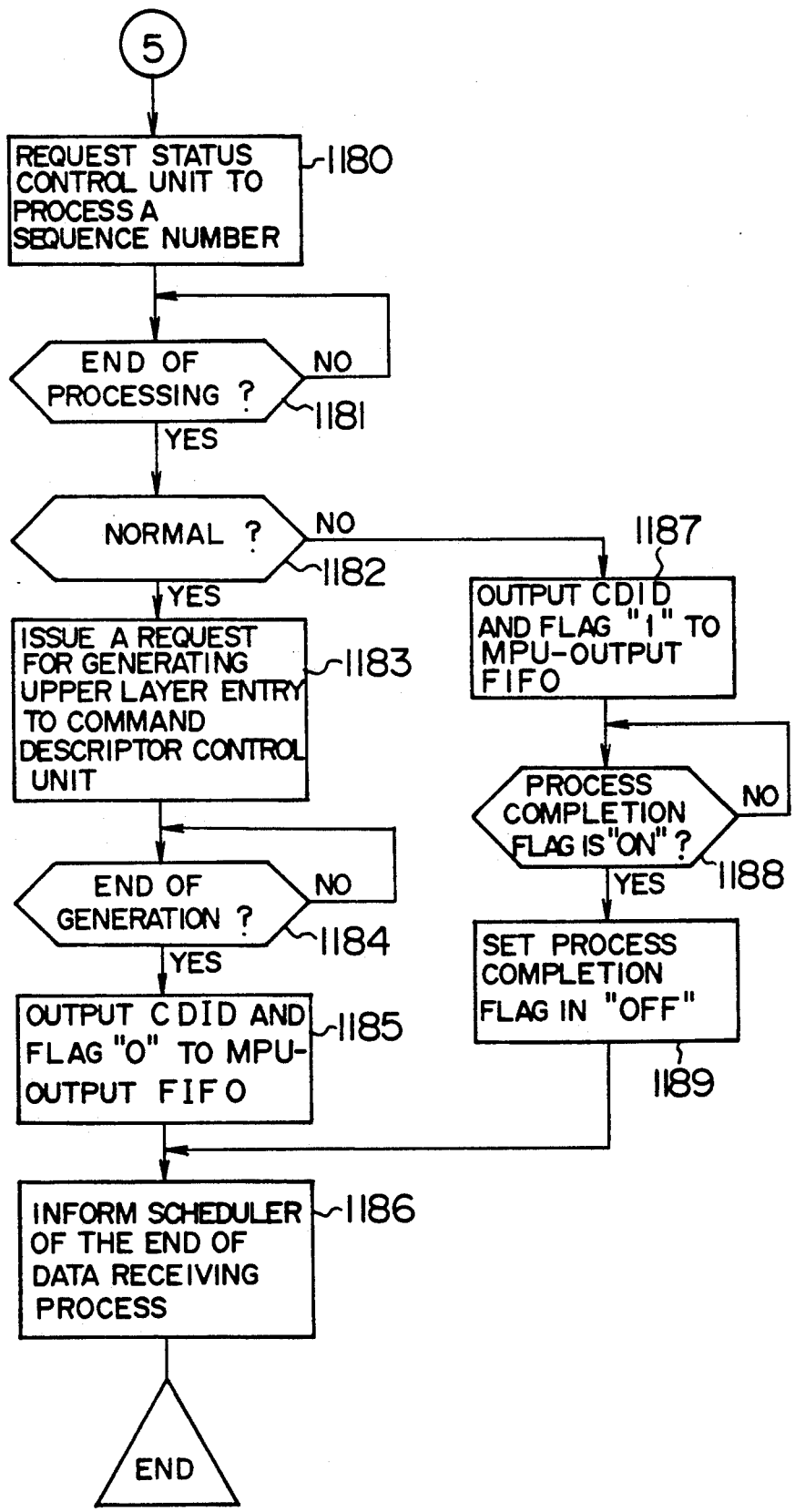

If the received data is the response packet, the control sequence advances from the step 1150 of FIG. 26 to the step 1180 of FIG. 29. The reception processing controller 110-3 requests the status control unit 111 to check if the order number within the response packet is normal or not (step 1180), and waits for the completion (step 1181). When the response reception is found to be not abnormal by the above check, the flag "1" indicates this fact, and the CDID is supplied to the processor output FIFO 105, thereby requesting the backend processor 200 to process the response packet (step 1187), and waits for the processing completion flag 108 to be turned on (step 1188). When the processing completion flag 108 turns on, it turns the flag 108 off (step 1189), and then notifies the scheduler 110-1 of the completion of the reception processing (step 1186).

If the response reception is normal, the controller issues a request for generating a higher layer interface entry to the command descriptor control unit 113 (step 1183), and waits for the notice of the completion (step 1184). By this operation in the command descriptor 31, the command which is to supplied to the backend processor 200 for the release of the received response buffer is generated. When the command descriptor 31 has been completely generated, the CDID is supplied to the processor output FIFO 105, thereby requesting the backend processor 200 to release the reception buffer (step 1185), and the scheduler 110-1 is notified of the completion of the reception processing (step 1186).

Figure 30:
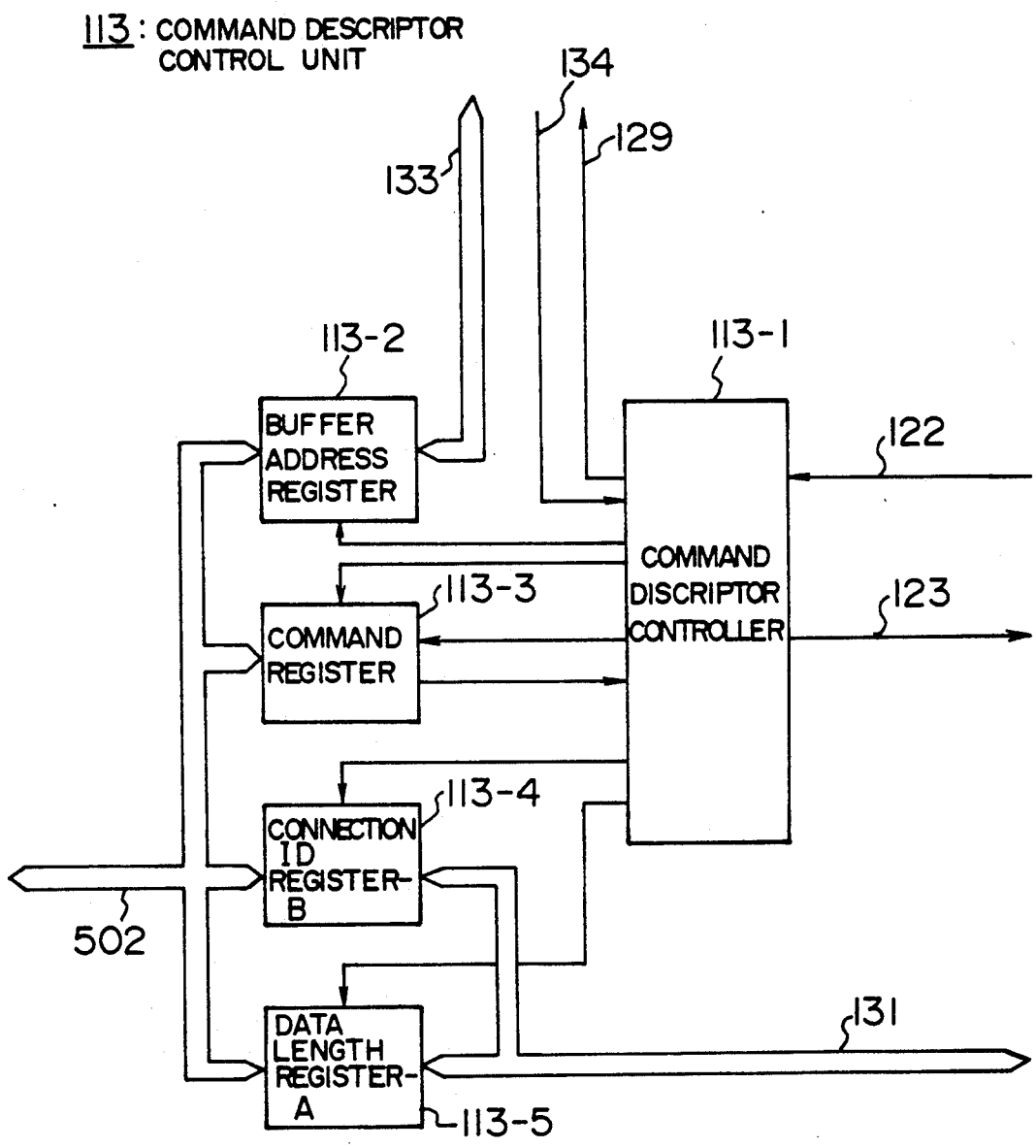
FIG. 30 is a detailed block diagram of the construction of the command descriptor control unit 113 shown in FIG. 19.

FIG. 30 is a block diagram showing a more detailed construction of the command descriptor control unit 113 of FIG. 19.

The command descriptor control unit 113 includes a command register 113-3 for storing parameters of the command descriptor 31, a buffer address register 113-2, a connection identifying register A113-4, a data length register A113-5, and a command descriptor controller 113-1. Shown at 129 is a signal line on which is supplied a control signal indicative of the access request of the command descriptor to the bus control portion 112, and 134 is a signal line on which a response signal indicative of the completion of the access is supplied.

First, the reading (fetch) of the command descriptor will be described.

The command descriptor controller 113-1, when detecting the fetch request from the main control unit 110 by the control signal appearing on the signal line 122, issues twice a memory access request to the bus control portion 112 through the control signal line 129. By the first access request, the contents of the command field F1, connection identifying field F2 and data length field F3 within the command descriptor are read and stored in the command register 113-3, connection identifying register A113-4 and data length register A113-5, respectively. When the first access has been completed, a second access request is issued to the bus control portion 112, and at the same time the value stored in the command register 113-3 is decoded so that a decision is made of whether the command indicates a data transmission request or a data reception notice. If the command is a data transmission request or a data reception notice, for the following protocol processing the contents of the connection identifying register A113-4 and data length register A113-5 are transmitted through the bus 131 to the status control unit 111.

By the second access, the contents of the buffer address field F4 of the command descriptor are read, stored in the buffer address register 113-2, and then sent through the bus 133 to the bus control portion 112 for the preparation of the following access to the protocol header. In the operation of writing in the command descriptor, the contents of each register are written in the command descriptor, which is contrary to the reading operation.

Figure 31:
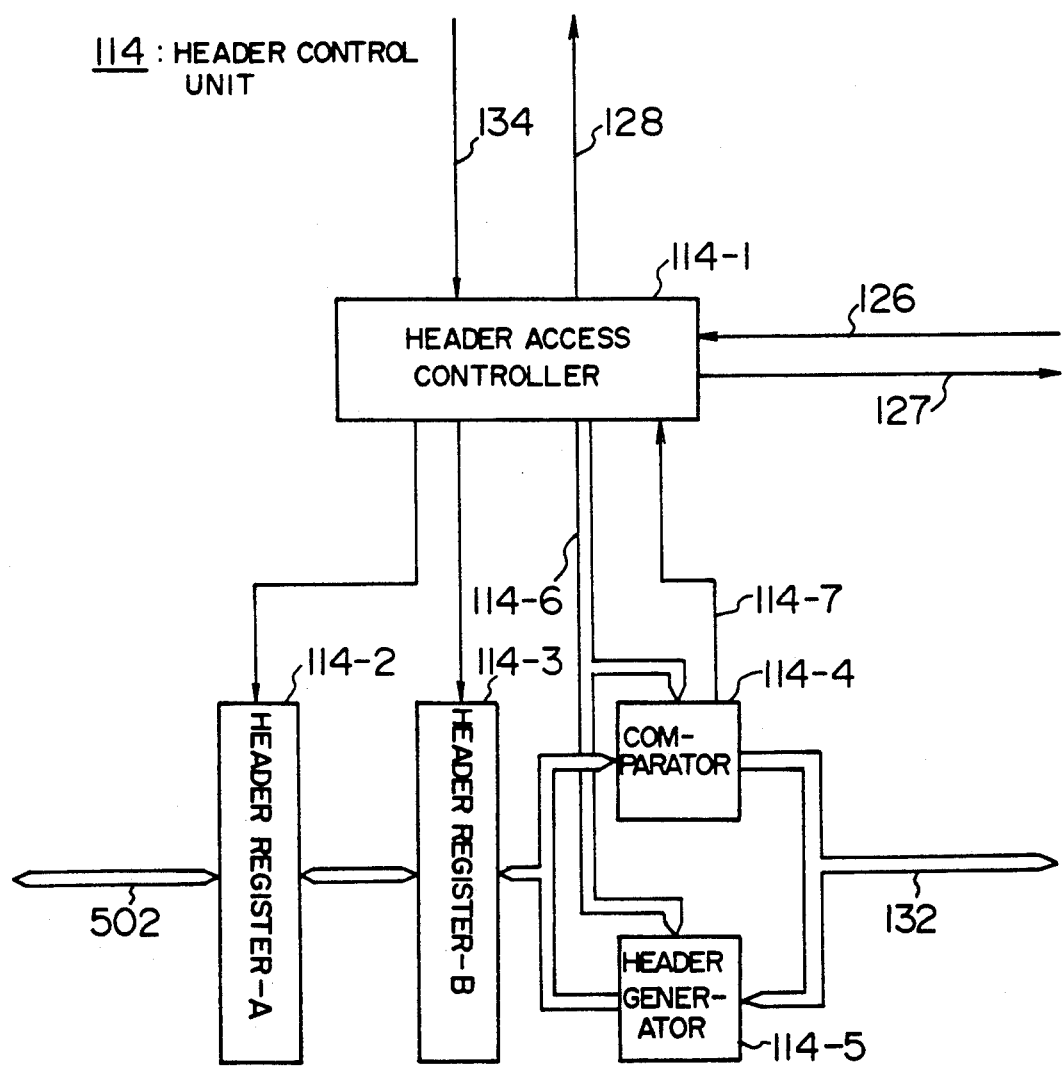
FIG. 31 is a detailed block diagram of the construction of the protocol header processor 114 shown in FIG. 19.

FIG. 31 is a more-detailed block diagram showing the construction of the header control unit 114 of FIG. 19.

The header control unit 114 includes two header registers of, including header register A114-2 and header register B114-3, for storing the protocol header, which registers are simultaneously accessed, a comparison circuit 114-4 for checking if the received protocol header is normal, a header generation circuit 114-5 for generating the protocol header to be transmitted, and a header access controller 114-1 for controlling these operations.

First, the analyzing operation of the received protocol header will be mentioned.

The header access controller 114-1, when receiving a request for reading the protocol header from the main control unit 110 by way of the control signal 126, requests the bus control portion 112 to read the protocol header.

The bus control portion 112 reads data in an amount which can be accessed at one time from the buffer memory 30, and stores it in the header register A114-2. When the first data access has been completed, the header access controller 114-1 transfers the stored data of the header register A114-2 into the header register B114-3. When the data transfer to the header register B114-3 has been completed, the header access controller 114-1 decodes the data stored in the header register B114-3 into elements constituting the protocol header and supplies each element to the comparison circuit 114-4, where the checking of each element is started. When all the header is not completely read yet, the checking of each element is started, and at the same time, the bus control portion 112 is requested to read the remaining portion of the protocol header. The above operation is repeated until the whole of one protocol header is completely read.

The comparison circuit 114-4 performs the checking of the header element having a fixed value, and the cutting of the header element by the mask of a particular bit pattern. The comparison data and mask data necessary in this case are supplied from the header access controller 114-1 to the comparison circuit 114-4. When an abnormality is detected by the checking in the comparison circuit 114-4, the header abnormality is transmitted through a control signal line 114-7 to the header access controller 114-1, and a parameter such as a transmission reception order number necessary for the following protocol arithmetic processing is supplied through the bus 132 to the status control unit 111. When the access to the whole protocol header and the check thereof have been completed, the header access controller 114-1 notifies the main control unit 110 of the completion through the signal line 127.

As described above, when the access to the protocol header in the analysis of the protocol header is performed in a plurality of memory access operations, in this invention the operation of reading the protocol header from the buffer memory and the operation of checking of the protocol header are processed in a pipeline manner for high speed operation.

The operation of the generation of the protocol header is performed in the opposite order to the analysis operation mentioned above. In other words, the elements of the protocol header to be transmitted are generated in order by the production circuit 114-5, and assembled into a form of the protocol header in the header register B114-3. A part of the assembled protocol header is transferred from the header register B114-3 to the header register A114-2, and written in the memory through the bus 502. In this case, as in the analysis operation, the operation of assembling the protocol in the register A and the operation of writing from the register B to the buffer memory are executed in parallel in a pipe-line processing manner.

Figure 32:
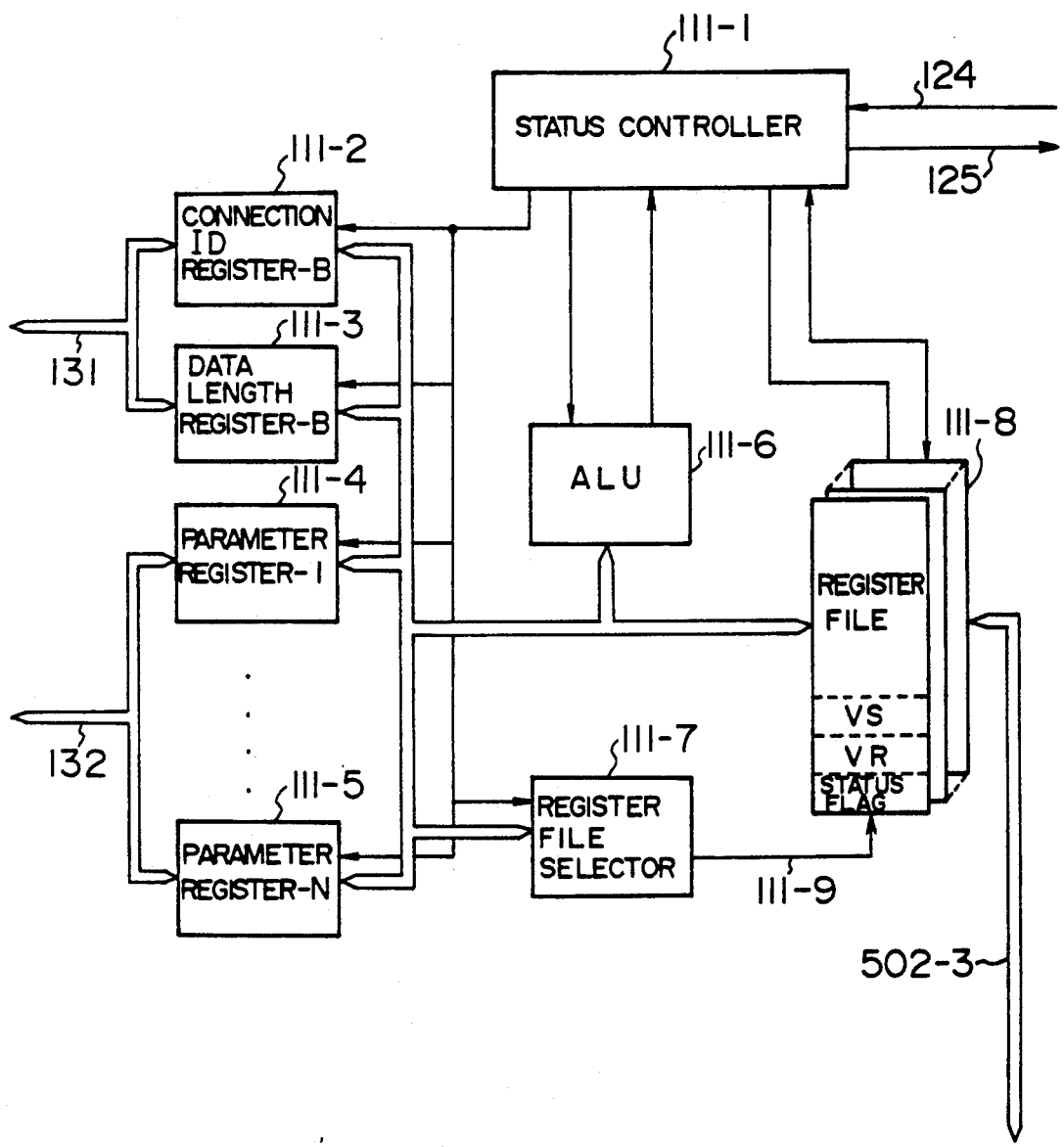
FIG. 32 is a detailed block diagram of the construction of the status control unit 111 shown in FIG. 19.

FIG. 32 is a detailed block diagram of the status control unit 111 shown in FIG. 19.

The status control unit 111 includes a connection identifying register B111-2 for holding the value of the connection identifying field of the command descriptor, a data length register B111-3 for holding the value of the data length field, a plurality of parameter registers 111-4 for holding the parameters constituting the protocol header, a register file group 111-8 which is provided for the connection and which manages the status of each connection and the status, such as the transmission reception order number necessary to perform the flow control, a register file selecting circuit 111-7 for selecting one register file to be processed from the register file group 111-8, an ALU 111-6 for performing an arithmetic operation by use of the value read from the register or register file, and a status controller 111-1 for controlling these registers, register files and ALU111-6.

The register file group 111-8 is constructed to be accessed by either the status controller 111-1 or the backend processor 200 shown in FIG. 8. The register file 111-8 is initialized by the backend processor 200 when each connection has been established, and at this time the status flag showing the status of the connection is set to the state of "connection having been completely established".

The operation of the status control unit upon transmission of data will be described.

The transmission order number added to the transmission data is stored in the register file 111-8 as the transmission status variable VS. The status controller 111-1 selects one register file corresponding to the connection identifying element set in the connection identifying register B111-2 from the register file group 111-8 and refers to the status flag of the register file, thereby checking if the connection is established. If the status flag is in the status of "connection having been established", the transmission status variable VS of the register file is supplied through the parameter register 111-4 to the header control unit 114. Then, the value of the transmission status variable VS is changed by use of the ALU 111-6, and fed back to the register file for the preparation of the following transmission of data.

The operation of the status control unit upon reception of data will be described.

The reception order number added to the received data is stored in the parameter register 111-4 by way of the header control unit 114. The status controller 111-1, as in the data transmission, selects a register file from the register file group 111-8, refers to the status flag and checks the connection status. If it is the status of "connection having been established", the content of the parameter register 111-4 is compared with that of the reception status variable VR of the register file, thereby checking if the order number is normal. If the order number is normal, the value of the reception status variable VR of the register file is changed for the preparation of the following data reception.

As described above, the register file 111-8 is changed by the status controller 111-1 upon normal data transmission reception processing. If the data transmission reception is abnormal, it is changed by the backend processor 200. In this invention, since the register file group 111-8 is a resource common to the two processors 111-1 and 200, the competitive control is necessary. The competitive control of the register file group 111-8 is performed by use of the process completion flag 108 as described with reference to the operation flow of the data transfer unit 100. In other words, when the register file group 111-8 is used by the backend processor 200, the data transfer processor unit 100 referred to the process completion flag 108 does not perform a new process, so that the competition of access to the register file 111-8 can be prevented.

Figure 33:
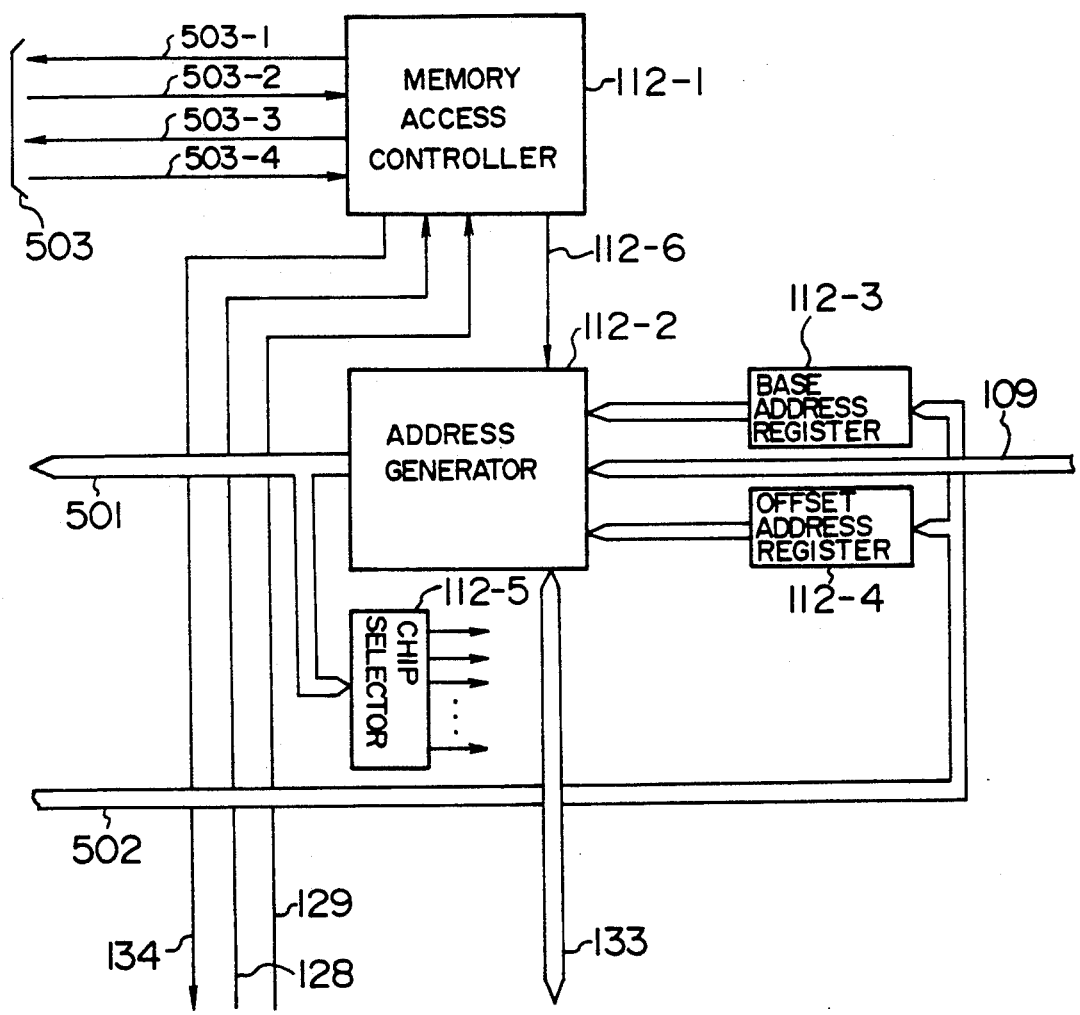
FIG. 33 is a detailed block diagram of the construction of the bus control unit 112.

FIG. 33 is a detailed block diagram of the bus control portion 112 shown in FIG. 19.

The bus control portion 12 includes a memory access control circuit 112-1 having an interface 503 to the internal bus 500 and which controls the memory access, an address generator 112-2 for generating the memory address to be accessed, a base address register 112-3 for defining the value of part of the address of the command descriptor, an off-set address register 112-4, and a chip selector 112-5.

When receiving a memory access request from the command descriptor control unit 113, the bus control portion 112 generates the address of the command descriptor from the value of the base address register 112-3, the value of the off-set address register 112-4 and the CDID on the bus 109, and makes access to the buffer memory 30. On the other hand, when receiving a memory access request from the header control unit 114, the bus control portion 112 loads the buffer address at which the protocol header is stored, through the bus 133, and makes access to the buffer memory 30 on the basis of the address.

Figure 34:
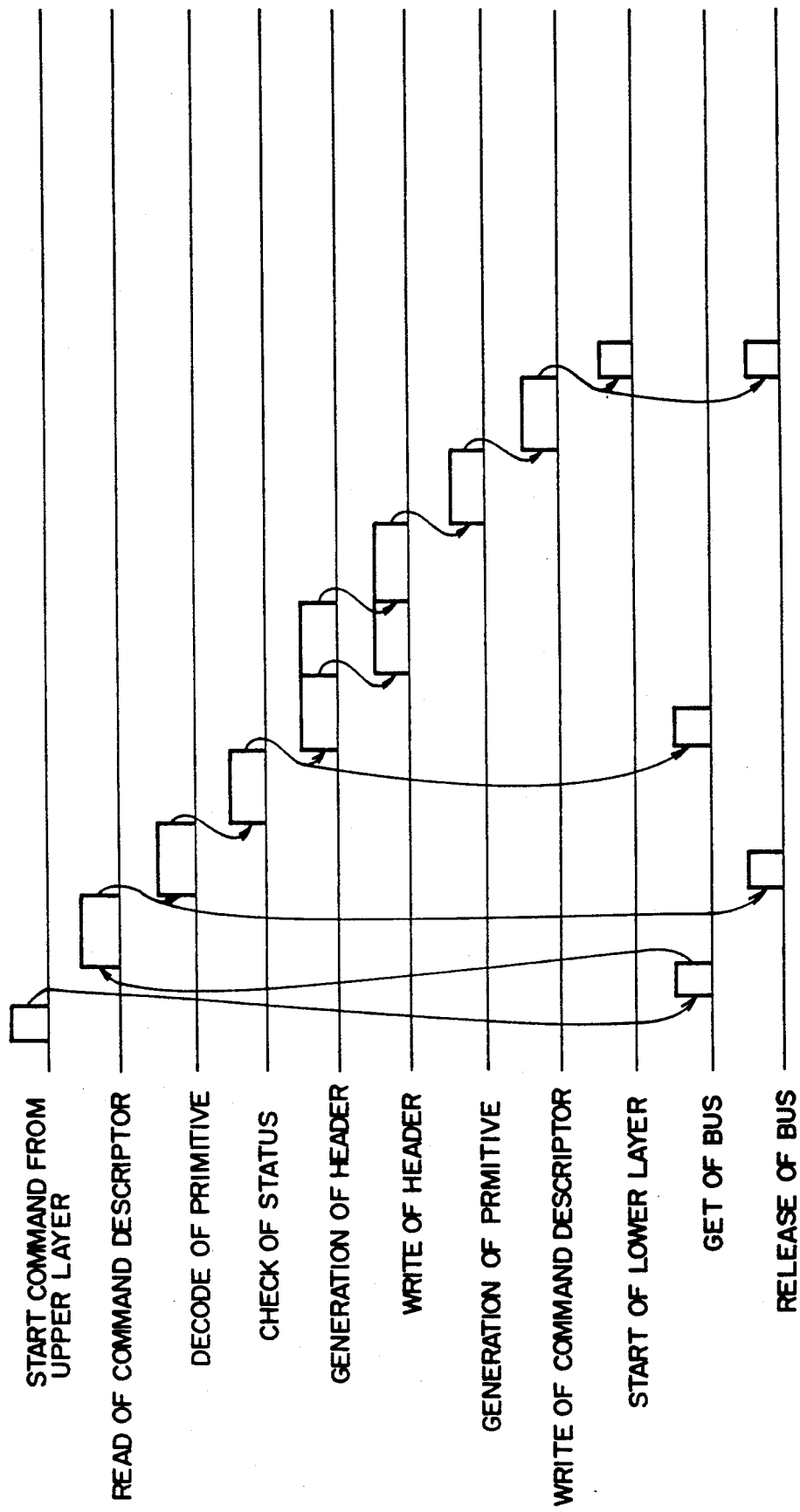
FIGS. 34 and 35 are timing charts for the operation of the data transfer processor unit 100 at the time of data transmission and reception.
Figure 35:
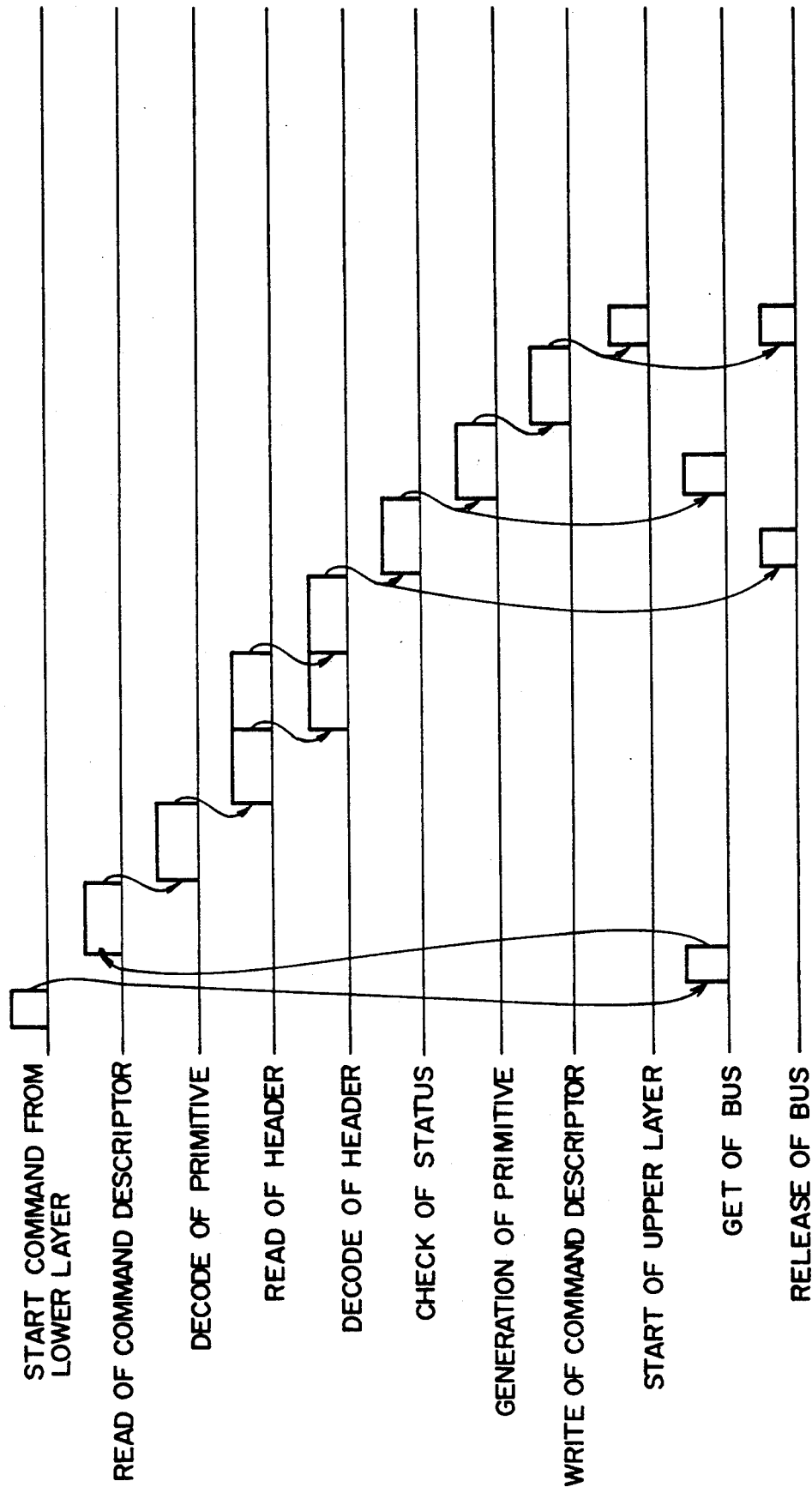

FIGS. 34 and 35 are timing charts of the data transmission processing operation and data reception processing operation of the data transfer processor unit 100, respectively.

As described above, according to this embodiment, since the protocol header processing which is the major part of the protocol processing is performed in the hardware circuit of the data transfer processor units 100-1 to 100-3, as long as data is normally transferred, the processing time can be reduced as compared with that in the conventional microprocessor software processing.

SECOND EMBODIMENT

A second embodiment of the invention will be described.

In the protocol processor 10 mentioned in the first embodiment, the data transfer processor unit 100 and the backend processor 200 are connected to the same internal bus 500. In other words, in the first embodiment, the access to the buffer memory 30 from the data transfer processor unit 100 and the backend processor 200, and the request for processing from the data transfer processor unit 100 to the backend processor 200 are performed through the same internal bus 500.

Figure 36:
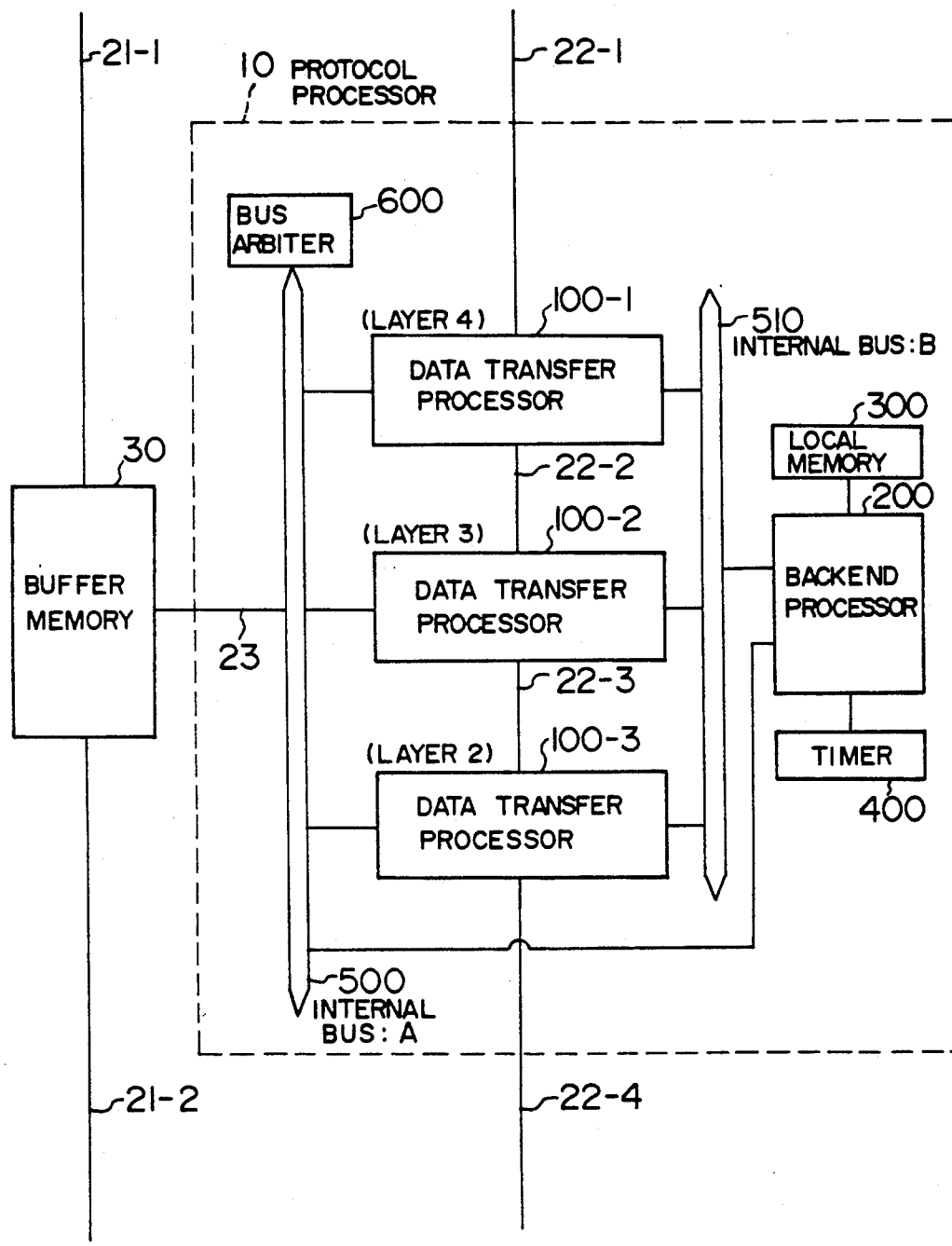
FIG. 36 is a block diagram of the second embodiment of the protocol processor of the invention.

In the second embodiment, as shown in FIG. 36, the data transfer processor unit 100 (100-1 to 100-3) and the backend processor 200 are connected not only to the internal bus A500 but also to a newly provided internal bus B510, so that the access path (internal bus 500) to the buffer memory 30 from the data transfer processor unit 100 and the backend processor 200, and the request path (internal bus 510) for a request from the data transfer processor unit 100 to the backend processor 200 are separated.

According to this embodiment, since the access path to the buffer memory 30 and the interface between the data transfer processor unit 100 and the backend processor 200 are formed of separate buses, respectively, the load can be dispersed into the buses.

THIRD EMBODIMENT

Figure 37:
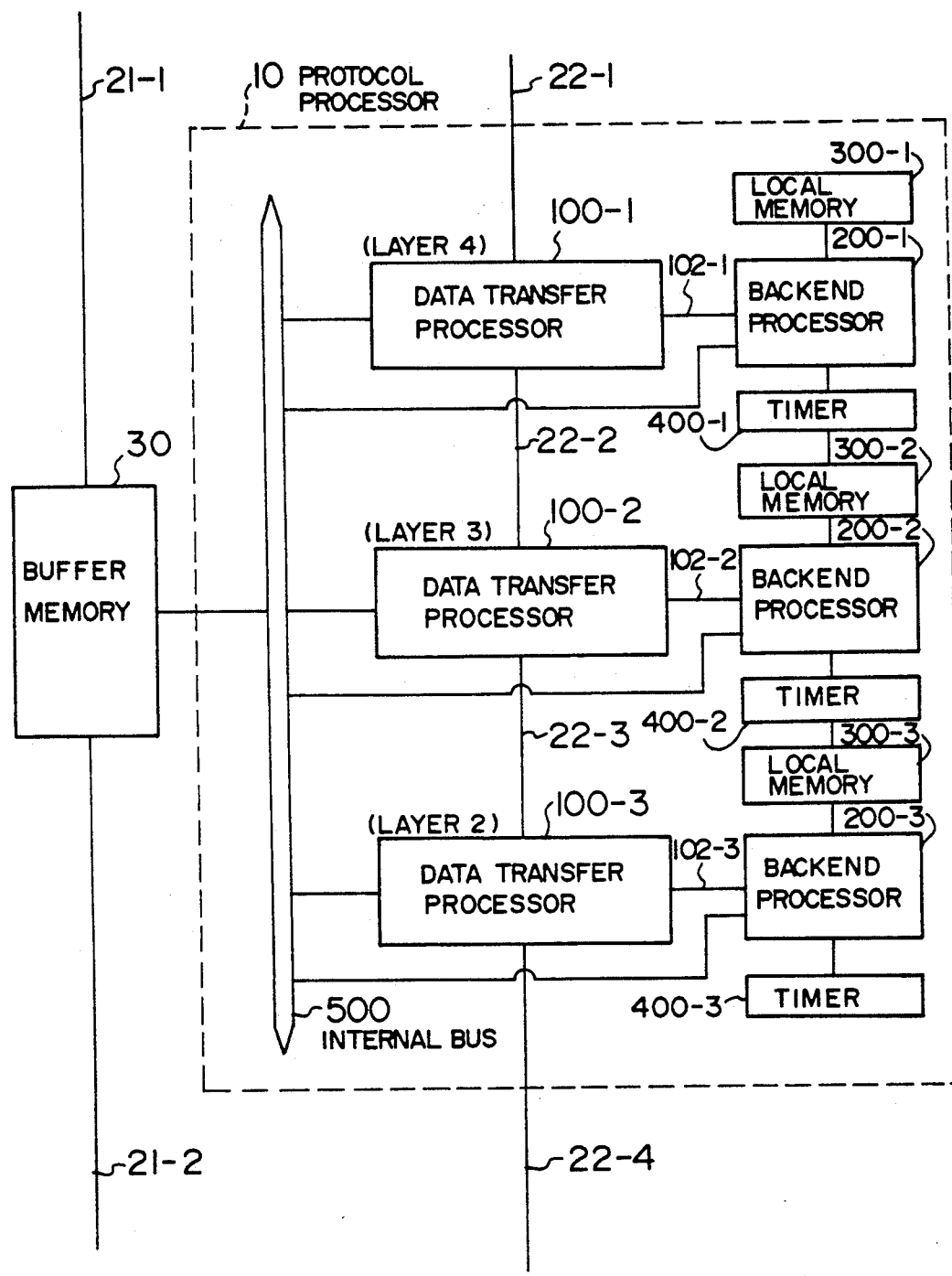
FIG. 37 is a block diagram of the third embodiment of the protocol processor of the invention.

FIG. 37 shows a third embodiment of the protocol processor of the invention which has a plurality of data transfer processors 100-1 to 100-3 provided for respective layers, and a plurality of backend processors 200-1 to 200-3 provided for respective layers.

Each backend processor 200 (200-1 to 200-3) is connected through an interface path 102 (102-1 to 102-3) to the data transfer processor unit 100 (100-1 to 100-3), and connected through the internal bus 500 to the buffer memory 30.

According to the arrangement of this embodiment, since the backend processing which is executed in a software manner is performed for each layer by a plurality of backend processors 200 in a dispersed manner, the protocol processing can be executed at higher speed.

FOURTH EMBODIMENT

The protocol processor 10 shown as one embodiment is divided in its protocol processing function so that in the data transfer processing of the transport protocol (layer 4), the generation/analysis processing of the protocol header is performed by the data transfer processor unit 100 in a hardware manner, and the timer control and the response waiting process is performed by the backend processor 200 in a software manner.

By this dividing of functions, it is possible to reduce the data transmission delay time of layers 4 to 2 (the delay time from when the data transfer processor unit of layer 4 accepts the transmission request to when the data transfer processor unit of layer 2 issues the transmission request to the MAC control portion) because the timer starting process and response waiting process upon data transmission of layer 4 and the data transmission process of layer 3 are executed in parallel. However, according to this construction, the backend processor 200 must execute software upon data transfer processing.

The fourth embodiment of this invention is constructed so that the processing operation of the backend processor 200 is not performed in the normal data transfer processing in order for the data processing ability (data through-put) of the protocol processor 10 to be further improved. The timer start and stop processing, response waiting processing and transmission waiting processing which are executed by the backend processor 200 in the first embodiment are executed by the data transfer processor unit 100 in this embodiment.

Figure 38:
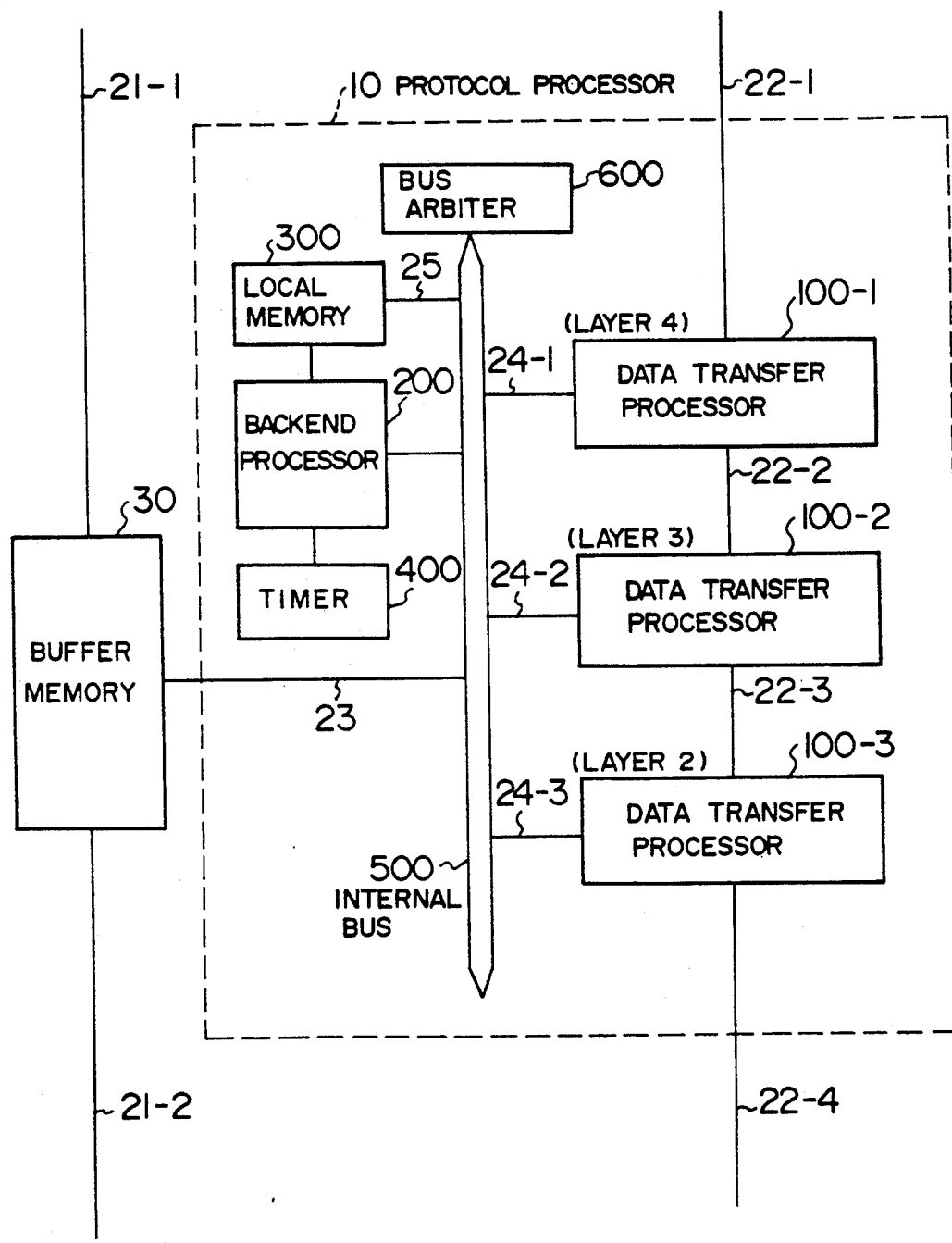
FIG. 38 is a block diagram of the fourth embodiment of the protocol processor 10.

FIG. 38 is a block diagram of the construction of the protocol processor 10 of the fourth embodiment. This embodiment is different from the construction shown in FIG. 8 in that a local memory 300 is connected through a path 25 to the internal bus 500 so that the data transfer processor unit 100 can make direct access to the local memory 300. The access path 25 is used in the timer stop and start processing to be performed by the data transfer processor unit 100 as will be described later.

Figure 39:
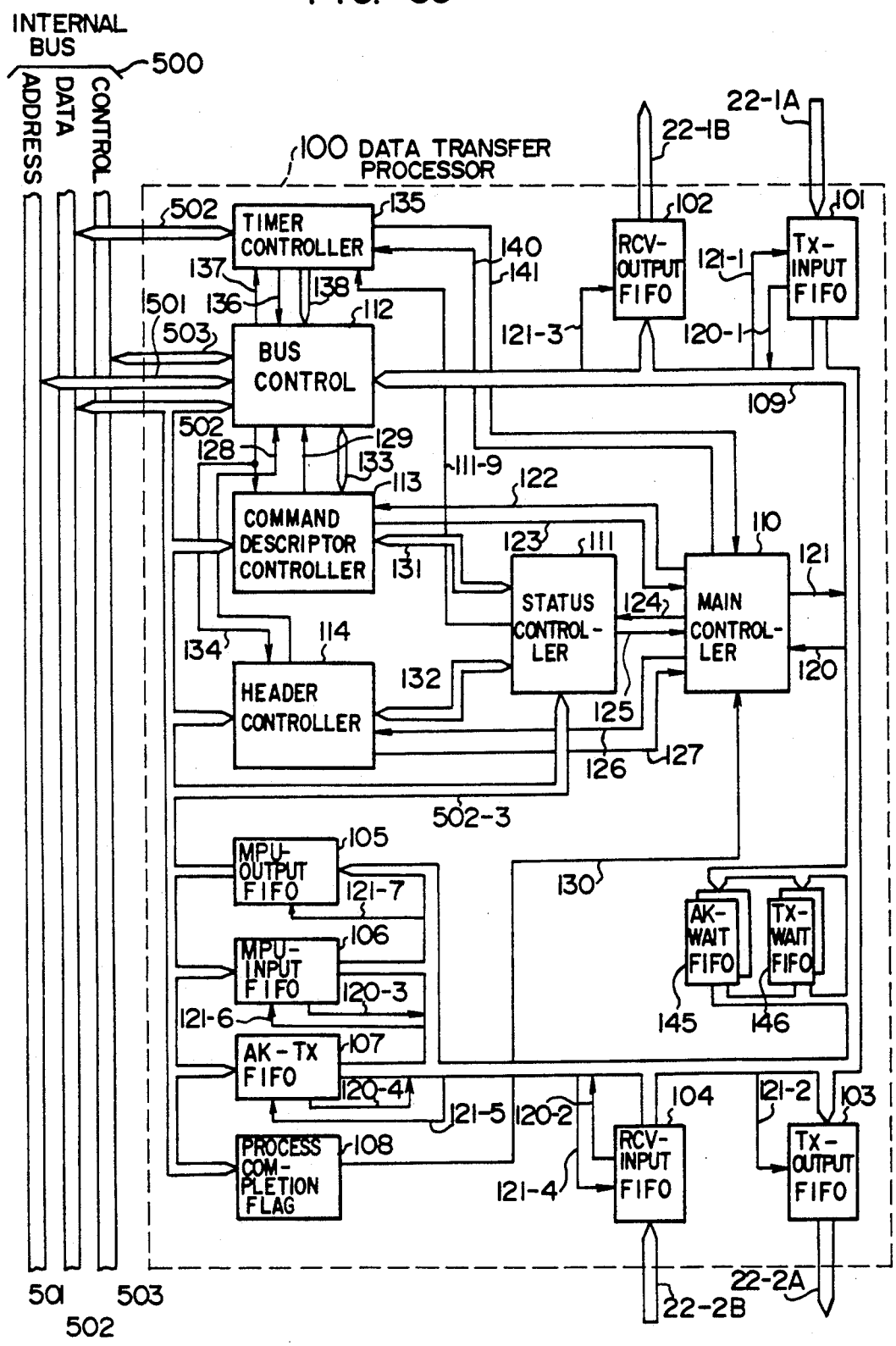
FIG. 39 is a detailed block diagram of the construction of the data transfer processor unit 100 shown in FIG. 38.

FIG. 39 shows the internal construction of the data transfer processor unit 100-1 for layer 4. As compared with the construction shown in FIG. 19, this construction additionally includes a timer control portion 135, a response waiting FIFO 145, and a transmission waiting FIFO 146. The timer control portion 135 has the function of starting and stopping the timer in response to an instruction from the main control unit 110. The response waiting FIFO 145 is a hardware queue for holding the transmission buffer for the preparation of the data retransmission processing, and stores the address information of the command descriptor for managing the transmission buffer. The transmission waiting FIFO 146 is a hardware queue for holding the transmission buffer when the flow control function is operative in response to the data transmission request from a higher layer so as to facilitated waiting for data transmission, and stores address information of the command descriptor for managing the transmission buffer. The response waiting FIFO 145 and the transmission waiting FIFO 146 are provided for connection.

The operation of the protocol processor 10, particularly the part different from the operation flow of the first embodiment mentioned with reference to FIGS. 11 to 15, will be described below. In this embodiment, operations different from those in the first embodiment are the data transmission operation in layer 4 (FIG. 11) and the response reception operation in layer 4 (FIG. 15).

The data transmission operation in layer 4 will be briefly mentioned. In FIG. 11, when a data transmission request is received from a higher layer, and when the transmission is possible, the data transfer processor unit 100-1 initiates the start processing and response waiting processing of the response monitor timer (step 1004), and issues a data transmission request to the data transfer processor unit 100-2 of layer 3. When the flow control function is operative and data cannot be transmitted, the transmission waiting processing (step 1007) is performed by the data transfer processor unit 100-1.

The response reception operation of layer 4 will be mentioned briefly below. In the flow shown in FIG. 15, when a response packet is received, the data transfer processor unit 100-1 performs the stop processing and response waiting processing of the response monitor timer (step 1056).

Figure 40:
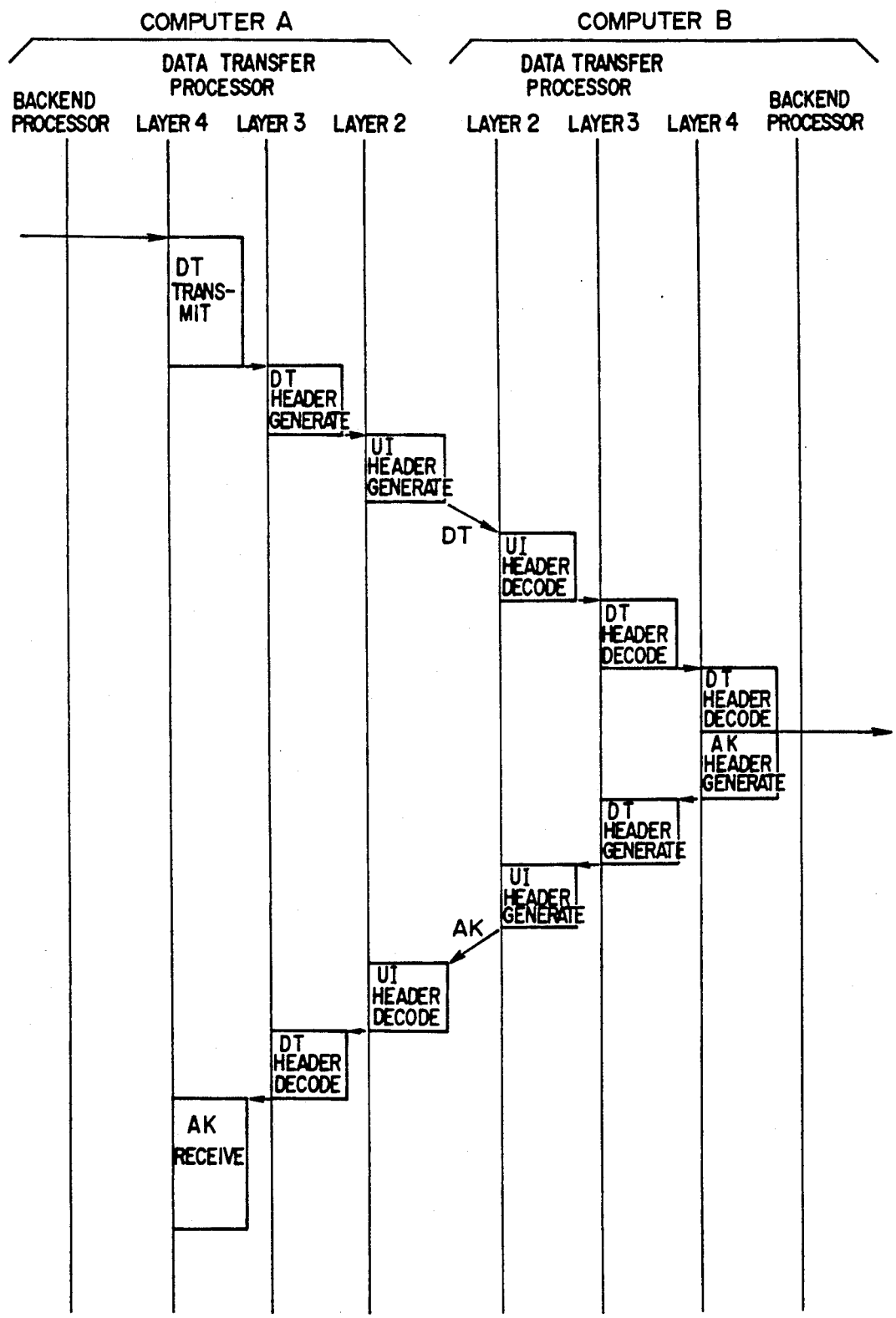
FIG. 40 is a timing chart of the operation of the protocol processor 10 shown in FIG. 38.

FIG. 40 is a timing chart of the operation of the protocol processor 10 upon data transfer which is performed according to the operation flow. As will be obvious from the comparison with FIG. 17, this embodiment does not include the operation of the backend processor 200 in the data transfer processing at all.

The operation of the data transfer processor unit 100-1 in the fourth embodiment, particularly the operation different from that in the first embodiment, will be described in detail.

The data transmission operation will first be described. In the data transmission operation mentioned with reference to FIGS. 22 to 24, the command descriptor control unit 113 performs an analysis of a command and the status control unit 111 performs the transmission flow control processing in response to a transmission request from a higher layer as in the first embodiment.

Figure 41:
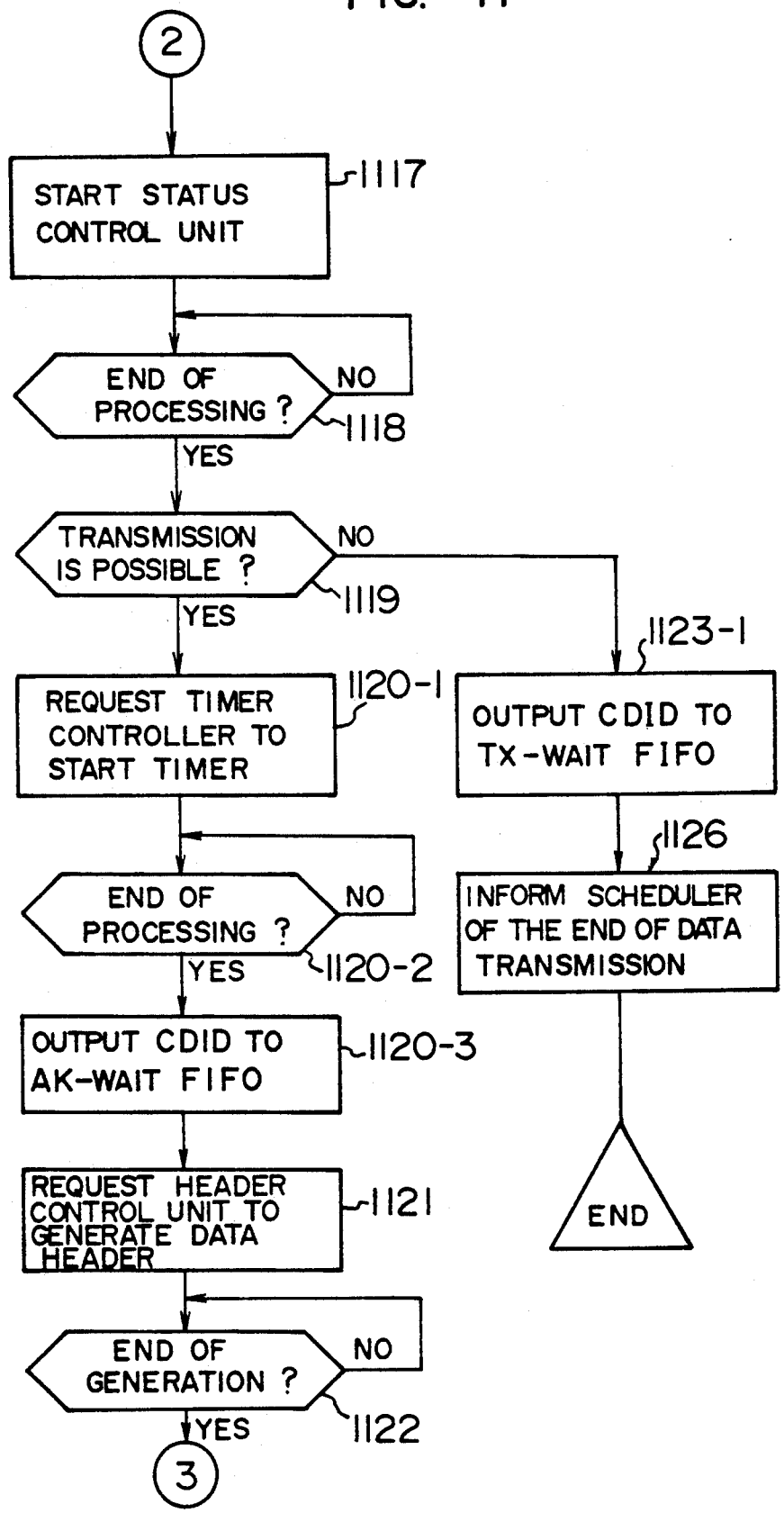
FIGS. 41 to 43 are flowcharts of the operation of the data transfer processor unit 100 shown in FIG. 38.

FIG. 41 is a timing chart of the control operation to be made next in this embodiment.

When the data transmission is decided to be possible as a result of flow control, the status control unit 111 issues a request for starting the timer to the timer control portion 135 through a signal line 111-9 (step 1120-1), and waits for a completion notice to come (step 1120-2). When the start of the timer is completed, the CDID of the address information of the command descriptor is registered in the response waiting FIFO 145 (step 1120-3). Then, as in the first embodiment, the header control unit 114 is requested to generate the protocol header, and a transmission request is sent to the layer 3. When the data transmission is decided to be impossible from the flow control in the status control unit 111, the CDID is registered in the transmission waiting FIFO 146 (step 1123-1), and a report of the completion of transmission processing is transmitted to the scheduler (step 1126).

The response reception operation up to the analysis processing of the protocol header which has been received, as described with reference to FIGS. 25 to 29, is the same as in the first embodiment.

Figure 42:
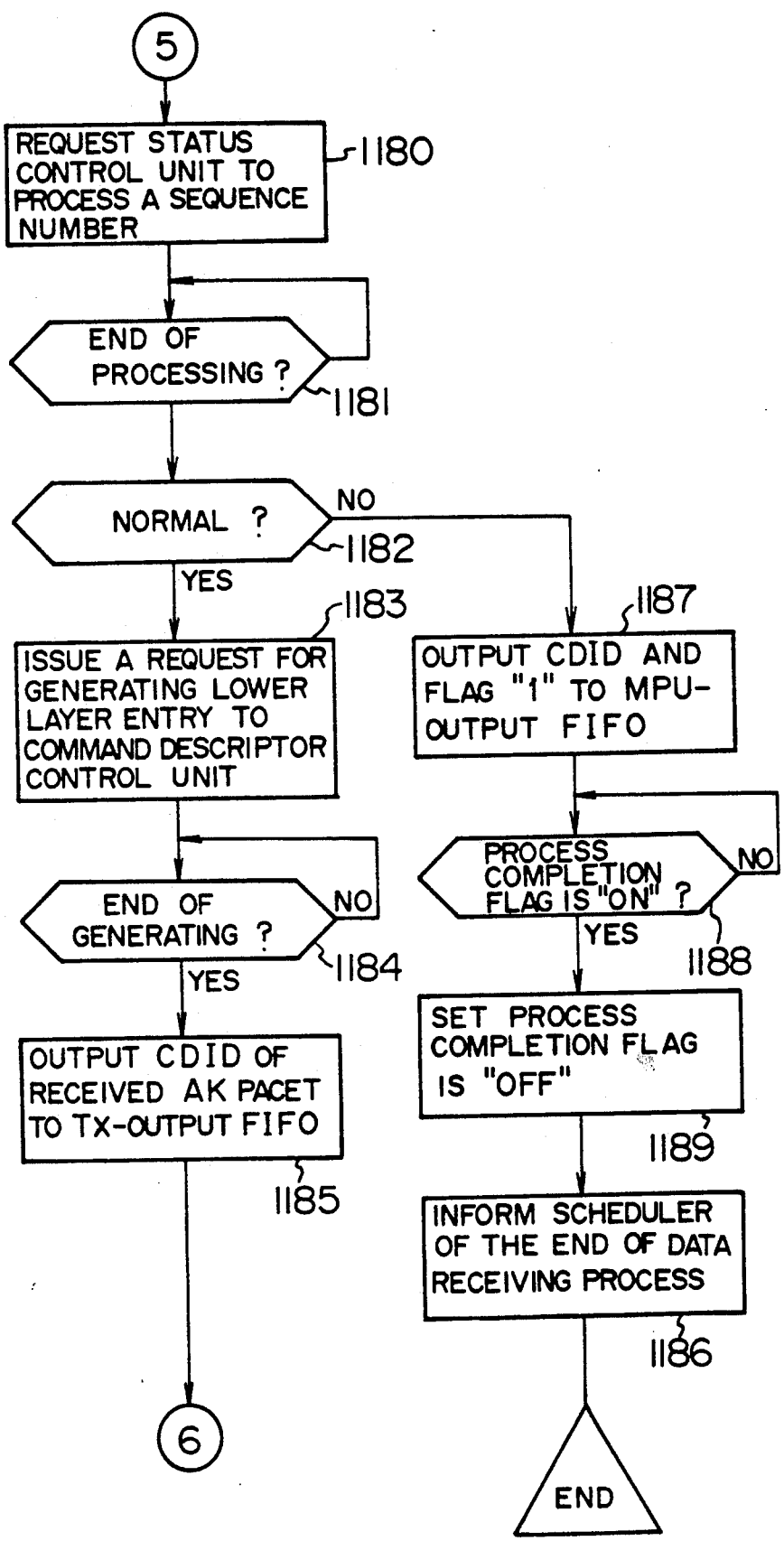
Figure 43:
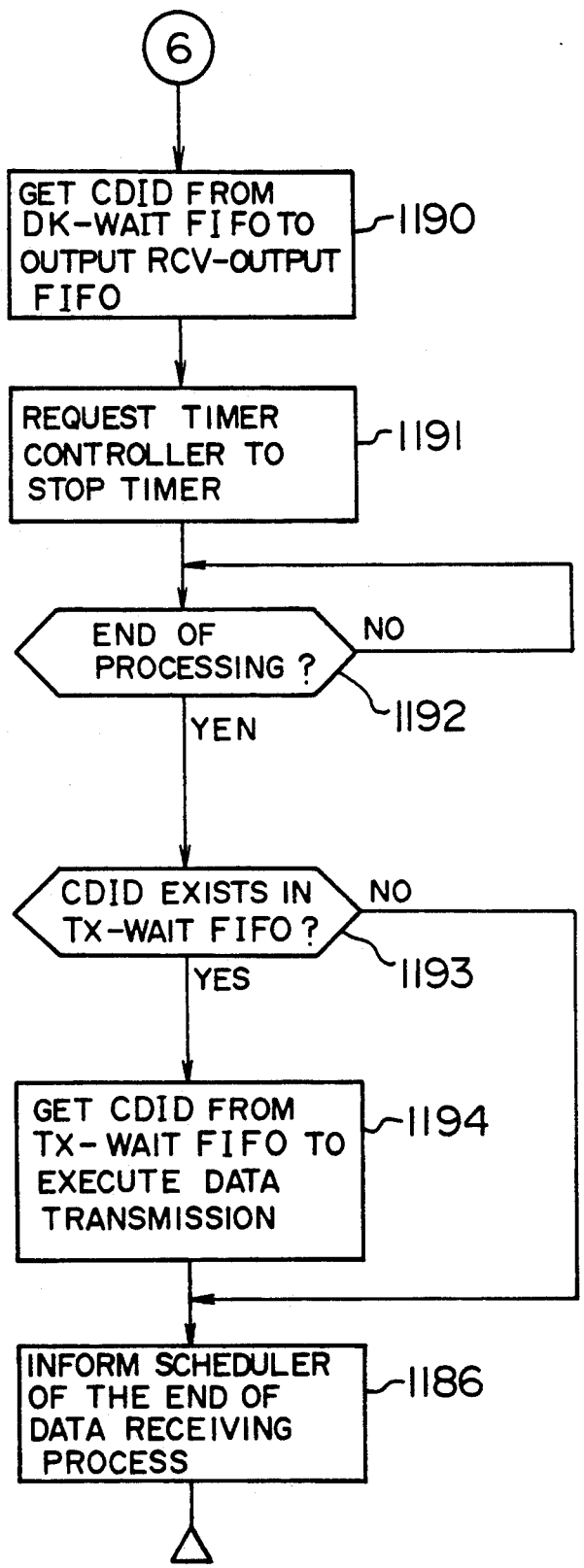

FIGS. 42 and 43 are flowcharts of the control operation to be executed next in this embodiment.

The flow control is performed in the status control unit 111 (step 1180, 1181). If it is decided that the reception packet is a normal response packet (step 1182), the command descriptor control unit 113 is requested to generate the command indicative of the release of the reception buffer (step 1183), and the completion is waited for (step 1184). When the generation of the command is completed, the CDID of the received response packet is supplied to the transmission output FIFO 103, thereby releasing the reception buffer for a lower layer (step 1185). When the release of the reception buffer is completed, the CDID is taken out from the response waiting FIFO 145, and supplied to the reception output FIFO 102, notifying a higher layer of completion of data transmission (step 1190). Then, a timer stop request is issued to the timer control portion 135 (step 1191), and the completion is waited for (step 1192). When the timer stop is completed, it is checked if the CDID is registered in the transmission FIFO 146 (step 1193). If it is registered, the CDID is taken out from the transmission waiting FIFO 146, and the data transmission processing is performed on this CDID (step 1194). The data waiting to be transmitted under the flow control is transmitted by this processing.

How to start and stop the timer by the data transfer processor unit 100-1 will be described in detail with reference to FIG. 44.

Figure 44:
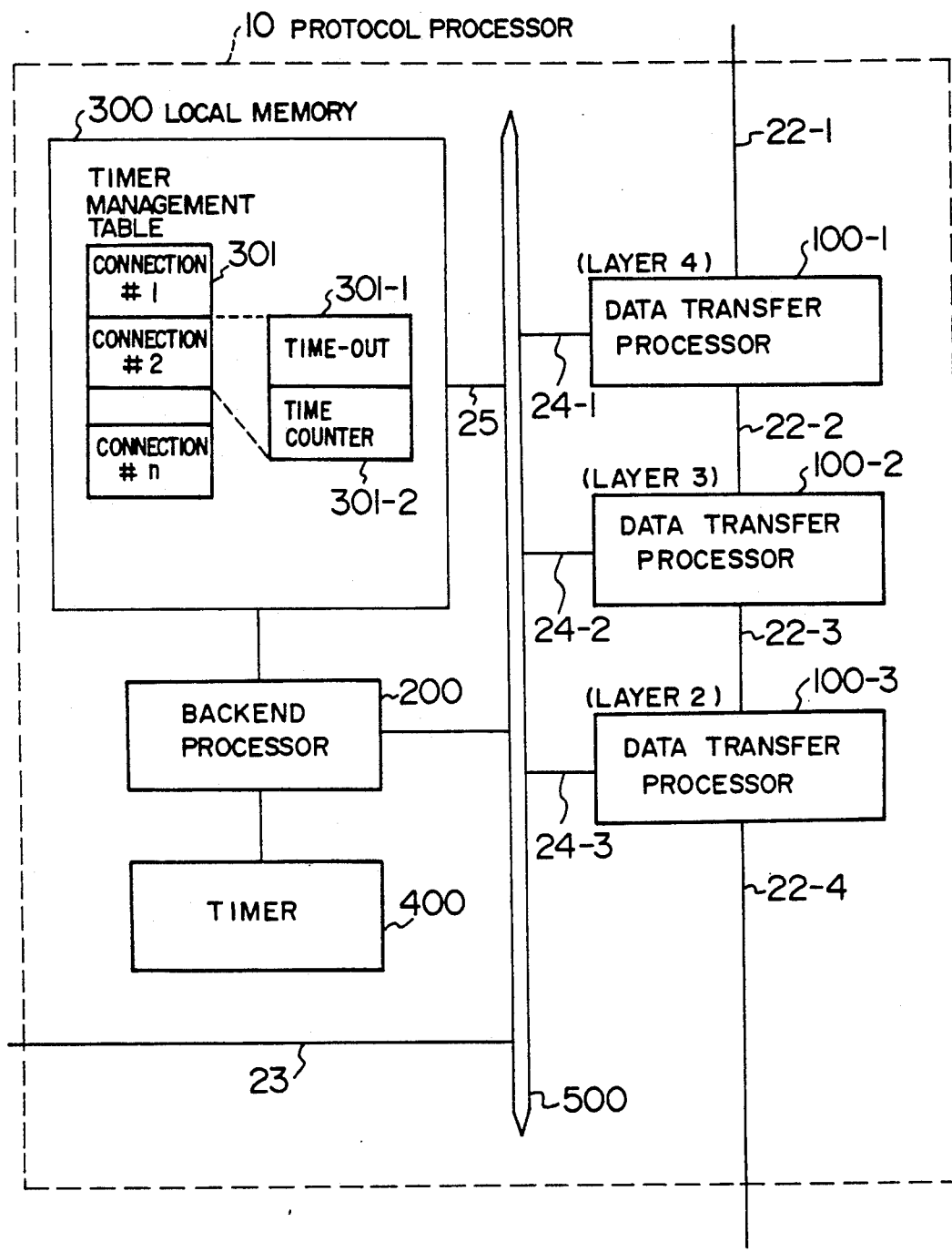
FIG. 44 is a diagram useful for explaining the timer management which the data transfer processor unit 100 performs.

As shown in FIG. 44, a local memory 300 is constructed to be accessed by both the data transfer processor unit 100 and the backend processor 200. In the local memory 300 are defined a plurality of timer management tables 301 for managing the timer per connection. Each of the timer management tables 301 includes a timeout time setting area 301-1 and a timer counter 301-2 for holding the remaining time up to the timeout.

In the above arrangement, the timer start and operations are performed by the data transfer processor unit 100, and the update and timeout of the timer are detected by the backend processor 200.

Figure 45:
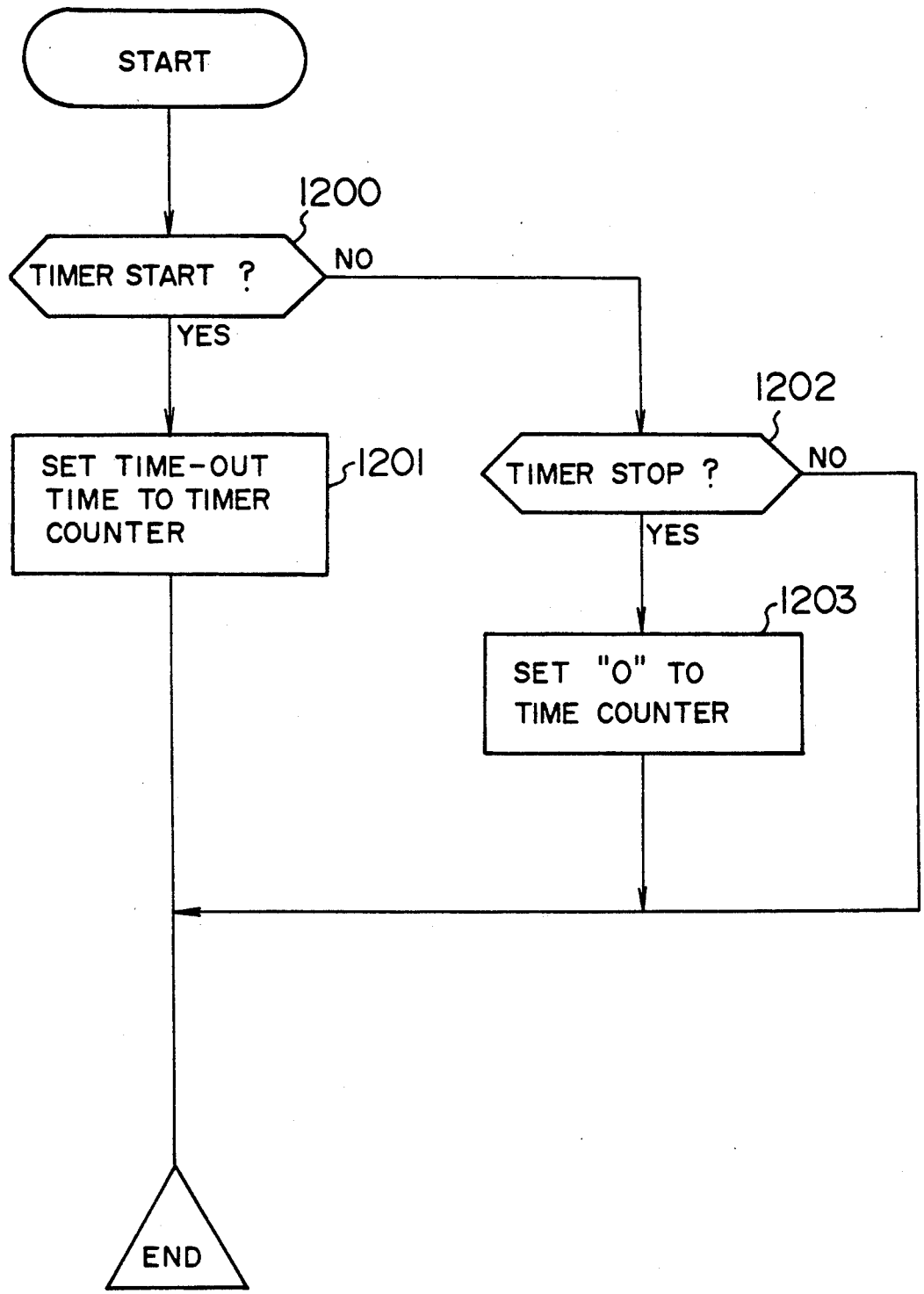
FIG. 45 is a flowchart for the start and stop of timer which the data transfer processor unit 100 makes.

FIG. 45 is a flowchart for the start and stop of the timer by the data transfer processor unit 100.

The starting of the timer is effected by setting the contents of the timeout time 301-1 stored in the timer management table 301 into the timer counter 301-2 (step 1201). The stopping of the timer is effected by setting the value "0" in the timer counter 301-2 (step 1203). In other words, if the content of the timer counter 301-2 is "0", the timer is not started. If it is not "0", the timer is started.

Figure 46:
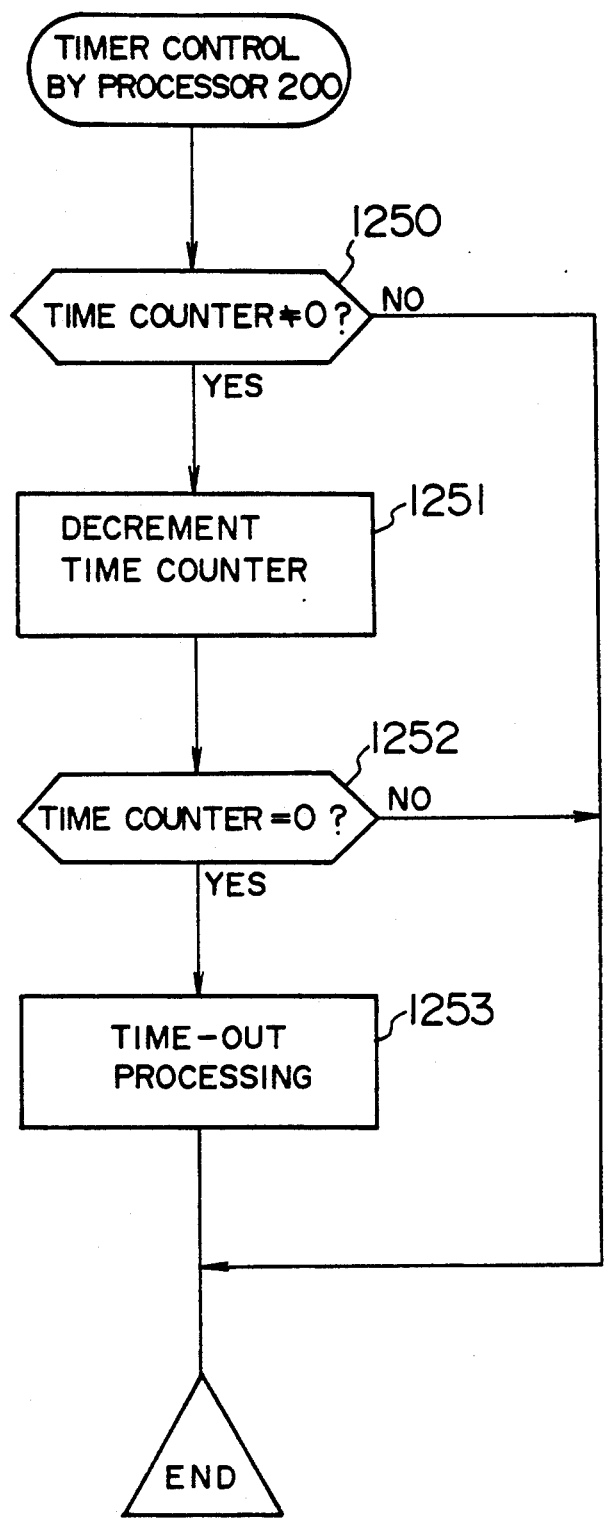
FIG. 46 is a flowchart for the time-out detection which the data transfer processor unit 100 performs.

FIG. 46 is a flowchart for the update of the timer counter 301-2 and the detection of timeout which the backend processor 200 performs.

The backend processor 200 has the function of updating the timer counter 301-2 for all connections on the basis of the periodic interruption from a hardware timer 400. The backend processor sequentially reads each timer counter 301-2 of the timer management table 301. If the value is "0", it decides that the timer is not started, and updates the timer. If the value of the timer counter 301-2 is not "0", it subtracts a unit value from the value, and sets the updated value in the timer counter 301-2 (step 1251). If the result of the subtraction is "0", it is decided that the timer has produced a timeout, and the timeout processing is performed (step 1235).

According to the above embodiment, both the data transfer processor unit 100 and the backend processor 200 update the timer counter 301-2, and thus the competition control is necessary. The method for the competition control of the timer counter 301-2 will be described in detail.

Figure 47:
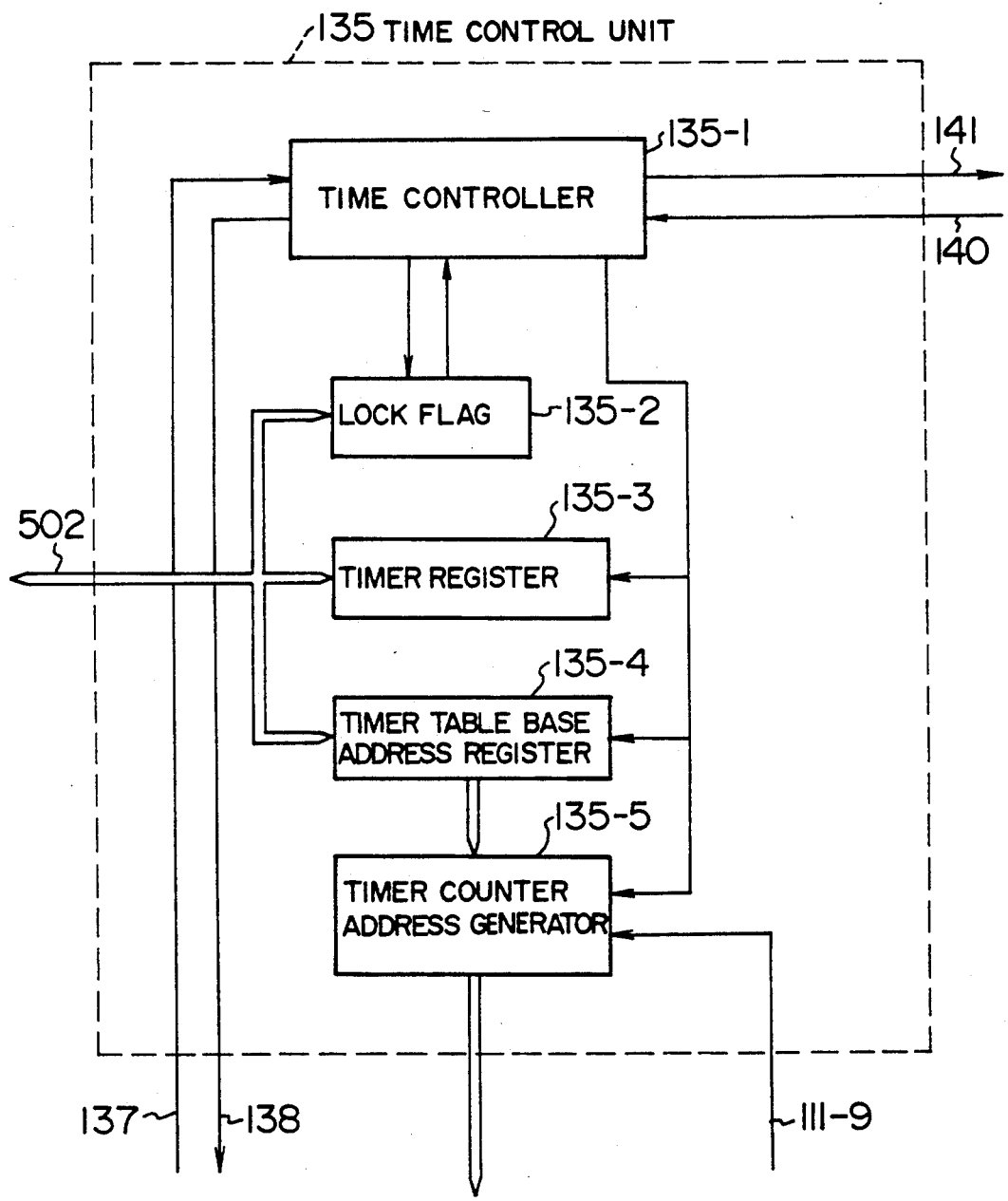
FIG. 47 is a detailed block diagram of the construction of the timer control unit 135 shown in FIG. 38.

FIG. 47 shows the construction of a timer control unit 135 provided in the data transfer processor unit 100.

The timer control unit 135 includes a timer controller 135-1 for controlling the start and stop operations of the timer, a lock flag 135-2 for preventing the access competition to the timer counter 301-2, a timer register 135-3 for temporarily holding the timeout value at the time of timer start, a timer management table base address register 135-4 for holding the base address of the timer table 301 in the local memory 300, and a timer counter address generator 135-5 for finding the address to the timeout time 301-1 of connection and to the timer counter 301-2. The lock flag 135-2 and the timer management table base address register 135-4 are connected through a bus 502 to the internal bus so as to be accessed from the backend processor 200. The lock flag register 135-2 stores flag information indicating that the backend processor 200 is updating the timer counter 301-2.

The control operation of the backend processor 200 and the timer control unit 135 on the timer counter will be described in detail.

Figure 48:
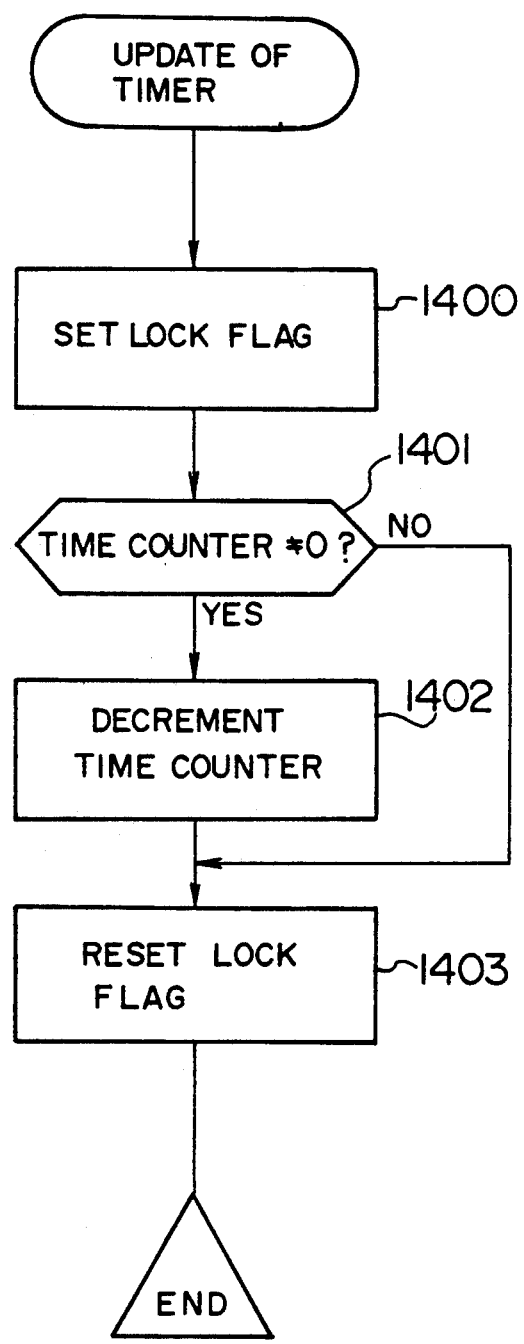
FIG. 48 is a flowchart for timer updating which the backend processor 200 performs.

FIG. 48 is a flowchart of the updating operation of the backend processor 200 on the timer counter 301-2. The backend processor 200, before updating the timer counter 301-2, sets a flag bit in the lock flag register 135-2, and notifies the timer control unit 135 that the timer counter 301-2 is being updated (step 1400). When the timer counter 301-2 is completely updated (step 1401, 1402), the backend processor resets the lock flag register 135-2 (step 1403).

Figure 49:
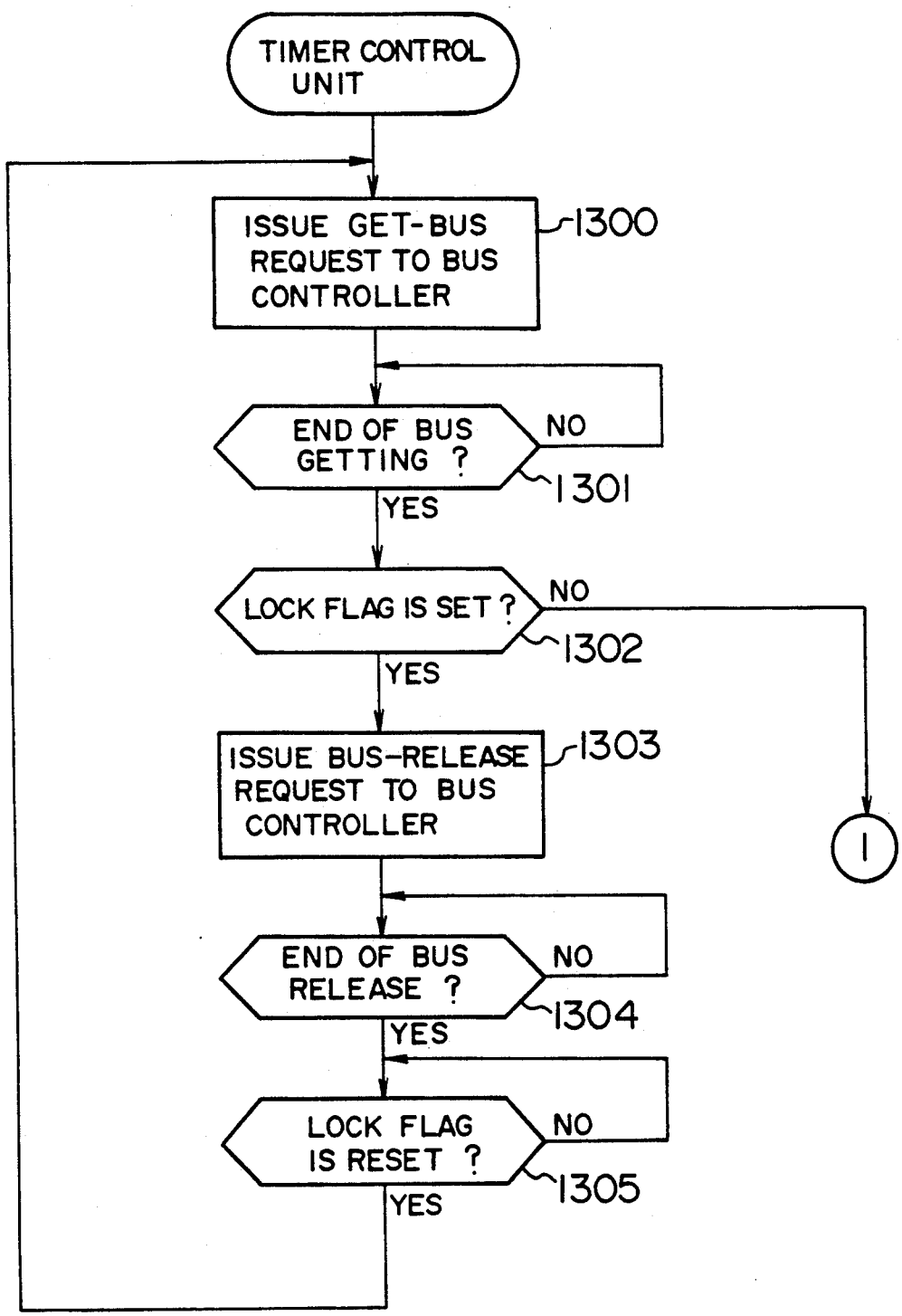
FIGS. 49 and 50 are detailed flowcharts for the start and stop of timer which the data transfer processor unit 100 performs.

FIG. 49 is a flowchart of the operation of the timer control unit 135.

Figure 50:
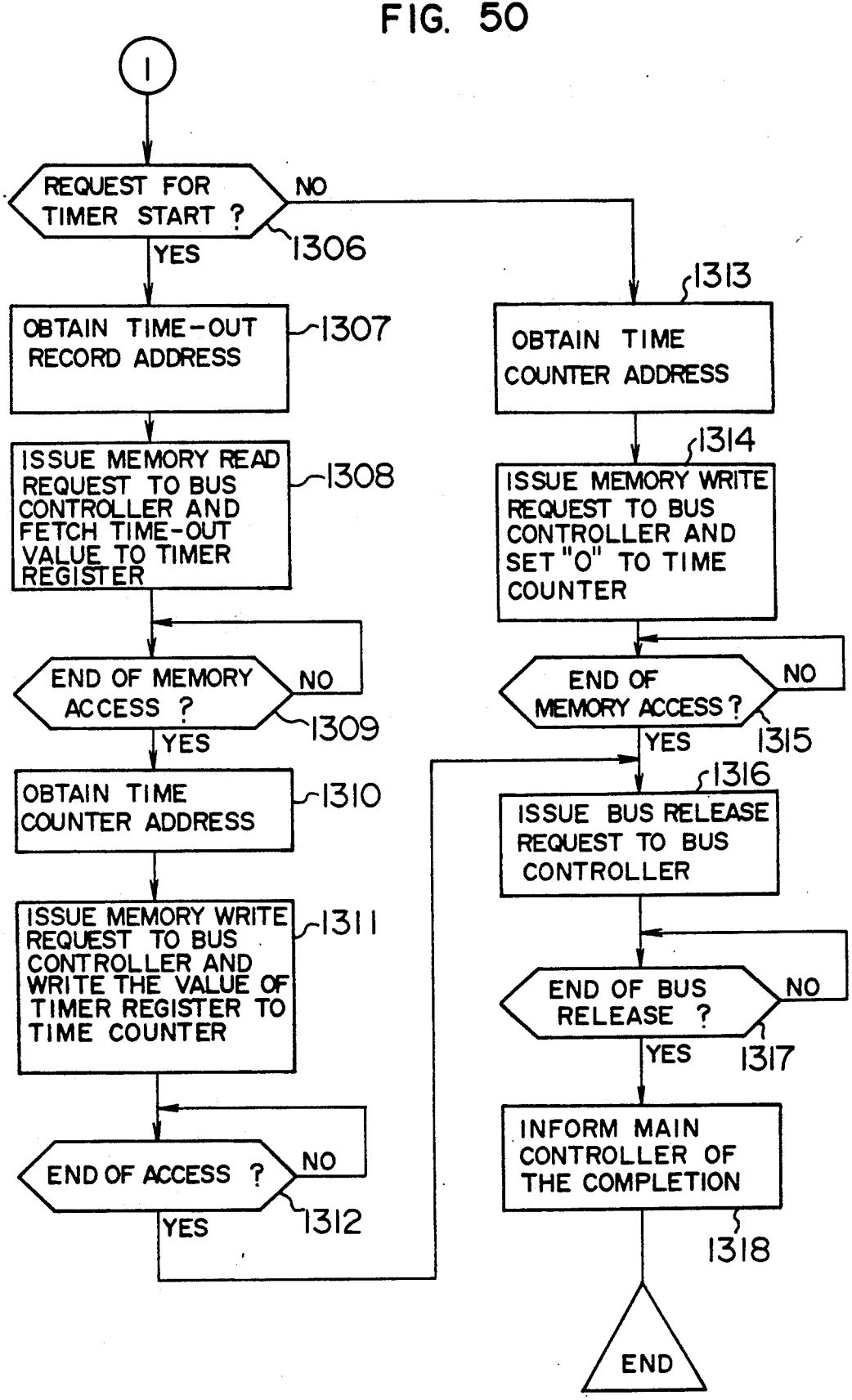

The timer control unit 135, when actuated by the main control unit 110, issues a bus acquisition request to the bus controller 112 (step 1300), and waits for the acquisition to be completed (step 1301). When the bus acquisition is completed, the timer control unit checks the lock flag register 135-2 (step 1302). If the lock flag is set, the timer control unit issues a bus release request to the bus controller 112, and waits for the lock flag 135-2 to be reset (step 1304 to 1305). If it is confirmed that the lock flag 135-2 has been reset, the program goes back to step 1300, where the above operation is repeated. If at step 1302 the lock flag is reset, the timer counter 301-2 is started to operate as shown in FIG. 50.

When the request from the main controller 110 is a timer start request for one connection, the address to the timeout time setting area 301-1 associated with the above connection is found (step 1307), a memory read request based on the above address is issued to the bus controller 112, and the timeout value read from the memory is stored in the timer register 135-3 (step 1308, 1309). Then, the address to the timer counter 301-2 is found, a memory write request is issued to the bus control unit 112, and the content of the timer register 135-3 is written in the timer counter 301-2 (step 1311, 1312).

When the request from the main controller 110 is a timer stop request, the address to the timer counter 301-2 of the corresponding connection is found (step 1313), a memory write request is issued to the bus control unit 112, and "0" is written in the timer counter 301-2 (step 1314, 1315). When an access to the timer counter 301-2 is completed, a bus release request is issued to the bus control unit 112 (step 1316, 1317), and then the main controller 110 is notified of the completion of the timer processing (step 1318).

Thus, the start, stop operations of the timer and the detection of the timeout can be performed by two processors.

According to this embodiment, since the backend processor 200 is not used in the data transfer processing, it is possible to provide the high speed protocol processor 10. Moreover, according to this embodiment, the timer management function is divided into the relatively simple start and stop processing of the timer in which high speed is required, and the complicated timeout detection processing requiring flexibility. The start and stop processing of the timer is performed by the data transfer processor unit 100, and the timeout detection processing is executed by the backend processor 200, so that the data transfer processor 100 can be small-sized and have a high performance.

FIFTH EMBODIMENT

In the first embodiment, upon header generation, the operation of header information generation and the operation of writing in the buffer memory 30 are carried out in parallel by the pipe-line system. Upon header analysis, the operation of reading header information from the buffer memory 30 and the operation of analyzing header information are performed in parallel by the pipe-line system, thereby performing the header processing at high speed.

However, the protocol header of OSI, for instance, is sometimes stored over a plurality of address regions across the standard access byte boundary of the memory because the byte boundary of the memory is not well considered and because the parameters constituting the protocol header do not have a uniform length. In this case, a plurality of access operation are necessary to one parameter.

Figure 51:
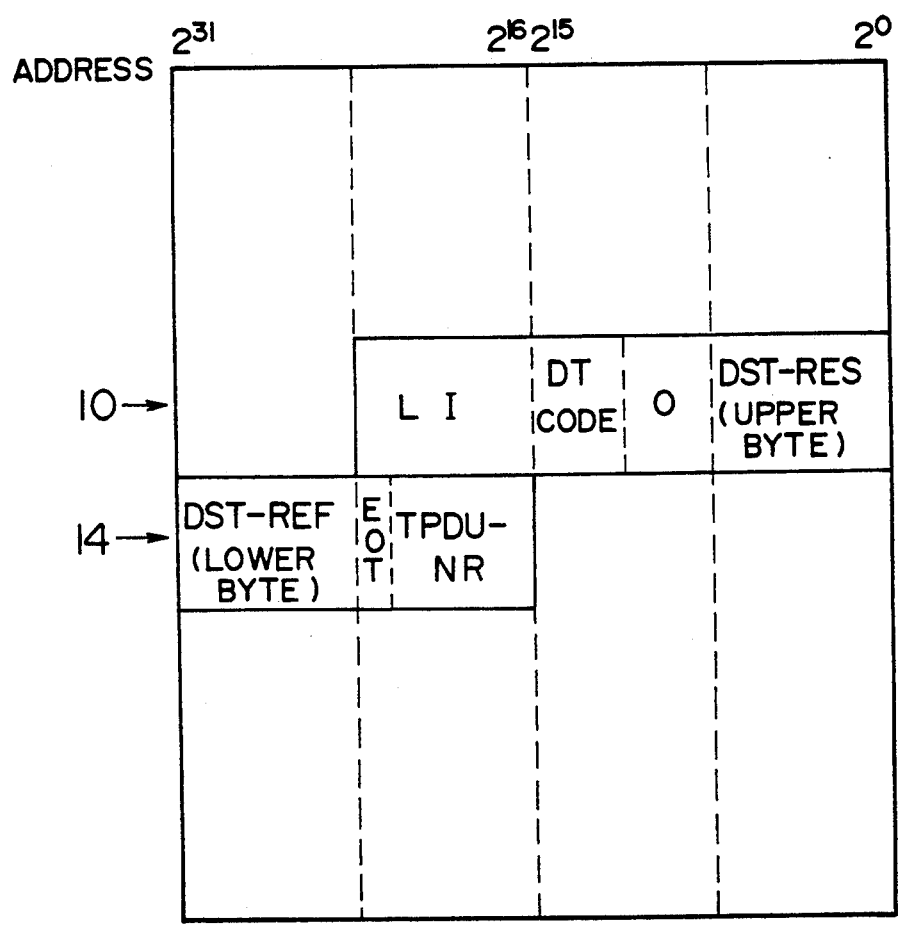
FIG. 51 is a diagram showing the state in which the DT packet of the transport protocol is stored on the buffer memory.

FIG. 51 shows the buffer memory in which the DT packet of the transport protocol is stored over two memory access regions when the data bus width is 32 bits. In this example, since the parameter DST-REF of 16-bit length constituting the DT packet is stored over the two address regions, two access operations are necessary to the parameter DST-REF, thus preventing the high-efficiency header processing based on the pipe-line operation.

The fifth embodiment of this invention is to provide a protocol processor capable of high-efficiency pipe-line processing even when the element of the protocol header is stored over two memory access regions.

Figure 52:
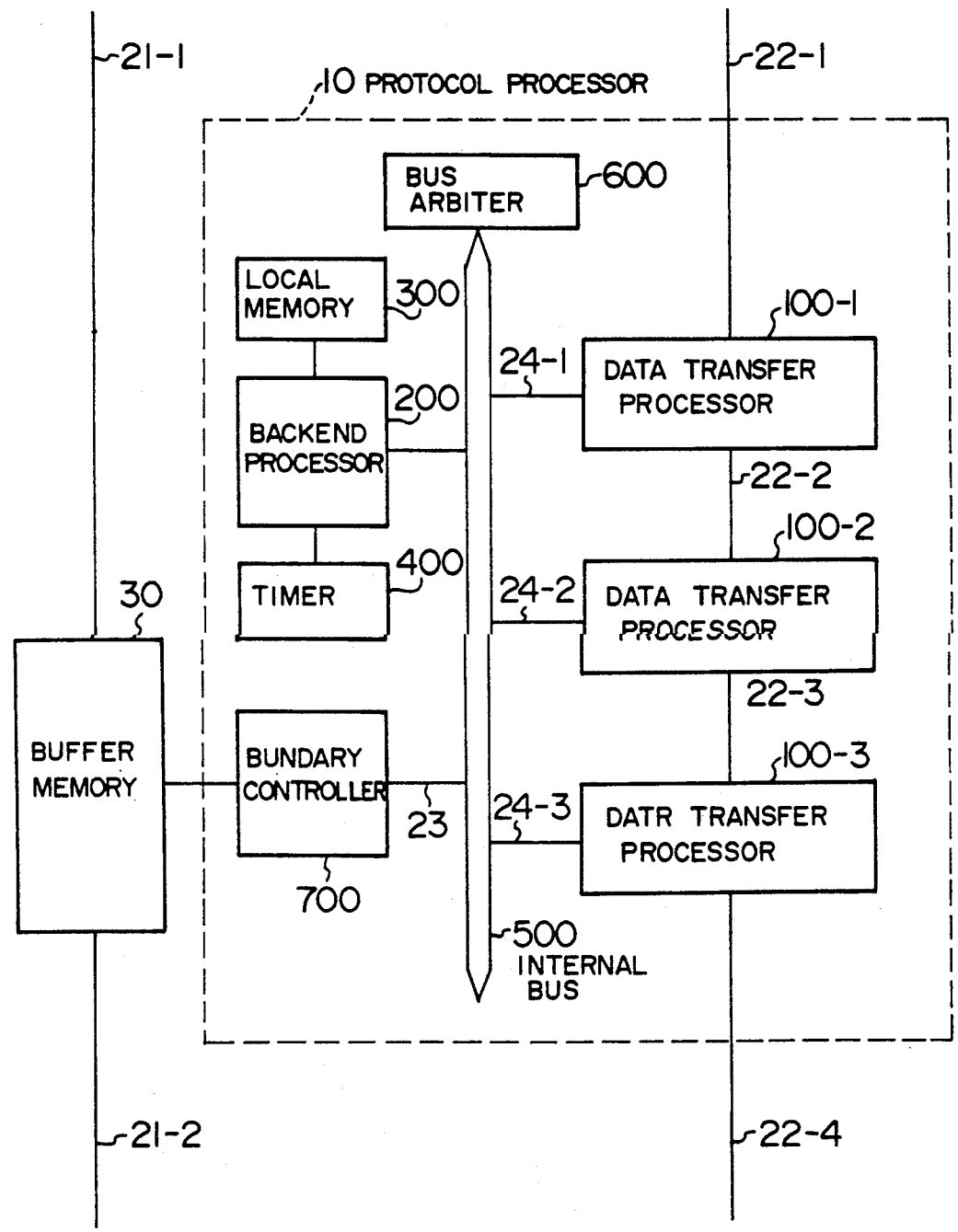
FIG. 52 is a block diagram of the fifth embodiment of the protocol processor 10.

The protocol processor 10 shown in FIG. 52 is characterized in that a boundary controller 700 for solving the problem with the boundary of the memory address is provided between the internal bus 500 and the buffer memory 30. The boundary controller 700 has a conversion function capable of reading or writing the data lying over two address regions by a single access to memory.

Figure 53:
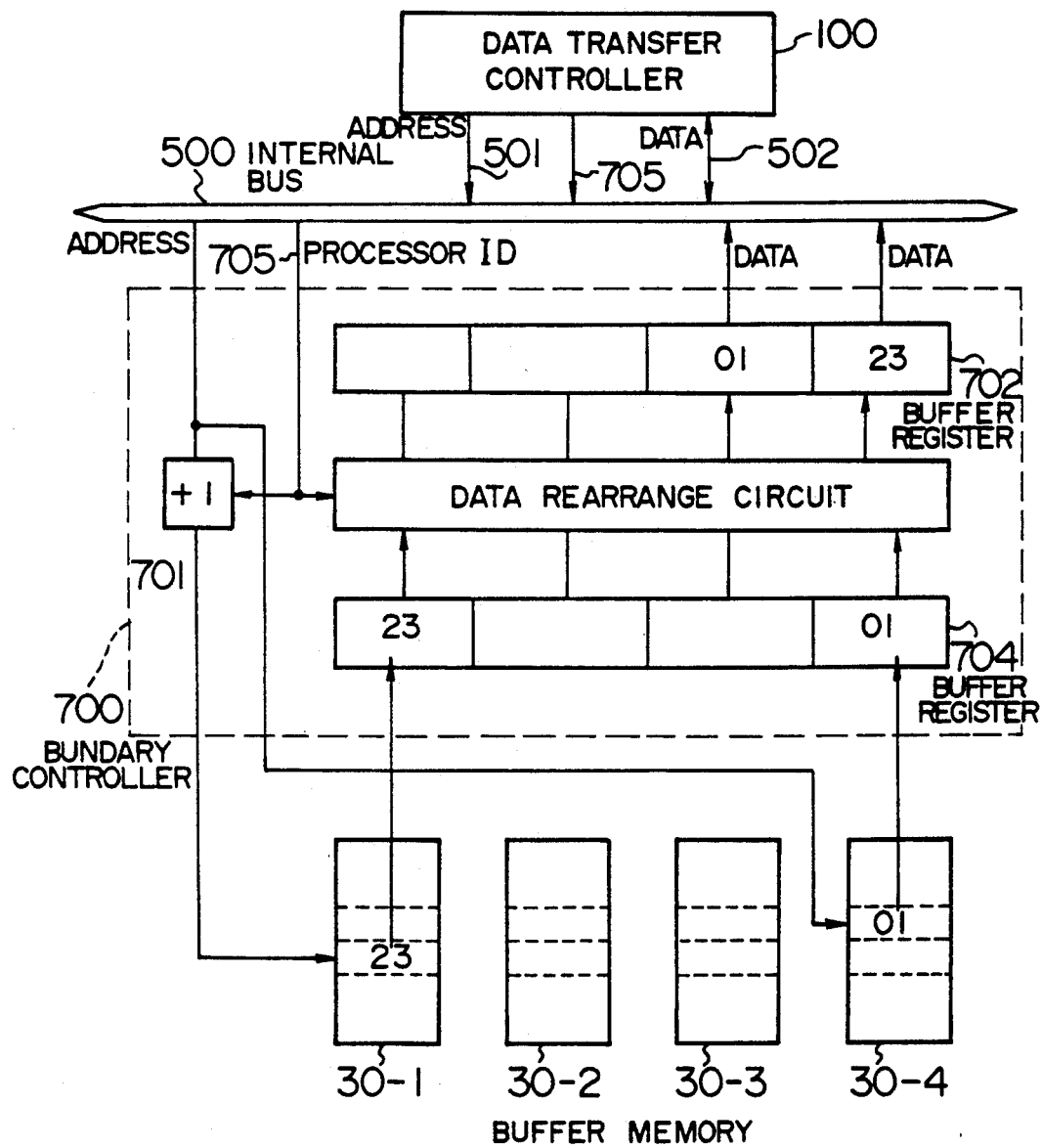
FIG. 53 is a detailed block diagram of the construction of the boundary controller 700 shown in FIG. 52.

FIG. 53 shows one example of the arrangement of the boundary controller 700.

The boundary controller 700 includes an address incrementer 701 for incrementing the address 501 produced from the data transfer processor unit 100 by +1, a data rearrange circuit 703 for converting between the data format accessed on the buffer memory 30 and the data format on the internal bus 500, and data buffer registers 702 and 704 for temporarily holding the accessed data. The buffer memory 30 has, for example, 4 one-byte width data storing memory chips connected in parallel so that 32-bit width data in total can be accessed as a unit.

The operation of the boundary controller 700 will be described below.

We consider, for example, the case in which the data transfer processor unit 100 reads 16-bit data which is stored over two memory regions across the address boundary of 32 bits. The boundary controller 700 operates such that the first address is supplied from the data transfer processor unit to the memory chip 30-4 which stores part of data within the address boundary, and the second address from the incrementer 701 which adds 1 to the first address from the data transfer processor unit 100 is supplied to the memory chip 30-1 which stores part of data exceeding the address boundary, so as to make access to the memory chips 30-1 and 30-4 at the same time. The two parts of data read by the access operations are arranged into a series of data of 16 bits by the data rearrange circuit 703 and are transmitted through the internal bus 500 to the data transfer processor unit 100.

Thus, the data lying across the address boundary of the memory can be read by a single access. When the backend processor 200 is formed of a general-purpose microprocessor, the boundary controller 700 does not properly function depending on the type of the microprocessor when the backend processor 200 makes access to the buffer memory 30. Thus, in the embodiment of FIG. 53, the function of the boundary controller 700 can be made ineffective by the processor identifying signal 705.

FIG. 54 shows that the DT packet of transport protocol stored in the buffer memory 30 is processed by the data transfer processor unit 100. In this example, of the 5-byte length protocol header, the first 4 byte (part A) is treated as one processing unit, and the remaining one byte (part B) is treated as another processing unit, the parts A and B being processed by the pipe-line system. Since the use of the boundary controller 700 enables the pipe-line operation to be performed without disturbance even when the protocol header lies in any address locations in the memory, the protocol header can be processed at high speed.

SIXTH EMBODIMENT

In the arrangement of the computer 1 and the communication control equipment 2 connected as shown in FIG. 2, the interface control between the MAC control processor 50 and the protocol processor 10 and the data transfer between the buffer memory 30 and the MAC LSI 40 are made through the local bus 60. That is, since in the above portion the data path and the control path are not separated, one of the operations is delayed due to bus competition. The MAC LSI 40 for supporting the high-speed network includes a special type which does not allow a bus to be interposed between the MAC LSI and the buffer memory 30 to be accessed thereby but allows the buffer memory 30 to be directly connected thereto, and which has its own buffer management function.

Figure 55:
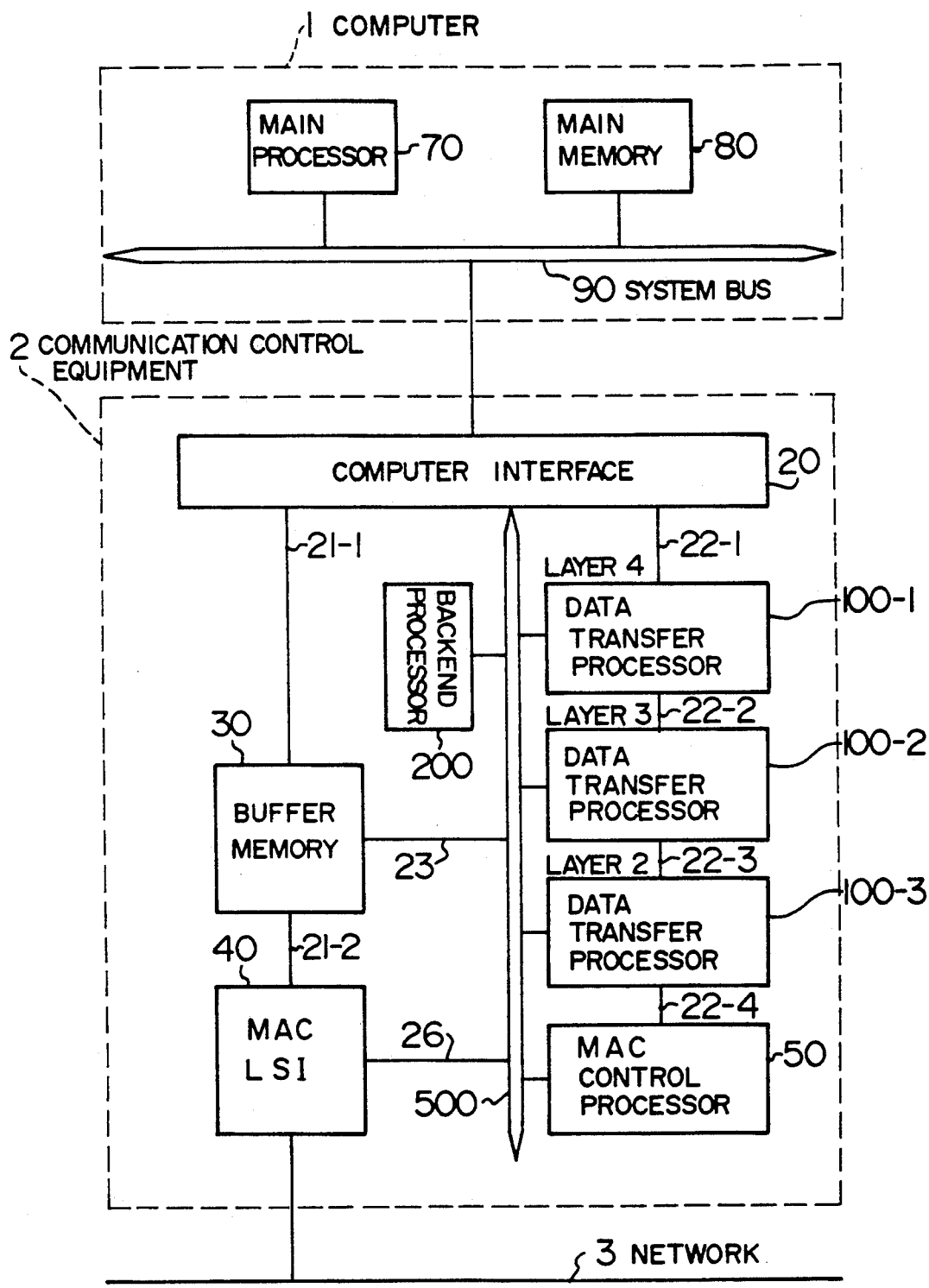
FIG. 55 is a block diagram of another embodiment of the communication control equipment 2.

FIG. 55 shows the construction of the communication control equipment 2 which enables the above special type of MAC LSI to be used.

In this embodiment, the MAC LSI 40 and the buffer memory 30 are connected through a data path 21-2 separated from the internal bus 500. The data transfer processor unit 100-1 to 100-3 provided for each layer and the MAC control processor 50 are connected through a control path 2 separated from the internal bus 500. The data transfer processor unit 100, the backend processor 200, the MAC control processor 50, the MAC LSI 40 and the buffer memory 30 are connected to the internal bus 500. The data transfer processor unit 100 and the backend processor 200 make access to the buffer memory 30 through the path 23, thereby performing the protocol header processing. The MAC control processor 50 makes interface operation to the MAC LSI 40 through the path 26.

According to this embodiment, since the data path and the control path within the communication control equipment 2 are completely separated, it is possible to provide a high-performance communication control equipment capable of solving the problems in the first embodiment.

OTHER EMBODIMENT

In each embodiment mentioned above, the data transfer processor unit 100 constituting the protocol processor 10 is provided for each protocol layer. According to this embodiment, the layered protocol can be processed by the pipe-line system, but the scale of the hardware becomes large. Moreover, when the amount of data processing for each layer is not equal, the pipe-line processing becomes ineffective, and thus there is the possibility that the performance of the protocol processor 10 is reduced by the overhead of the communication between the processors using the command descriptor.

Figure 56:
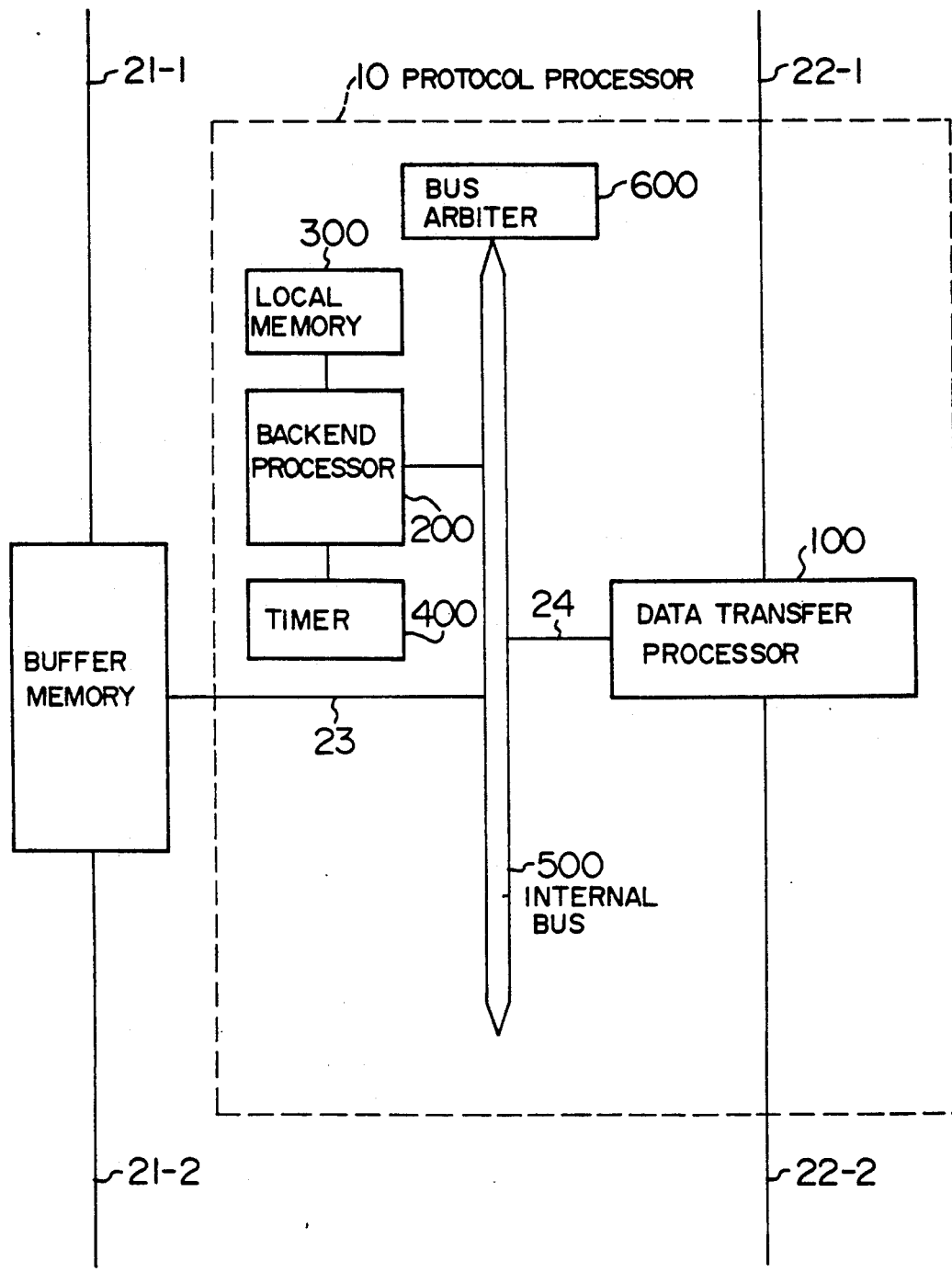
FIG. 56 is a block diagram of still another embodiment of the protocol processor 10.

To solve these problems, the data transfer processing of layers 2 to 4 is made by a single data transfer processor unit 100 as for example shown in FIG. 56.

Figure 57:
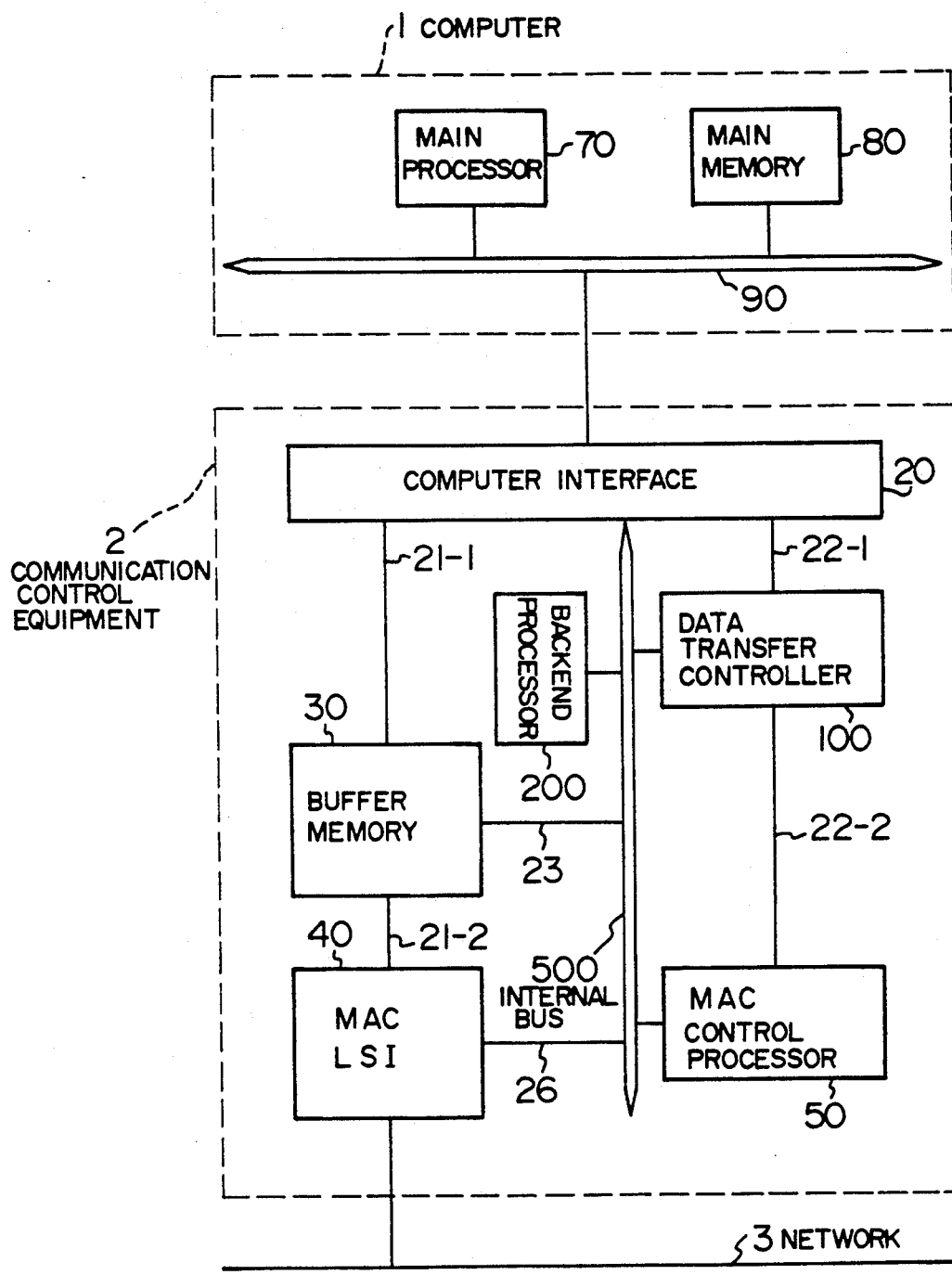
FIG. 57 is a block diagram of another embodiment of the communication control equipment using the protocol processor 10 shown in FIG. 56.

FIG. 57 shows the construction of the communication control equipment 2 using the protocol processor 10 shown in FIG. 56. According to this embodiment, the scale of the hardware can be reduced, and the overhead between the processors can be decreased, thus enabling a high-performance communication control equipment to be provided. According to this invention, as will be obvious from the embodiments mentioned above, the data transfer processing in the protocol processor is made by a high-speed data transfer processor unit, and the connection control which needs complex processing is performed by the backend processor which is controlled by software, and thus it is possible to provide a high-performance communication control equipment which is excellent in flexibility and provides general-purpose use.

What is claimed is:

1. A communication control equipment connected between a computer system and a network, comprising:

computer interface means, connected to said computer system, for communicating with said computer system;

network interface means, connected to said network, for communicating with said network;

buffer memory means, connected between said computer interface means and said network interface means through a first path for data transfer, for temporarily storing protocol data in association with communication data to be transmitted from said network interface means or received by said computer system; and protocol processor means for performing protocol processing on said protocol data within said buffer memory, said protocol processor means being connected between said computer interface means and said network interface means through a second path for control information transfer and being connected to said buffer memory means through a third path to access said buffer memory means;

said protocol processor means comprising:

first processor means, connected to said second and third paths, for accessing said buffer memory means in response to said control information transferred through said second path, for executing a first category of protocol processing, necessary for normal data transfer of said communication data, on said protocol data stored in said buffer memory means, and for transferring said control information to said third path if protocol processing other than said first category of protocol processing is necessary for said protocol data; and second processor means, connected to said third path, for accessing said buffer memory means in response to said control information received through said third path, and for executing protocol processing other than said first category of protocol processing on said protocol data stored in said buffer memory means;

wherein said network interface means includes means for reading out said communication data and said processed protocol data from said buffer memory means and for transmitting the communication data to said network in a predetermined format in response to the reception of control information for data transmission from said second path, and means for writing new communication data in association with new protocol data into said buffer memory means and for issuing new control information for data reception to said second path when the communication data is received in a predetermined format from said network.

2. A communication control equipment according to claim 1, wherein said protocol has a structure of a plurality of layers, and said first processor means comprises a plurality of processor units connected in series in said second path so as to execute protocol processing of different layers.

3. A communication control equipment according to claim 2, wherein said second path comprises:
   a first control bus for transferring control information for data transmission in a first direction from said computer interface means to said network interface means; and
   a second control bus for transferring control information for data reception in a second direction from said network interface means to said computer interface means, and wherein each of said processor units is connected to each of said first and second control buses through first-in, first-out buffers, respectively.

4. A communication control equipment according to claim 2, wherein said buffer memory means comprises:
   a buffer region for storing said communication data and said protocol data; and
   a control region for storing a plurality of command descriptors provided in correspondence to said communication data, respectively;
   each of said command descriptors being formed of a plurality of entries corresponding to said plurality of layers, each of said entries including a command code, a connection identifier and a buffer address for indicating the location of the communication data or the protocol data in said buffer region in association with the connection identifier;
   said control information including address information for specifying one of said command descriptors, and
   each of said processor units operating in accordance with said control information to access on of the entries which is within the command descriptor specified by the control information and corresponds to the protocol layer related to the processor unit, thereby executing protocol processing operation for the entry.

5. A communication control equipment according to claim 4, wherein said second path comprises:
   a first control bus for transferring control information in a direction from said computer interface means to said network interface means; and
   a second control bus for transferring said control information in a direction from said network interface means to said computer interface means; and
   each of said processor units comprises:
   a first set of first-in, first-out buffers connected to said first control bus so as to receive control information from the upstream side of the first control bus and to transmit control information to the downstream side of the first control bus, respectively, and
   a second set of first-in, first-out buffers connected to said second control bus so as to receive control information from the upstream side of the second control bus and to transmit control information to the downstream side of the second control bus, respectively; and
   means for making access to said command descriptor in said buffer memory means on the basis of the control information read out from said first-in, first-out buffers connected to the upstream side of said first and second control buses and for making access to said buffer region on the basis of the contents of the command descriptor.

6. A communication control equipment connected between a computer system and a network, comprising:
   computer interface means, connected to said computer system, for communicating with said computer system;
   network interface means, connected to said network, for communicating with said network;
   buffer memory means, connected between said computer interface means and said network interface means through a first path for data transfer, for temporarily storing protocol data in association with communication data to be transmitted from said network interface means or received by said computer system; and
   protocol processor means for performing protocol processing on said protocol data within said buffer memory, said protocol processor means being connected between said computer interface means and said network interface means through a second path for control information transfer and connected to said buffer memory means through a third path to access said buffer memory means;
   said protocol processor means comprising:
   an internal bus connected to said third path;
   first processor means, connected to said internal bus and said second path, for accessing said buffer memory means in response to said control information received from said second path, for executing a first category of protocol processing necessary for normal data transfer of said communication data on said protocol data stored in said buffer memory means and for transferring said control information to said internal bus if protocol processing other than said first category of protocol processing is necessary for said protocol data; and
   second processor means, connected to said internal bus, for accessing said buffer memory means in response to said control information received from said first processor means through said internal bus, for executing protocol processing other than said first category of protocol processing on said protocol data stored in said buffer memory means and for supplying said control information to said first processor means through said internal bus;
   wherein said network interface means includes means for reading out said communication data and said processed protocol data from said buffer memory means and for transmitting the communication data to said network in a predetermined format in response to the control information for data transmission from said second path, and means for writing new communication data in association with new protocol data into said buffer memory means and for issuing new control information for data reception to said second path when the communication data is received in a predetermined format from said network.

7. A communication control equipment according to claim 6, wherein said protocol has a structure of a plurality of layers, and said first processor means comprises a plurality of processor units connected in series by said second path so as to execute protocol processing for different layers.

8. A communication control equipment according to claim 7, wherein said second path comprises:
   a first control bus for transferring control information as to data transmission in a first direction from said computer interface means to said network interface means; and a second control bus for transferring said control information as to data reception in a second direction from said network interface means to said computer interface means; and wherein each of said processor units is connected to each of said first and second control buses through first-in, first-out buffers, respectively.

9. A communication control equipment according to claim 8, wherein said buffer memory means comprises:
a buffer region for storing said communication data and said protocol data; and
a control region for storing a plurality of command descriptors provided in correspondence to said communication data, respectively;
each of said command descriptors being formed of a plurality of entries corresponding to a plurality of layers and each including a command code, a connection identifier, a data length and a buffer address for indicating the location of the communication data or the protocol data in said buffer region in association with the connection identifier;
said control information including address information for specifying one of said command descriptors; and
each of said processor units operating in accordance with said control information to access one of the entries, which is within the command descriptor specified by the control information and corresponds to the protocol layer related to the processor unit, thereby performing protocol processing operation for the entry.

10. A communication control equipment according to claim 9, wherein said second path comprises:
a first control bus for transferring control information in a direction from said computer interface means to said network interface means; and
a second control bus for transferring said control information in a direction from said network interface means to said computer interface means; and
each of said processor units comprises:
a first set of first-in, first-out buffers connected to said first control bus so as to receive control information from the upstream side of the first control bus and to transmit control information to the downstream side of the first control bus, respectively; and
a second set of first-in, first-out buffers connected to said second control bus so as to receive control information from the upstream side of the second control bus and to transmit control information to the downstream side of the second control bus, respectively; and
means for making access to said command descriptor in said buffer memory means on the basis of the control information read out from said first-in, first-out buffers connected to the upstream side of said first and second control buses and for making access to said buffer region on the basis of the contents of the command descriptor being accessed.

11. A communication control equipment according to claim 6, wherein:
said buffer memory comprises a plurality of sub-memories accessible in one byte units and connected in parallel to said internal bus; and
a boundary controller between said buffer memory and said internal bus for incrementing a memory address on said internal bus to generate a second address, and for supplying said second address to at least one of said plurality of sub-memories when one unit of data to be read out from or written into said buffer memory exceeds the capacity of a memory region which can be accessed by one memory address that is supplied from said first or second processor to said internal bus.

12. A communication control equipment connected between a computer system and a network, comprising:
computer interface means, connected to said computer system, for communicating with said computer system;
network interface means, connected to said network for communicating with said network;
buffer memory means, connected between said computer interface means and said network interface means through a first path for data transfer, for temporarily storing protocol data in association with communication data to be transmitted from said network interface means or received by said computer system; and
protocol processor means for performing protocol processing on said protocol data within said buffer memory, said protocol processor means being connected between said computer interface means and said network interface means through a second path for control information transfer and connected to said buffer memory means through a third path to access said buffer memory means;
said protocol processor means comprising:
a first internal bus connected to said third path;
first processor means, connected to said first internal bus and second path, for accessing said buffer memory means in response to said control information received from said second path, for executing a first category of protocol processing necessary for normal data transfer of said communication data on said protocol data stored in said buffer memory means, and for transferring said control information to a second internal bus if protocol processing other than said first category of protocol processing is necessary for said protocol data; and
second processor means, connected to said first and second internal buses, for accessing said buffer memory means through said second internal bus in response to said control information received from said first processor means through said first internal bus, for executing protocol processing other than said first category for protocol processing on said protocol data stored in said buffer memory means, and then for supplying said control information to said first processor means through said second internal bus;
wherein said network interface means includes means for reading out said communication data and said processed protocol data from said buffer memory means and for transmitting the communication data to said network in a predetermined format in response to the control information for data transmission from said second path, and means for writing new communication data in association with new protocol data into said buffer memory means and for issuing new control information for data reception to said second path when the communication data is received in a predetermined format from said network.

13. A communication control equipment according to claim 12, wherein said protocol has a structure of a plurality of layers, and said first processor means comprises a plurality of processor units connected in parallel between said first and second internal buses and connected in series by said second path so as to execute protocol processing for different layers.

14. A communication control equipment according to claim 13, wherein said second path comprises:
a first control bus for transferring control information in a first direction from said computer interface means to said network interface means; and
a second control bus for transferring control information in a second direction from said network interface means to said computer interface means; and
wherein each of said processor units is connected to each of first and second control buses through first-in, first-out buffers, respectively.

15. A communication control equipment connected between a computer system and a network, comprising:
computer interface means, connected to said computer system, for communicating with said computer system;
network interface means, connected to said network, for communicating with said network;
buffer memory means, connected between said computer interface means and said network interface means through a first path for data transfer, for temporarily storing protocol data in association with communication data to be transmitted from said network interface means or received by said computer system; and
protocol processor means for performing protocol processing on said protocol data within said buffer memory, said protocol processor means being connected between said computer interface means and said network interface means through a second path for control information transfer and connected to said buffer memory means through a third path to access said buffer memory means;
said protocol processor means comprising:
an internal bus connected to said third path;
a plurality of first processors, each provided for a different protocol layer and being connected in series in said second path and in parallel to said internal bus so as to access said buffer memory means in response to control information received from said second path through said internal bus, for executing a first category of protocol processing necessary for normal data transfer of said communication data on said protocol data stored in said buffer memory means; and
a plurality of second processors provided in correspondence to respective ones of said protocol layers and being connected to said plurality of first processors through internal signal lines and to said buffer memory through said internal bus, respectively;
each of said first processors supplying control information to one of said internal signal lines connected thereto if protocol processing other than said first category of protocol processing is necessary on said protocol data;
each of said second processors including means responsive to control information received from said first processor through said internal signal line to make access to said buffer memory means through said internal bus, to execute protocol processing other than said first category of protocol processing on the protocol data stored in said first buffer memory means, and then to supply the control information through said internal signal line to a first processor;
wherein said network interface means includes means for reading out said communication data and said processed protocol data from said buffer memory means and for transmitting the communication data to said network in a predetermined format in response to the control information for data transmission from said second path, and means for writing new communication data in association with new protocol data into said buffer memory means and for issuing new control information for data reception to said second path when the communication data is received in a predetermined format from said network.

16. A high speed protocol apparatus connected between said computer interface means for connecting with a computer system and network interface means for connecting with a network so as to make access to buffer memory means, which is connected between said computer interface means and said network interface means for temporarily storing communication data and protocol data, and to execute processing of a layered protocol on the protocol data associated with the communication data at a high speed, comprising:
control information path means for transferring control information between said computer interface means and said network interface means;
an internal bus connected to said buffer memory means;
at least one first processor, connected said internal bus and said control information path means so as to receive control information from said control information path mans and to make access to said buffer memory means through said internal bus, for executing a first category of protocol processing necessary for normal data transfer on the protocol data stored in said buffer memory means in accordance with said received control information; and
a second processor, connected to said internal bus, for executing protocol processing other than said first category of protocol processing;
said first processor including means for supplying the control information to said internal signal bus if protocol processing other than said first category of protocol processing is necessary on said protocol data,
said second processor including means responsive to the control information received from said first processor through said internal bus for accessing said buffer memory means through said internal bus to execute protocol processing other than said first category of protocol processing on the protocol data stored in said buffer memory, and then to supply the control information to said first processor through said internal bus.

17. A high speed protocol processing apparatus according to claim 16, wherein said control information path means comprises information paths each having a signal transmission direction opposite to each other, and said first processor is connected to said control information paths through first-in, first-out buffers.

18. A high speed protocol processing apparatus according to claim 16, wherein said first processor comprises a plurality of processor units each provided in correspondence to a respective layer of communication protocol and connected in series by said control information path means formed of a pair of information paths each having a transmission direction opposite to each other, so as to be independently operable.

19. A high speed protocol processing apparatus according to claim 18, wherein each of said processor units has a plurality of first-in, first-out buffers serving as connection interfaces for communicating control information with information paths.

20. A high speed protocol processing apparatus according to claim 18, wherein each of said processor units comprises:
- a first circuit for reading and writing a protocol header as part of the protocol data from and in said buffer memory means;
- a second circuit for analyzing a protocol header of communication data when the communication data stored in said buffer memory means and to be processed in protocol is the data received from the network;
- a decision circuit for deciding whether or not the communication data to be processed in protocol belongs to a normal data transfer operation;
- register means for storing various information necessary for the execution of protocol processing;
- a third circuit for executing protocol processing on protocol data read out from said buffer memory means in response to a decision signal from said decision circuit;
- a fourth circuit for generating a protocol header of transmission data to be stored as a part of the protocol data in said buffer memory means in a normal data transfer operation; and
- a control circuit for controlling the operation of said first through fourth circuits.

21. A high speed protocol processing apparatus according to claim 16, further comprising a flag register, provided between said first processor and said second processor, for supplying flag information to said first processor to notify said first processor that said second processor has finished the protocol processing associated with said control information after the control information is supplied from said first processor to said second processor through said internal bus.

22. A high speed protocol processing apparatus according to claim 21, wherein said first processor includes a register accessible from said second processor so that said second processor can inform said first processor, by setting flag information in the register, whether or not a data transfer is possible through the network due to the establishment of a connection between two systems which are to make communication with each other.

* * * * *